(12) United States Patent
Sakakura et al.

(10) Patent No.: US 7,503,172 B2
(45) Date of Patent: Mar. 17, 2009

(54) HYDROSTATIC TRANSAXLE

(75) Inventors: Shinya Sakakura, Amagasaki (JP);
Takeshi Okazaki, Amagasaki (JP);
Hideki Kanenobu, Amagasaki (JP)

(73) Assignee: Kanzaki Kokyukoki Mfg. Co., Ltd., Hyoga (JP)

( * ) Notice: Subject to any disclaimer, the term of this patent is extended or adjusted under 35 U.S.C. 154(b) by 92 days.

(21) Appl. No.: 11/623,678

(22) Filed: Jan. 16, 2007

(65) Prior Publication Data

US 2007/0163253 A1 Jul. 19, 2007

(30) Foreign Application Priority Data

Jan. 16, 2006 (JP) ............................. 2006-008051
Feb. 3, 2006 (JP) ............................. 2006-027602
Nov. 1, 2006 (JP) ............................. 2006-298042

(51) Int. Cl.
*B60K 17/28* (2006.01)
*B60K 23/08* (2006.01)

(52) U.S. Cl. ......................... 60/427; 180/242
(58) Field of Classification Search .................. 60/427, 60/484; 180/242
See application file for complete search history.

(56) References Cited

U.S. PATENT DOCUMENTS

| | | | |
|---|---|---|---|
| 4,402,181 A * | 9/1983 | Acker et al. ................... | 60/484 |
| 4,886,142 A * | 12/1989 | Yamaoka et al. ............... | 60/484 |
| 6,189,641 B1 * | 2/2001 | Azuma ......................... | 180/242 |
| 6,675,575 B1 * | 1/2004 | Cunningham ................ | 180/242 |
| 7,025,162 B2 * | 4/2006 | Abend et al. ................. | 180/242 |
| 7,082,759 B1 * | 8/2006 | Tsukamoto et al. ........... | 60/484 |
| 7,204,779 B2 * | 4/2007 | Irikura et al. ................ | 475/230 |

* cited by examiner

*Primary Examiner*—Thomas E Lazo
(74) *Attorney, Agent, or Firm*—Sterne, Kessler, Goldstein & Fox P.L.L.C.

(57) ABSTRACT

A hydrostatic transaxle is provided for a vehicle having a first axle and a second axle. The hydrostatic transaxle comprises: a hydraulic pump; a first hydraulic motor drivingly connected to the first axle; a closed circuit fluidly connecting the hydraulic pump to the first hydraulic motor; and a fluid-supply switching device shifted between a supply position for supplying fluid from the closed fluid circuit to a second hydraulic motor, which is disposed on the outside of the hydraulic transaxle and is drivingly connected to the second axle, and a supply-stop position for stopping the supply of fluid from the closed fluid circuit to the second hydraulic motor. The first hydraulic motor is variable in displacement, and the hydrostatic transaxle further comprises a linkage system for associating the switching of the fluid-supply switching device between the supply position and the supply-stop position with an operation for changing the displacement of the first hydraulic motor.

12 Claims, 43 Drawing Sheets

HYDROSTATIC TRANSAXLE

BACKGROUND OF THE INVENTION

1. Field of the Invention

The present invention relates to a hydrostatic transaxle for a vehicle having first and second axles, the hydrostatic transaxle comprising: a hydraulic pump; a hydraulic motor drivingly connected to the first axle; and a closed circuit fluidly connecting the hydraulic pump to the hydraulic motor, wherein a second hydraulic motor, which is disposed on the outside of the hydrostatic transaxle and drivingly connected to the second axle, can receive power from the hydrostatic transaxle.

2. Related Art

Conventionally, as disclosed in JP 2002-87086 A, there is a well-known four-wheel drive vehicle equipped with a hydrostatic transaxle. The vehicle is provided with a first axle (one of front and rear axles) drivingly connected to a hydraulic motor incorporated in the hydrostatic transaxle. The vehicle is also provided with a second axle (the other of front and rear axles), which is drivingly connected to an output portion of the hydraulic motor through a mechanical transmission linkage including a propeller shaft and a mechanical drive-mode change clutch that is shiftable between a clutch-on position for establishing a four-wheel drive mode and a clutch-off position for establishing a two-wheel drive mode.

Such a conventional hydrostatic transaxle may be provided with a sub-transmission, such as a gear train or a belt transmission, disposed on the downstream of the hydraulic motor. However, the switching of the mechanical clutch accelerates abrasion of components of the sub-transmission, and causes noise and shock.

An alternative conventional vehicle equipped with the above-mentioned hydrostatic transaxle is provided with a second hydraulic motor disposed on the outside of the hydrostatic transaxle so as to drive the second axle, and a fluid passage including at least one pipe is interposed between the hydrostatic transaxle and the second hydraulic motor. In this state, a hydraulic switching valve serving as a drive-mode change valve, which is shiftable between a supply position for supplying fluid to the second hydraulic motor, i.e., for the four-wheel drive mode, and a supply-stop position for stopping the fluid supply to the second hydraulic motor, i.e., for the two-wheel drive mode, has to be disposed on the fluid passage.

Here, the drive-mode change valve is desired to have no exposed fluid pipe such as to complicate the assembling of the hydrostatic transaxle and to reduce efficiency of manufacture of the vehicle. Further, the drive-mode of the vehicle is desired to be automatically changed according to the sub-speed change operation for changing the speed stage of the sub-transmission without requiring the vehicle to be stopped for the drive-mode change operation.

SUMMARY OF THE INVENTION

An object of the present invention is to provide a hydrostatic transaxle adapted for a vehicle having first and second axles, the hydrostatic transaxle comprising: a hydraulic pump; a first hydraulic motor drivingly connected to a first axle; and a closed fluid circuit fluidly connecting the hydraulic pump to the first hydraulic motor, wherein the hydrostatic transaxle is convenient for supplying fluid to a second hydraulic motor, which is disposed outward from the hydrostatic transaxle and is drivingly connected to a second axle.

To achieve the object, according to the invention, a hydrostatic transaxle for a vehicle having a first axle and a second axle, comprises: a hydraulic pump; a first hydraulic motor drivingly connected to the first axle; and a closed circuit fluidly connecting the hydraulic pump to the first hydraulic motor. The hydrostatic transaxle is characterized in that it further comprises a fluid-supply switching device shifted between a supply position for supplying fluid from the closed fluid circuit to a second hydraulic motor, which is disposed on the outside of the hydrostatic transaxle and is drivingly connected to the second axle, and a supply-stop position for stopping the supply of fluid from the closed fluid circuit to the second hydraulic motor.

Since the hydrostatic transaxle comprises the fluid-supply switching device, the hydrostatic transaxle requires no additional fluid supply device such as an exposed fluid pipe to be extended therefrom to the fluid-supply switching device, thereby reducing the number of parts and costs, and simplifying the assembling of the hydrostatic transaxle and improving the manufacture efficiency of the vehicle.

Preferably, the first hydraulic motor is variable in displacement, and the hydrostatic transaxle further comprises a linkage system for associating the switching of the fluid-supply switching device between the supply position and the supply-stop position with an operation for changing the displacement of the first hydraulic motor.

Therefore, the fluid-supply switching device is automatically switched according to the operation for changing the displacement of the first hydraulic motor. In other words, the vehicle can travel in an optimal drive mode (either a two-wheel drive mode or a four-wheel drive mode) automatically selected correspondingly to the speed-stage of the hydrostatic transaxle established by the selected displacement of the first hydraulic motor.

Preferably, at least either a small displacement or a large displacement of the first hydraulic motor is selected. The linkage system sets the fluid-supply switching device to the supply position when the large displacement of the first hydraulic motor is selected. The linkage system sets the fluid-supply switching device to the supply-stop position when the small displacement of the first hydraulic motor is selected.

Therefore, when the vehicle travels at work or on a rough road or climbs a steep slope, the large displacement of the first hydraulic motor is selected so as to ensure slow and high-torque rotation of the first axle, and the linkage system automatically sets the fluid-supply switching device to the supply position so as to transmit the rotation force to the second axle, thereby ensuring smooth traveling of the vehicle. When the vehicle normally travels, the small displacement of the first hydraulic motor is selected so as to ensure efficient high-speed rotation of the first axle, and the linkage system automatically sets the fluid-supply switching device to the supply-stop position so as to isolate the second axle from the rotation force of the first hydraulic motor, thereby ensuring efficient fuel consumption and smooth turning of the vehicle.

Further preferably, the first hydraulic motor is provided with a rotary shaft for changing the displacement of the first hydraulic motor, and wherein the fluid-supply switching device is a rotary valve having a rotary axis disposed in parallel to the rotary shaft of the first hydraulic motor.

Therefore, the space between the rotary shaft of the first hydraulic motor and the rotary valve serving as the fluid-supply switching device is minimized, and the linkage system is compactly disposed in this space so as to minimize the hydrostatic transaxle.

Further preferably, the hydrostatic transaxle further comprises: a displacement control device for changing the displacement of the first hydraulic motor; and a cushion mechanism. The displacement control device has a movable range between at least two positions (in the case that at least either the large displacement or the small displacement of the first hydraulic motor is selected, the at least two positions are a large displacement position for establishing the large displacement of the first hydraulic motor, and a small displacement position for establishing the small displacement of the second hydraulic motor). The cushion mechanism is provided in the linkage system so as to make the two positions of the displacement control device in the movable range correspond to the supply and supply-stop positions of the fluid-supply switching device, respectively, (to make the large displacement position of the displacement control device correspond to the supply position and to make the small displacement position of the displacement control device correspond to the supply-stop position,) even when the movable range of the displacement control device is different from the shiftable range of the fluid-supply switching device between the supply position and the supply-stop position.

Therefore, the cushion mechanism ensures the association of the shift of the fluid-supply switching device between the supply position and the supply-stop position with the operation of the displacement control device for changing the displacement of the first hydraulic motor, even if the movable range of the displacement control device is smaller or larger than the shiftable range of the fluid-supply switching device.

Further preferably, the linkage system includes a link element interposed between the displacement control device and the fluid-supply switching device so as to serve as the cushion mechanism. A link ratio between the displacement control device and the link element is different from a link ratio between the fluid-supply switching device and the link element, so as to correspond to the difference between the movable range of the displacement control device and the shiftable range of the fluid-supply switching device.

Therefore, while various vehicles require various differences between the movable range of the displacement control device and the shiftable range of the fluid-supply switching device, only the link element is optionally designed so as to correspond to the difference between the movable range of the displacement control device and the shiftable range of the fluid-supply switching device in a target vehicle, whereby the linkage system having the cushion mechanism, i.e., the linkage system, which surely associates the shift of the fluid-supply switching device between the supply position and the supply-stop position with the operation of the displacement control device for changing the displacement of the first hydraulic motor, can be easily adapted for any vehicle.

Alternatively preferably, the linkage system includes an elastic element serving as the cushion mechanism interposed between the displacement control device and the fluid-supply switching device so as to allow movement of one of the displacement control device and the fluid-supply switching device while retaining the other of the displacement control device and the fluid-supply switching device.

Therefore, due to the elastic element, which requires no complicated design (such as to be required for the above link element for corresponding to the link ratio difference) for corresponding to the difference between the movable range of the displacement control device and the shiftable range of the fluid-supply switching device, the cushion mechanism can be simple and inexpensive.

These, further and other objects, features and advantages will appear more frilly from the following description with reference to accompanying drawings.

DETAILED DESCRIPTION OF THE INVENTION

Figure 1:
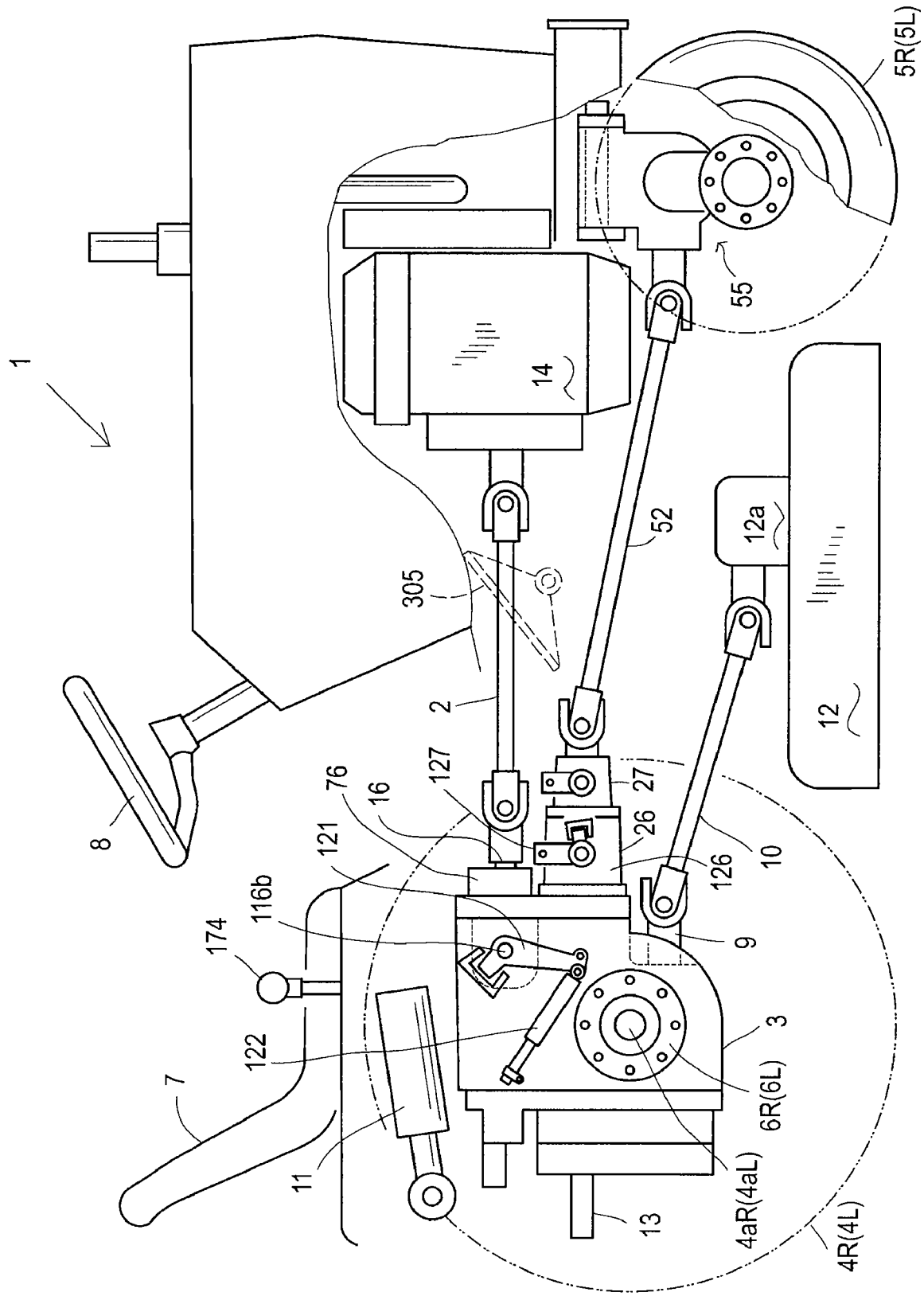
FIG. 1 is a side view of a four-wheel drive working vehicle (lawn tractor) equipped with a main (rear) hydrostatic transaxle 3 transmitting power to a sub (front) transaxle 55 through a mechanical transmission device including a propeller shaft 52 (and a mechanical drive-mode change clutch 29).
Figure 12:
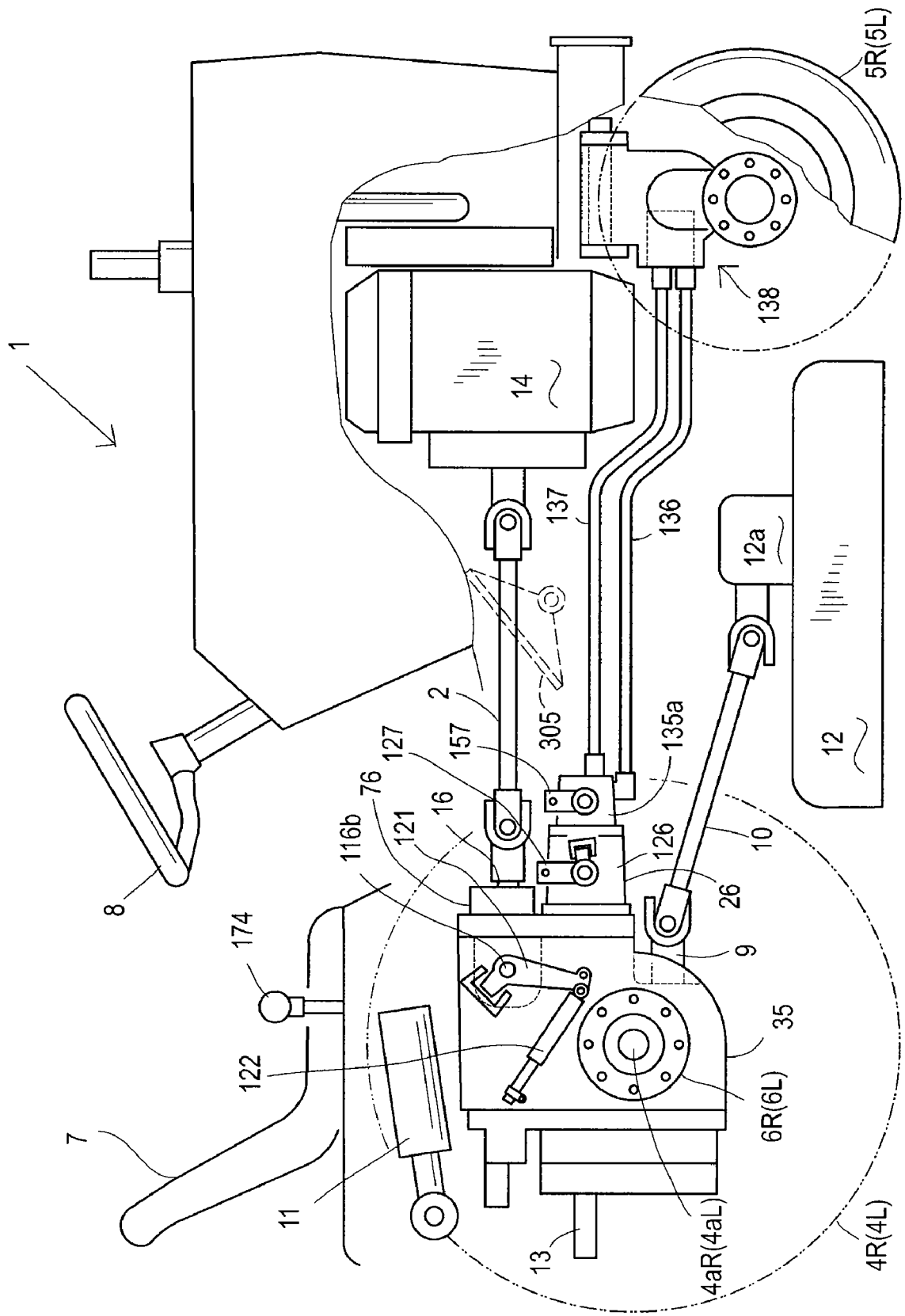
FIG. 12 is a side view of a four-wheel drive working vehicle (lawn tractor) equipped with a main (rear) hydrostatic transaxle 35 adapted to transmit power to a sub (front) transaxle 138 through a hydraulic transmission device including fluid pipes 136 and 137 (and a drive-mode change valve 135).

Referring to FIGS. 1 and 12, each of two different working vehicles 1 has the following common structure. Working vehicle 1 is provided at its front portion with an engine 14, and at its rear portion with a main (rear) hydrostatic transaxle 3 or 35 incorporating an HST 20 or 30. Transaxle 3 or 35 is provided with an input shaft 16, which projects forward so as to receive power from engine 14 through a propeller shaft 2 and universal joints, thereby driving HST 20 or 30 (see FIGS. 2 and 13) for driving right and left rear drive wheels 4R and 4L disposed on right and left sides of transaxle 3 or 35.

A driver's seat 7 is disposed above transaxle 3 or 35, and a steering wheel 8 is disposed in front of seat 7 so as to steer front wheels 5R and 5L for turning of vehicle 1. A sub-speed control lever 174 is disposed beside seat 7. A mid-mount mower 12 is disposed between front wheels 5R and 5L and rear wheels 4R and 4L. Transaxle 3 or 35 is provided at its lower portion with a mid PTO shaft 9, which projects forward so as to be drivingly connected to a gearbox 12a of mower 12 through a propeller shaft 10. As drawn in dotted lines, main-speed control pedal 305 is disposed at a fore-and-aft intermediate portion of vehicle 1 and operatively connected to a movable swash plate 116 of a hydraulic pump 17 of HST 20 or 30 (see FIGS. 2 and 13) in transaxle 3 or 35 so as to determine the traveling speed and direction of vehicle 1.

Vehicle 1 is provided with a rearward extended linkage (including right and left lift arms 218 vertically rotatably mounted on the top of transaxle 3 or 35 as shown in FIGS. 27 and 40 to 42) to be connected to a rear-mount working machine such as a rotary cultivator therebehind. Vehicle 1 is also provided with a hydraulic lift cylinder 11 between transaxle 3 or 35 and seat 7 so as to rotate lift arms 218 for raising and lowering the rear-mount working machine. Transaxle 3 or 35 is provided with a rear PTO shaft 13 projecting rearward so as to drive the rear-mount working machine.

With respect to a different point between respective vehicles 1 of FIGS. 1 and 12, vehicle 1 shown in FIG. 1 has a propeller shaft 52 with universal joints for transmitting power from rear (main) transaxle 3 to a front (sub) transaxle 55 for driving front wheels 5R and 5L. On the contrary, vehicle 1 shown in FIG. 12 has hydraulic pressure fluid pipes 136 and 137 for supplying fluid from rear (main) transaxle 35 to a front (sub) transaxle 138 for driving front wheels 5R and 5L.

Figure 41:
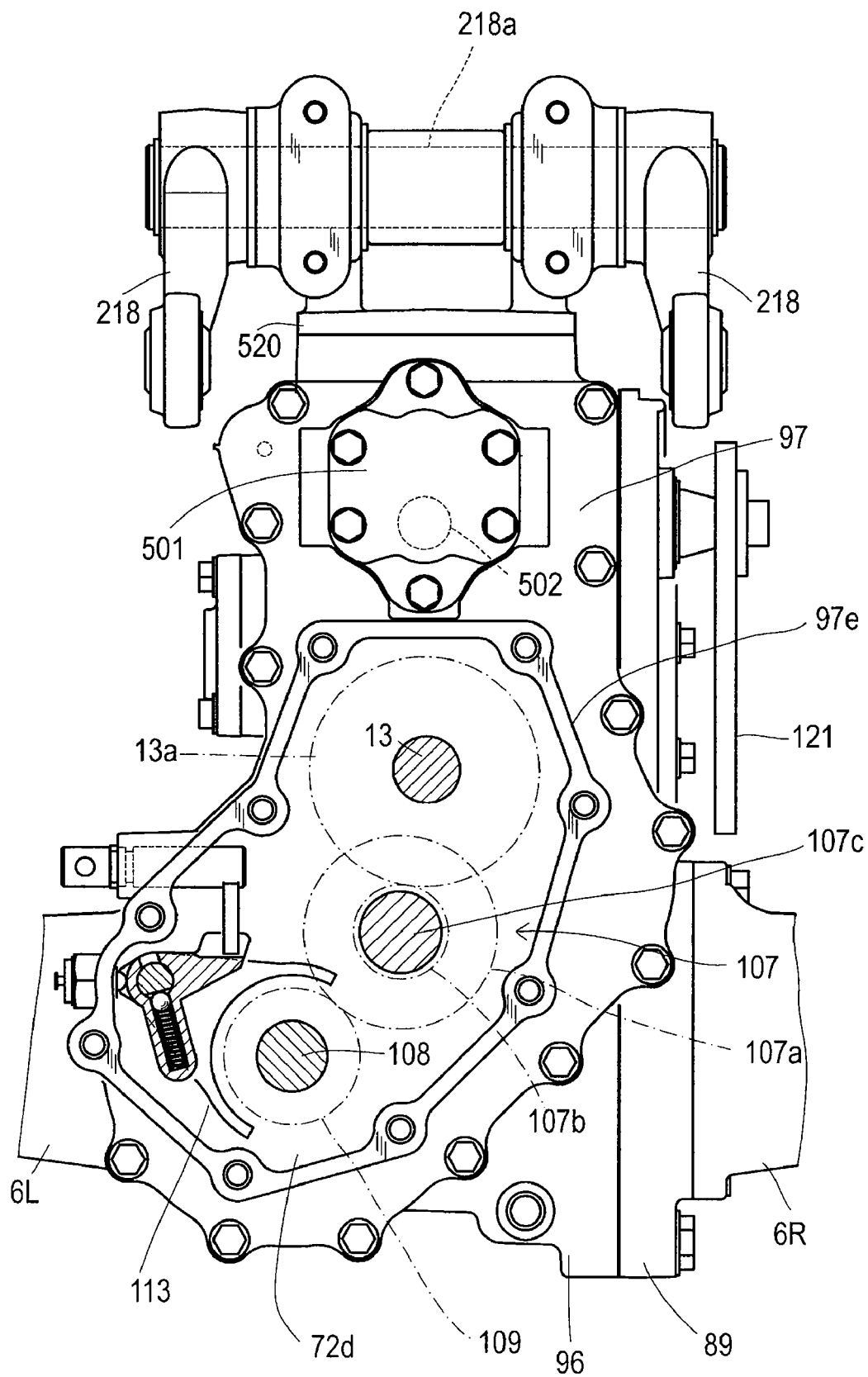
FIG. 41 is a rear view of main hydrostatic transaxle 3 or 35 with rear auxiliary pump unit 500, including a sectional rear view of a rear PTO gear chamber 72d.
Figure 42:
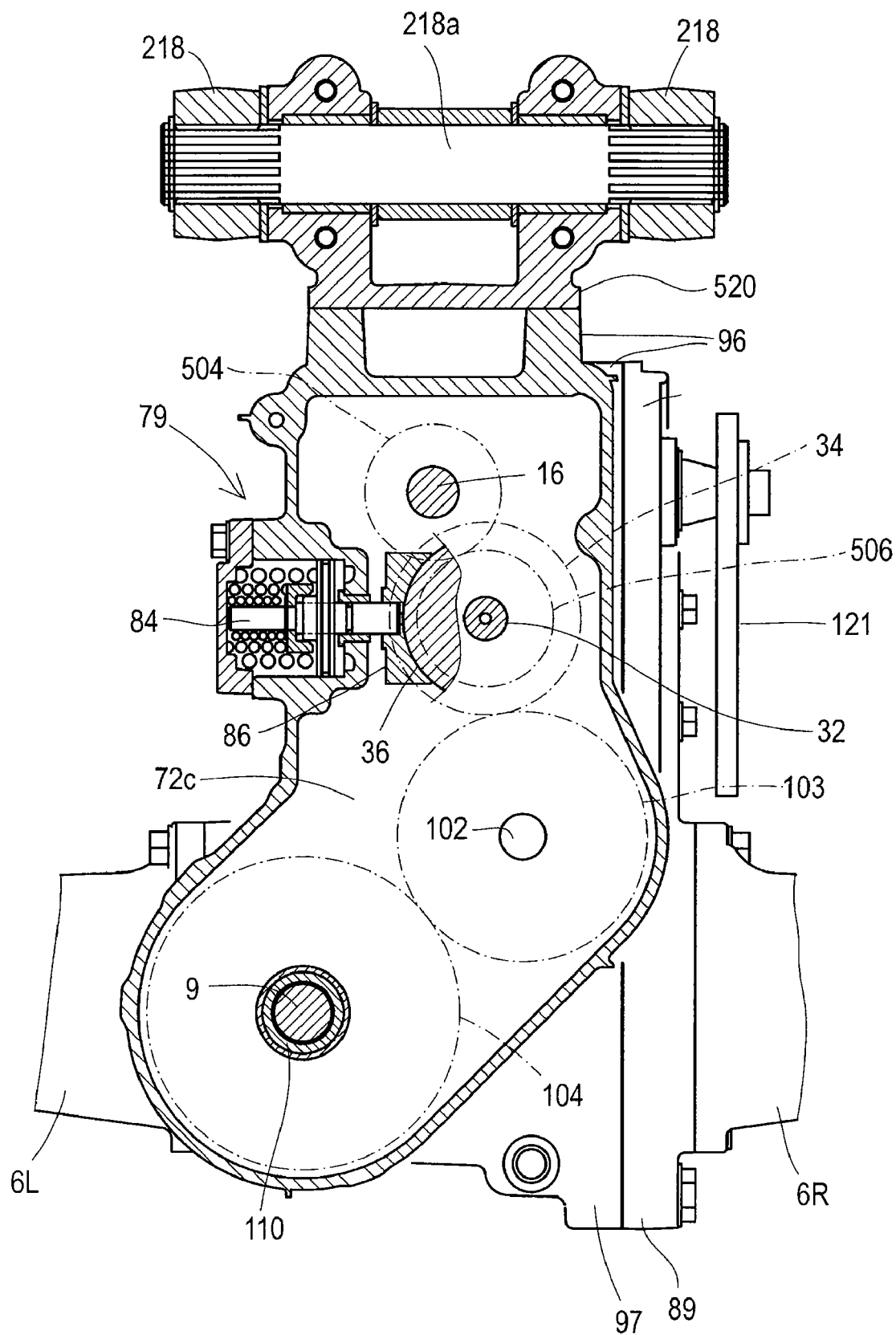
FIG. 42 is a sectional rear view of main hydrostatic transaxle 3 or 35 shown in FIGS. 40 and 41, showing a front PTO gear chamber 72c.

Referring to FIGS. 2 to 11, hydrostatic transaxle 3 is configured so as to transmit power to front wheels 5R and 5L through a mechanical transmission device including propeller shaft 52 as shown in FIG. 1. The configuration of hydrostatic transaxle 3 shown in FIGS. 2 to 11 and a hydraulic circuit system shown in FIG. 11 for vehicle 1 of FIG. 1 with transaxle 3 will be described. Incidentally, FIGS. 41 and 42 are referred to as they illustrate hydrostatic transaxle 3 on the assumption that a later-discussed auxiliary pump unit 500, a fluid passage structure for auxiliary pump unit 500 and some different structures are ignored.

Figure 2:
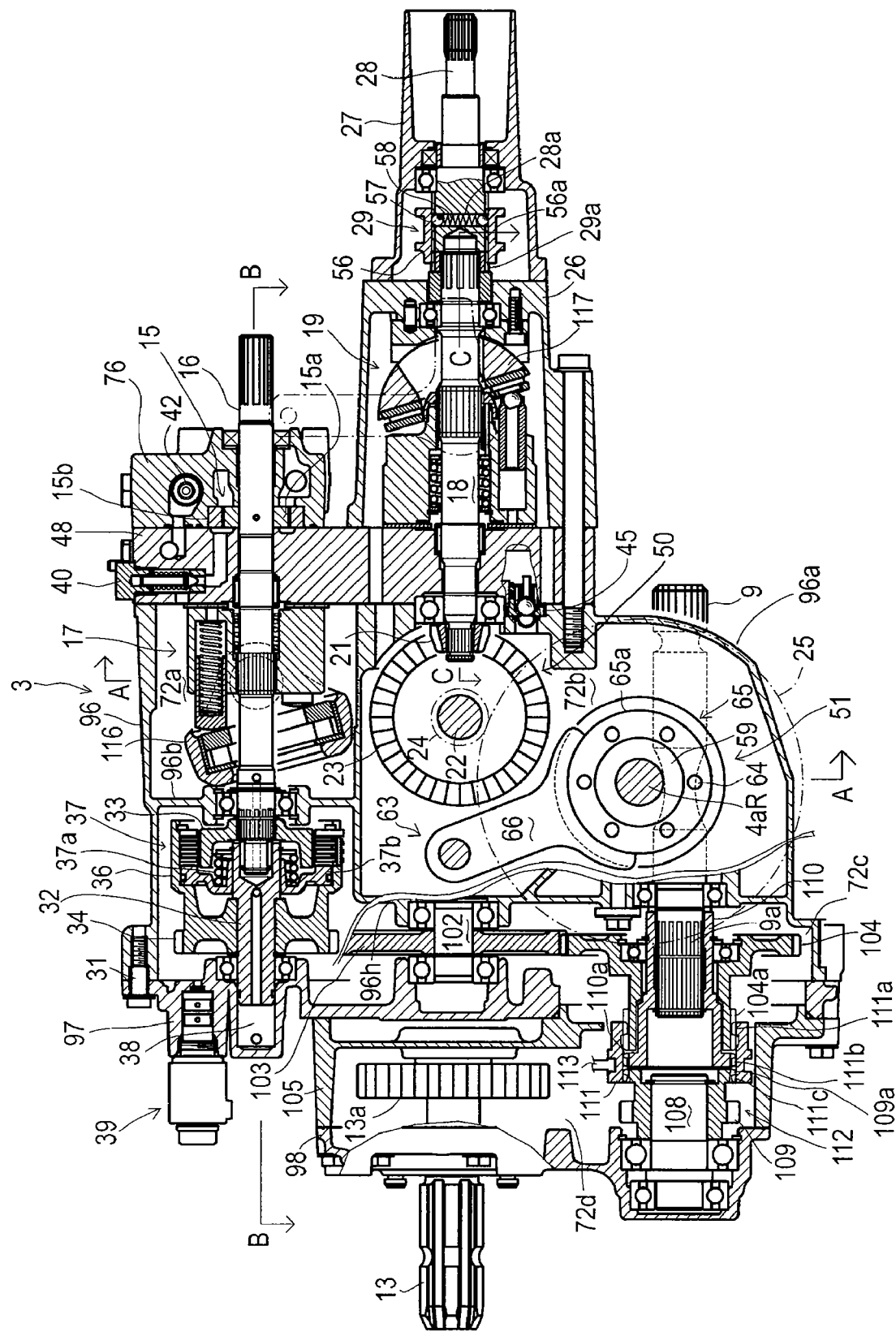
FIG. 2 is a sectional side view of main hydrostatic transaxle 3.

As shown in FIG. 2 and others, a front casing part 96, a rear casing part 97 and a rear cover 98 are joined to one another so as to constitute a main casing of transaxle 3. The main casing of transaxle 3 incorporates hydraulic pump 17 of HST 20, a differential unit 51 differentially connecting right and left axles 4aR and 4aL to each other, a deceleration gear train 50 interposed between an output shaft 18 of HST 20 and differential unit 51, and a PTO gear train interposed between input shaft 16 and mid and rear PTO shafts 9 and 13.

Figure 4:
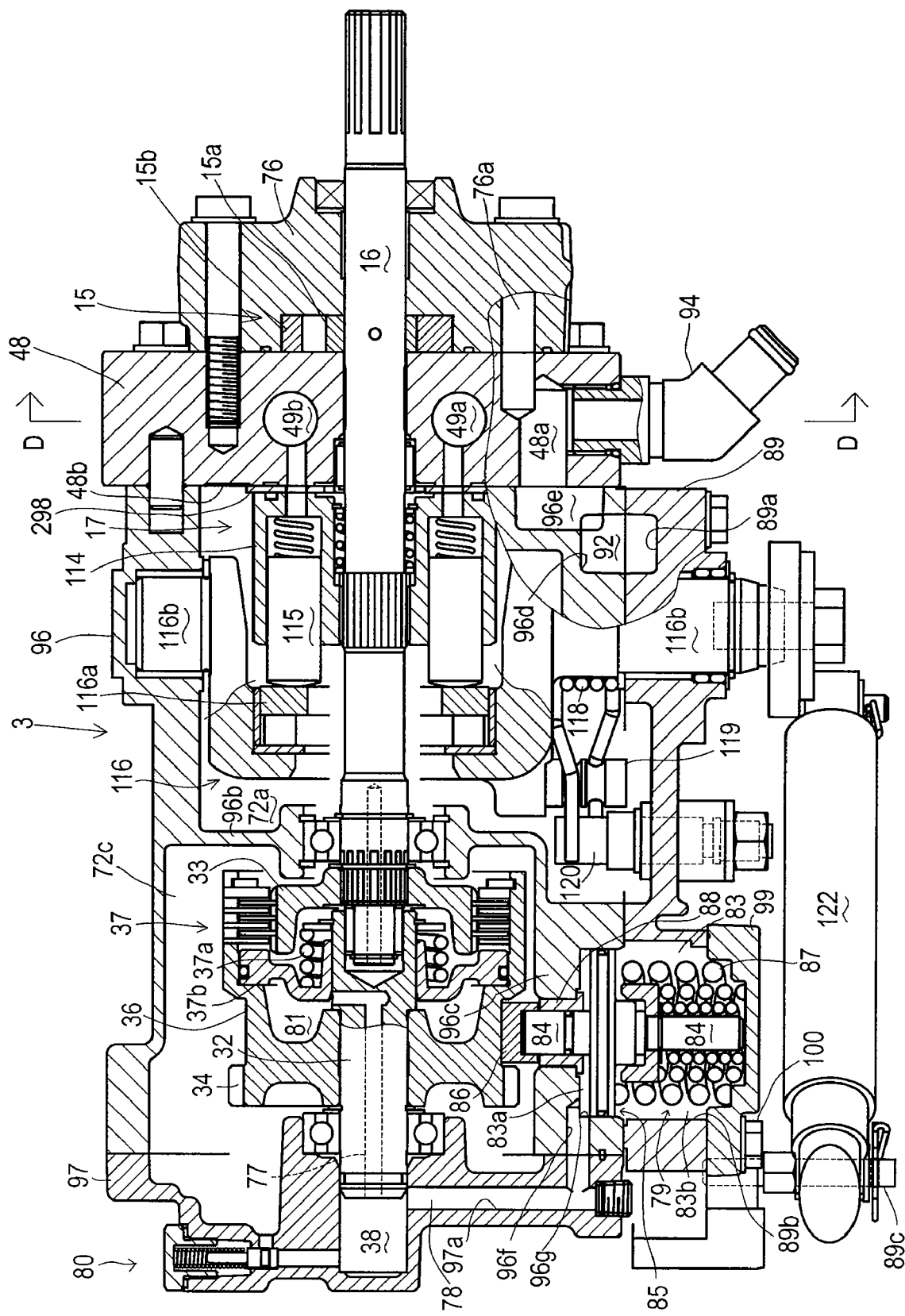
FIG. 4 is a cross sectional view taken along B-B line of FIG. 2.
Figure 10:
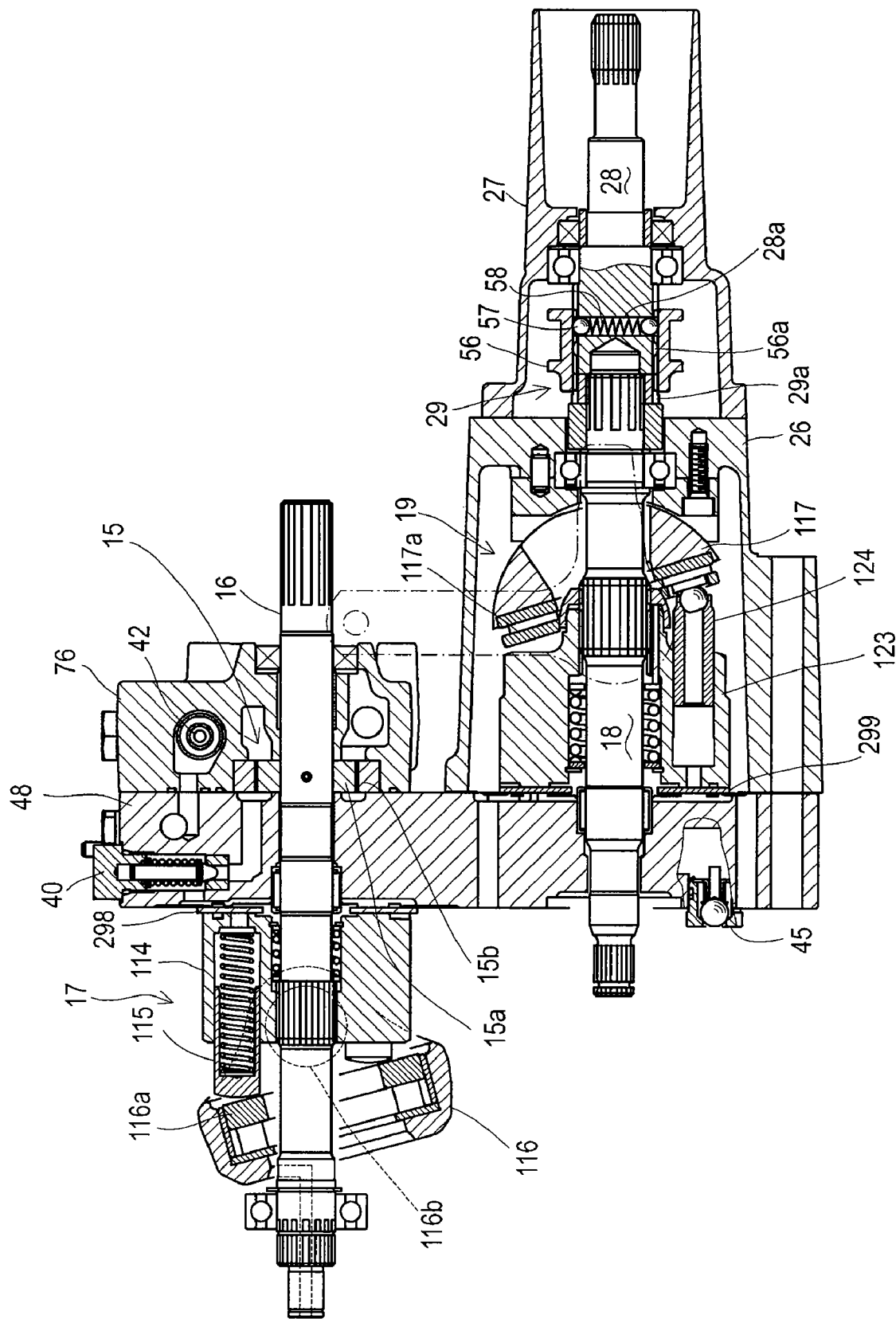
FIG. 10 is a fragmentary sectional side view of main hydrostatic transaxle 3, showing mechanical drive-mode change clutch 29 therein.

As shown in FIG. 2 and others, a duct plate 48 is fixed onto a vertical front surface of the main casing of transaxle 3, i.e., a vertical front surface of an upper portion of front casing part 96. A lower portion of front casing part 96 below duct plate 48 has a front wall 96a (see FIG. 8), from which mid PTO shaft 9 projects forward. A charge pump casing 76 is fixed onto an upper portion of a vertical front surface of duct plate 48 so as to incorporate a trochoidal charge pump 15, including an inner rotor 15a fixed on input shaft 16 and an outer rotor 15b surrounding inner rotor 15a, as shown in FIGS. 2, 4 and 10. Input shaft 16 is inserted into the upper portion of front casing part 96 through charge pump casing 76, inner rotor 15a of charge pump 15, and duct plate 48. Input shaft 16 projects forward from charge pump casing 76 so as to be drivingly connected to engine 14 through propeller shaft 2 and the universal joints.

Figure 5:
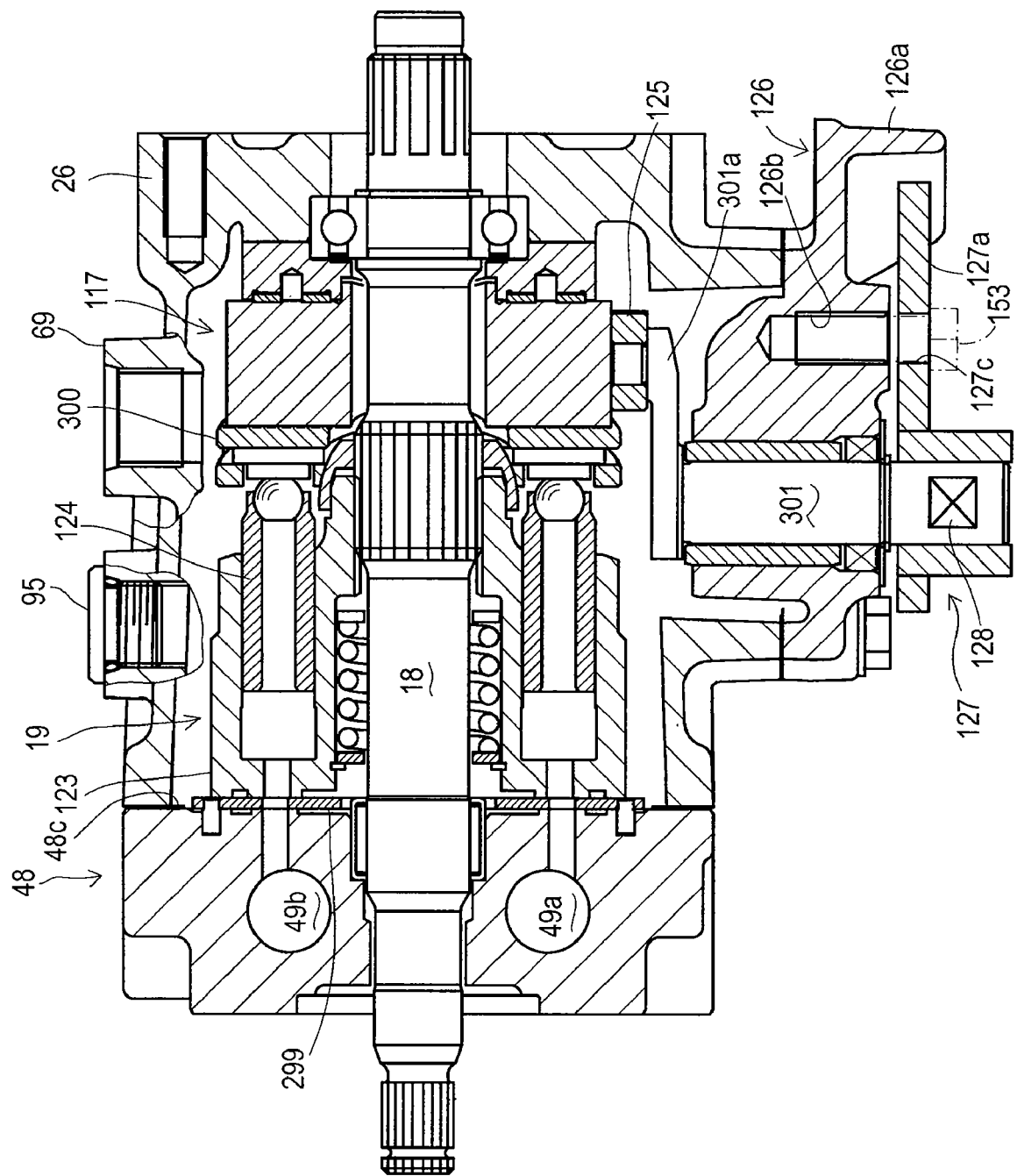
FIG. 5 is a cross sectional view taken along C-C line of FIG. 2.

Referring to FIGS. 2, 4, 5, 7 and 11, to constitute HST 20 in transaxle 3, duct plate 48 is formed with a vertical pump mounting surface 48b on an upper portion of its vertical rear surface, as shown in FIG. 4, and hydraulic pump 17 is fitted onto pump mounting surface 48b in front casing part 96 so as to be driven by input shaft 16. Also, duct plate 48 is formed with a vertical motor mounting surface 48c on a lower portion of its vertical front surface, as shown in FIG. 5, and a hydraulic motor 19 with an output shaft 18 is fitted onto motor mounting surface 48c in a motor casing 26 so as to be fluidly connected to hydraulic pump 17 through main ducts 49a and 49b (a main passage 49 as a generic name) formed in duct plate 48.

To steplessly control the rotary speed and direction of output shaft 18, hydraulic pump 17 is provided with a movable pump swash plate 116, and hydraulic motor 19 is provided with a movable motor swash plate 117. Pump swash plate 116 is operatively connected to main-speed control pedal 305 shown in FIG. 1, and motor swash plate 117 is operatively connected to sub-speed control lever 174 shown in FIG. 1.

Figure 6:
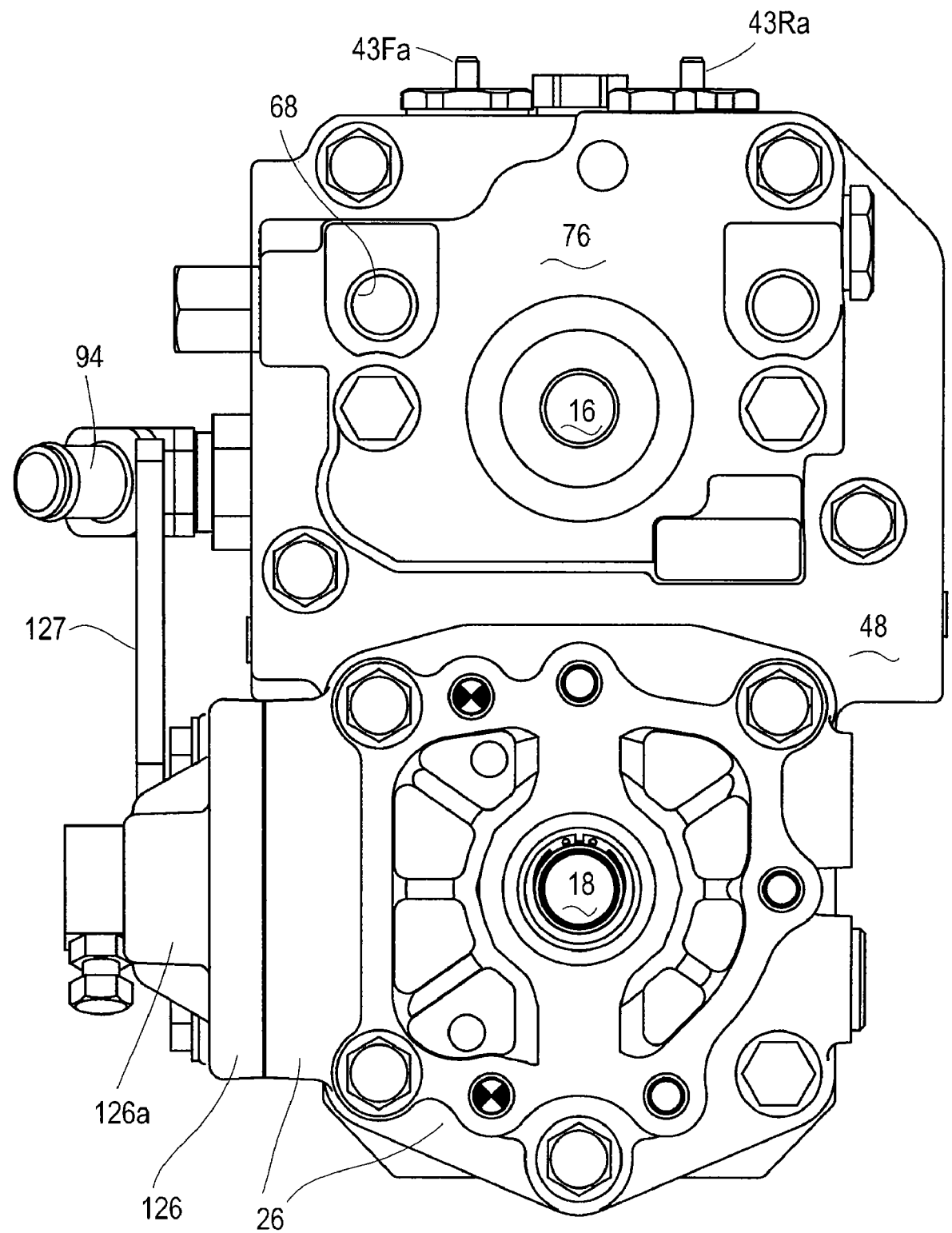
FIG. 6 is a front vide of main hydrostatic transaxle 3.
Figure 11:
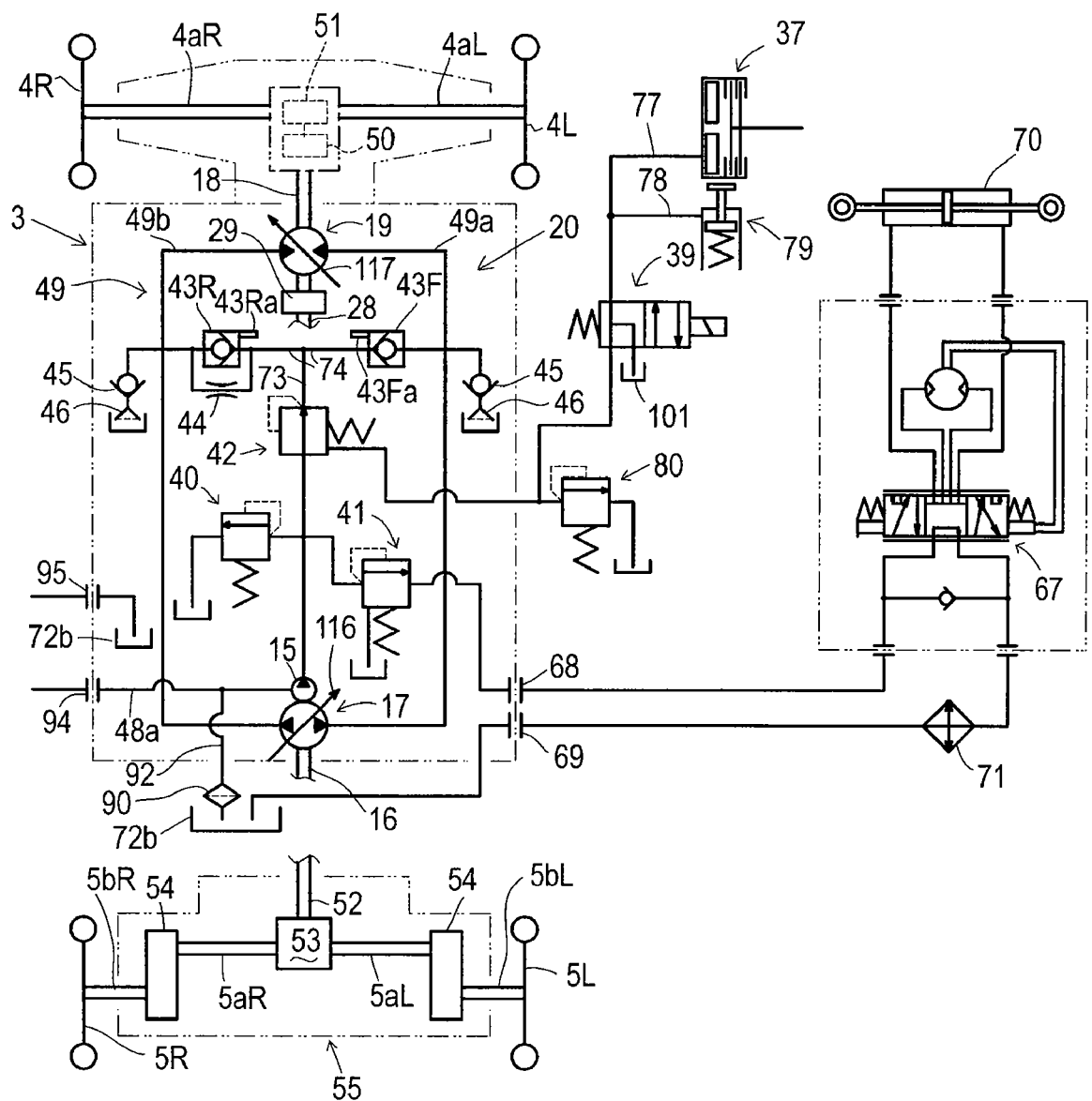
FIG. 11 is a hydraulic circuit diagram of the vehicle of FIG. 1 with main hydrostatic transaxle 3.
Figure 35:
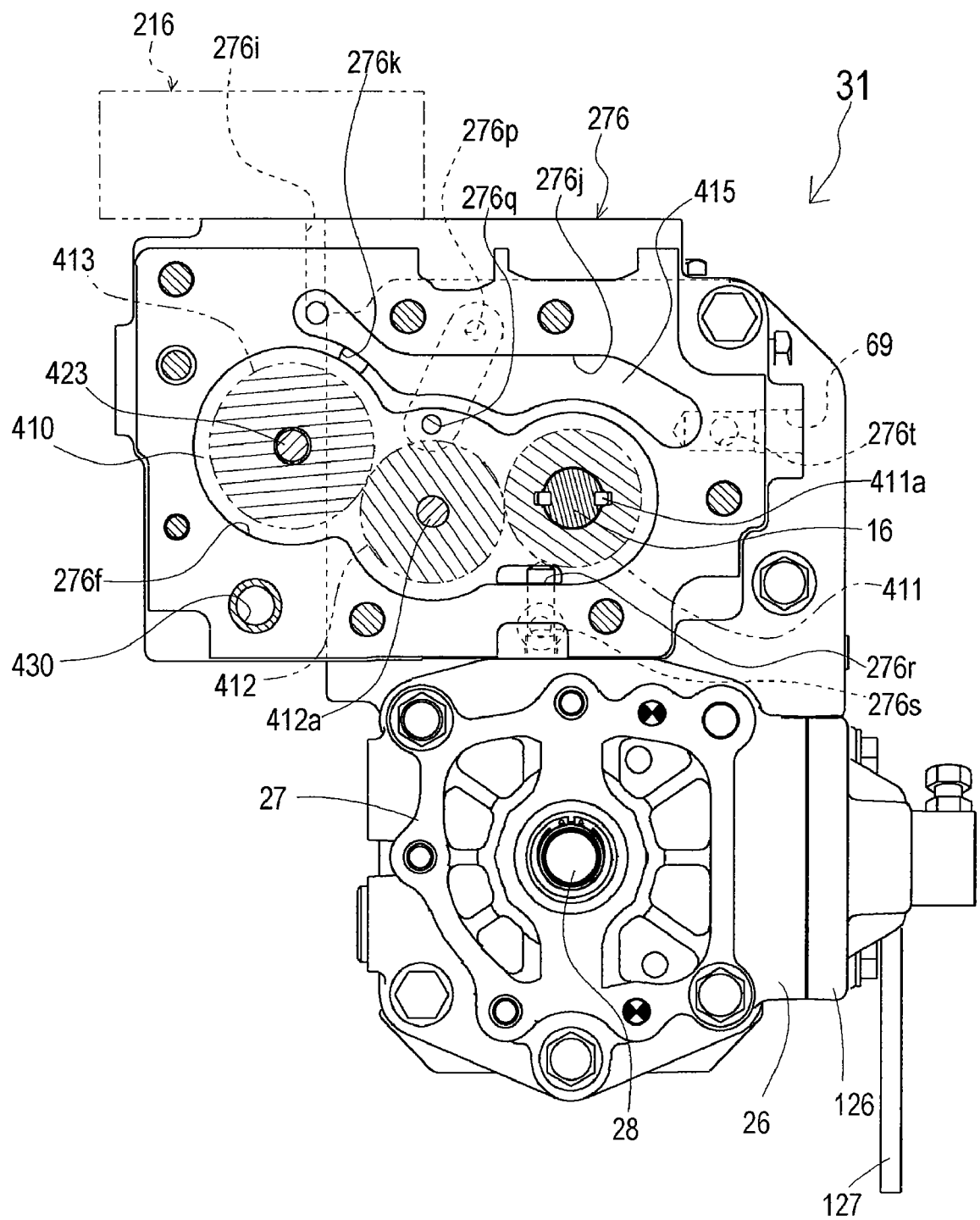
FIG. 35 is a front view partly in section of front unit 31, showing a fluid passage structure and the gear train to auxiliary pump unit 400.

As shown in FIGS. 2 and 11, a relief valve 40 is fitted downward into duct plate 48 so as to regulate the pressure of fluid delivered from charge pump 15. As shown in FIG. 11, a resistance valve 41 is also connected to the delivery passage from charge pump 15, so as to branch fluid from the delivery passage to a power steering control valve 67 disposed on the outside of transaxle 3 through a fluid extraction port 68 provided on the casing of transaxle 3 (in detail, on a front surface of charge pump casing 76 as shown in FIG. 6). Power steering control valve 67 is operatively connected to steering wheel 8 so as to control fluid supply to a power steering cylinder 70 for steering front wheels 5R and 5L. Power steering control valve 67 returns fluid drained from power steering cylinder 70 to a fluid sump in a traveling gear chamber 72b through a fluid returning port 69 formed on the casing of transaxle 3. As shown in FIG. 2, traveling gear chamber 72b is formed in a front lower portion of front casing part 96 so as to incorporate deceleration gear train 50 and differential unit 51. Alternatively, fluid returning port 69 is provided on charge pump casing 76, for instance, so as to return fluid into a pump chamber 72a, similarly to that shown in FIG. 35 illustrating later-discussed hydrostatic transaxle 3 (or 35) provided with an alternative duct plate 348, an alternative charge pump casing 276 and an auxiliary pump unit 400. Pump chamber 72a is formed in an upper front portion of front casing part 96 above traveling gear chamber 72b so as to incorporate hydraulic pump 17.

Figure 7:
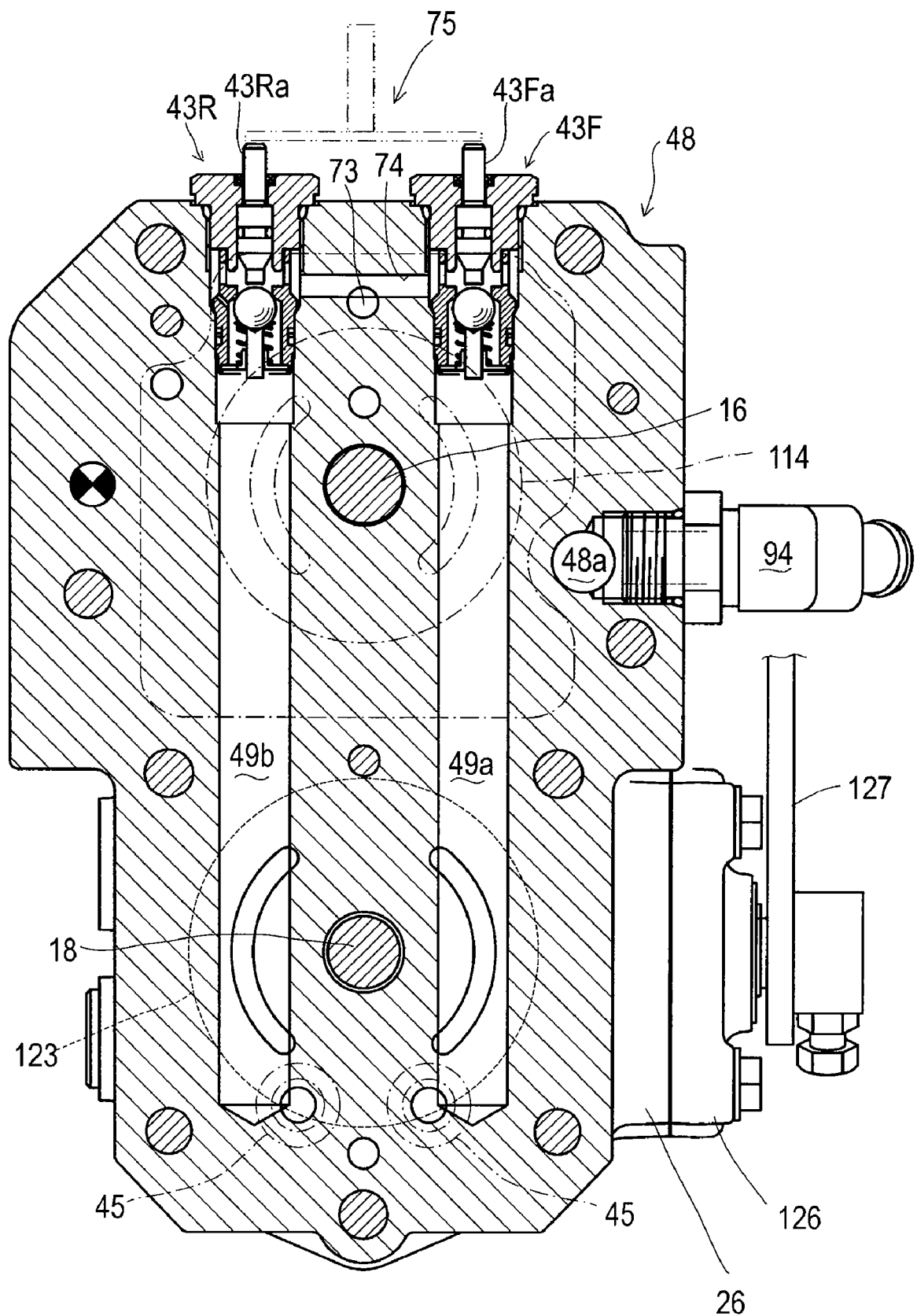
FIG. 7 is a cross sectional view taken along D-D line of FIG. 4.

As shown in FIG. 2, a reducing valve 42 is disposed in charge pump casing 76 so as to regulate pressure of fluid delivered from charge pump 15. The fluid released from reducing valve 42 is supplied to a PTO switching valve 39 of a later-discussed main PTO clutch 37. As shown in FIG. 7, a fore-and-aft duct 73 and a lateral duct 74 are bored in duct plate 48 between main ducts 49a and 49b. A pair of charge check valves 43F and 43R are fitted into respective main ducts 49a and 49b so as to be interposed between duct 74 and respective main ducts 49a and 49b. During circulation of fluid between hydraulic pump 17 and motor 19, one of main ducts 49a and 49b is hydraulically depressed, and then, corresponding charge check valve 43F or 43R is opened to supply the pressure fluid regulated by reducing valve 42 into the depressed main duct 49a or 49b.

Charge check valves 43F and 43R are provided with respective pushpins 43Fa and 43Ra projecting outward from duct plate 48 so as to be connected together to a bypass operation member 75 disposed on the outside of (above) duct plate 48. To tow vehicle 1, a bypass operation device (not shown) is manipulated to push down pushpins 43Fa and 43Ra through bypass operation member 75, so as to open both bypass valves 43F and 43R, thereby draining fluid from main passage 49 and allowing hydraulic motor 19 to freely rotate following rotation of wheels 4R and 4L.

As shown in FIGS. 7 and 11, charge check valve 43R is provided with a bypassing orifice 44 so as to expand a neutral zone of hydraulic pump 17 into its backward traveling range. As shown in FIGS. 2, 7, 10 and 11, additionally, a filter 46 and a check valve 45 are interposed between the fluid sump of traveling gear chamber 72b in front casing part 96 (behind duct plate 48) and each of main ducts 49a and 49b. When engine 14 is stationary and vehicle 1 is parked on a slope, fluid may leak out from the closed fluid circuit in duct plate 48 between hydraulic pump 17 and motor 19. At this time, check valve (or valves) 45 is (are) opened to supply fluid from the fluid sump to the closed fluid circuit through filter (or filters) 46.

Figure 3:
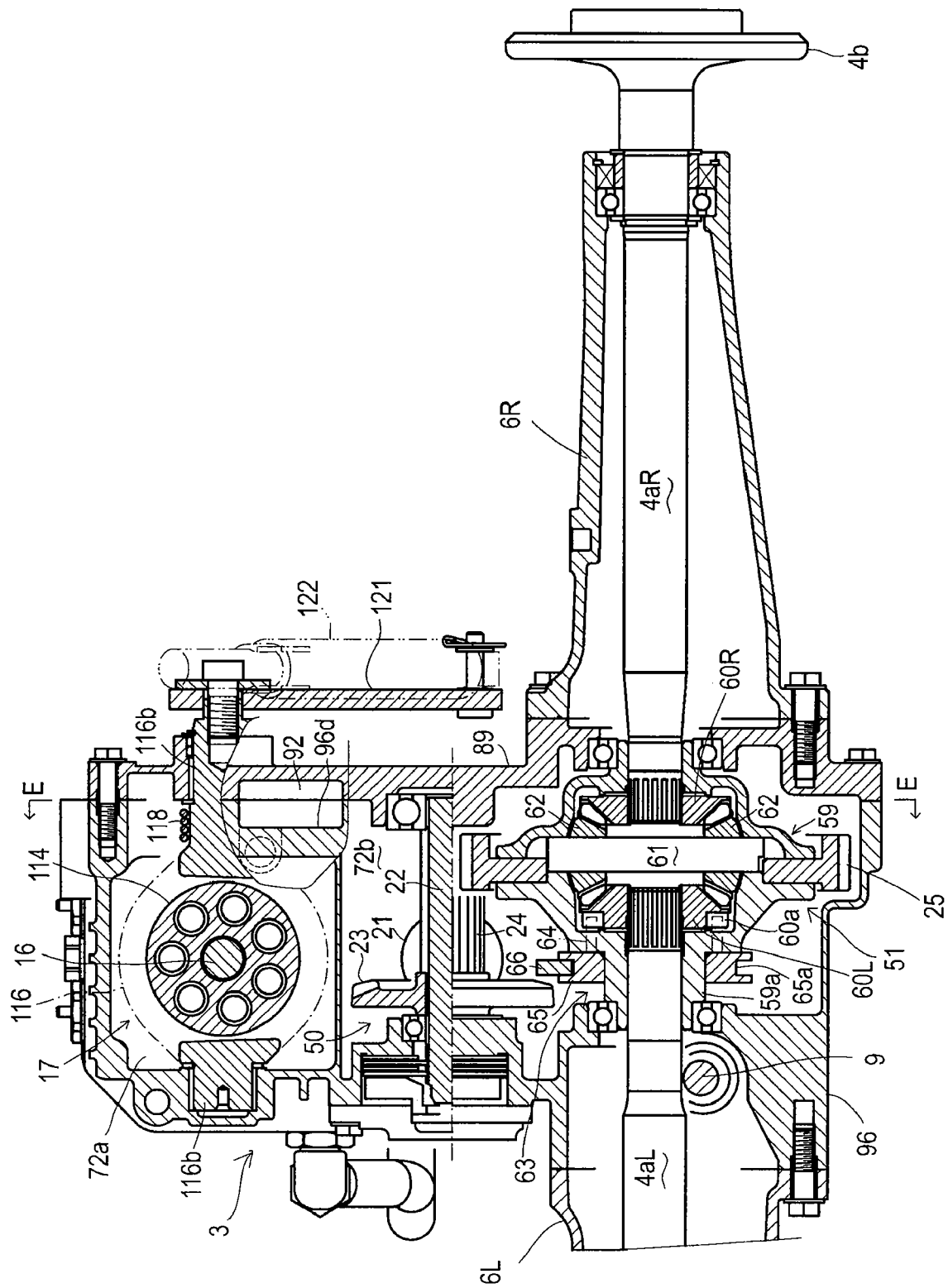
FIG. 3 is a cross sectional view taken along A-A line of FIG. 2.
Figure 8:
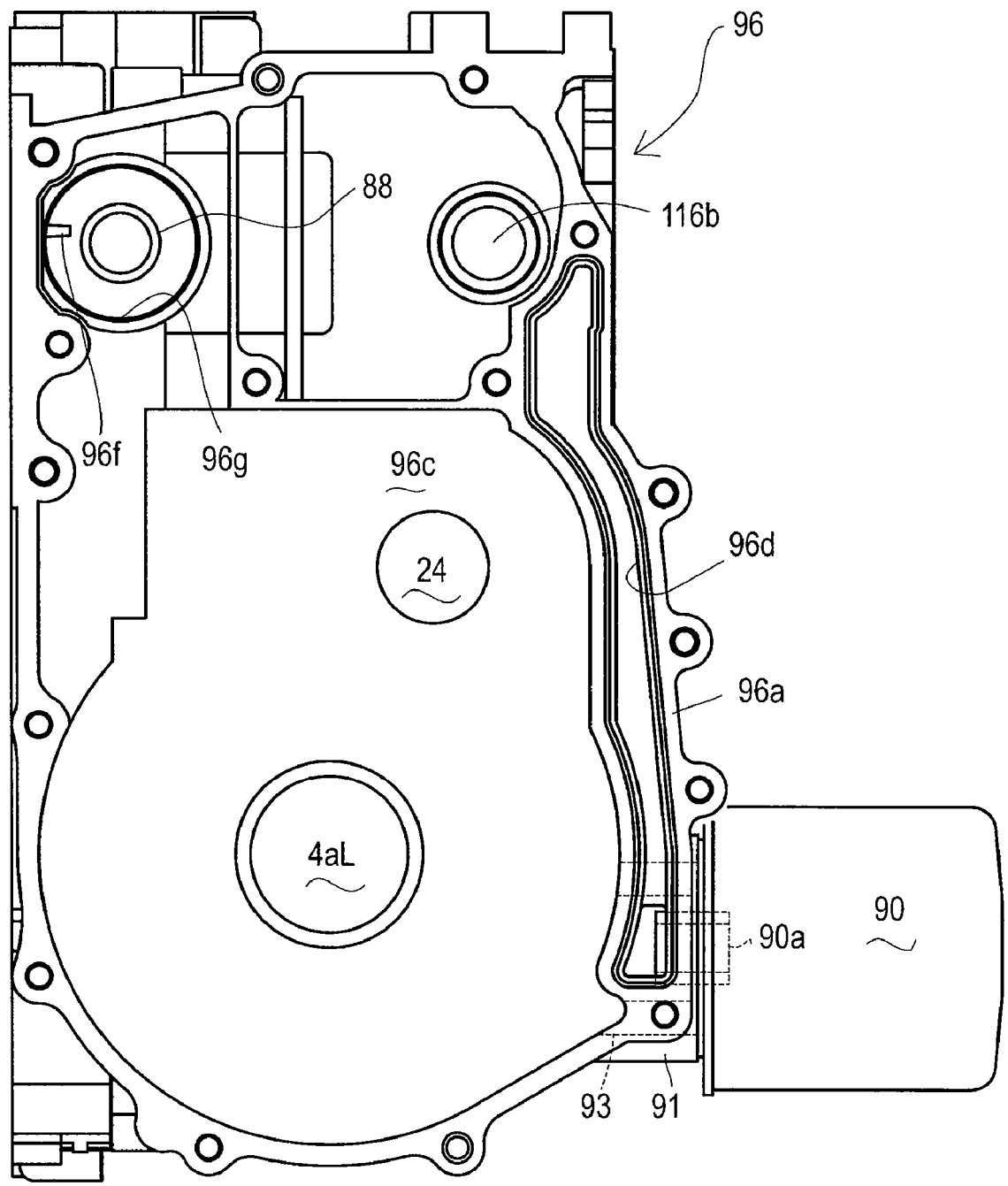
FIG. 8 is a cross sectional view taken along E-E line of FIG. 3.

As shown in FIGS. 3, 4, 7, 8 and 11, front casing part 96 has an opened right side wall 96c, onto which a side cover 89 is fastened. As shown in FIG. 8, a filter mount portion 91 is formed on a right portion of front wall 96a of front casing part 96, and a filter 90 is mounted onto filter mount portion 91. Filter 90 has an inlet port (not shown) fluidly connected to the fluid sump in traveling gear chamber 72b. Right side wall 96c and side cover 89 joined to each other are formed therebetween with respective fluid grooves 96d and 89a, which are joined to each other so as to constitute a fluid duct 92, as shown in FIGS. 3 and 4. Filter 90 has an outlet port 90a fluidly connected to a lower end of fluid duct 92. As shown in FIG. 4, a fluid duct 96e is extended forward from an upper portion of fluid duct 92 (fluid groove 96d) in front casing part 96, a suction port 76a to charge pump 15 is formed in charge pump casing 76, and a connection duct 48a is formed in duct plate 48 interposed between charge pump casing 76 and front casing part 96, so that fluid duct 96e is opened to suction port 76a through connection duct 48a.

As shown in FIGS. 4, 7, 9 and 11, a fluid extraction port 94 is fitted onto duct plate 48 and fluidly connected to connection duct 48a, so as to extract fluid for a working machine. The casing of transaxle 3 (duct plate 48) is provided with a fluid returning port 95 for returning fluid to the fluid sump of traveling gear chamber 72b in the casing of transaxle 3 (i.e., front casing part 96).

The casing of transaxle 3 (i.e., front casing part 96) is formed therein with a pump chamber 72a incorporating hydraulic pump 17. While transaxle 3 is driven, the fluid temperature increased in traveling gear chamber 72b is smaller than that in pump chamber 72a. Due to the above configuration, charge pump 15 for supplying fluid to HST 20 sucks fluid from the fluid sump in traveling gear chamber 72b through filter 90, fluid ducts 92 and others, so as to restrain the increased temperature of fluid circulated in HST 20, thereby improving the durability of HST 20. Further, filter 90 and its surrounding implements are concentrated on or in front casing part 96 without requiring an additional pipe. Due to such a simple, compact and inexpensive duct structure, the fluid in traveling gear chamber 72b is distributed between HST 20 and the external hydraulically driven implements.

As shown in FIGS. 2 and 3, output shaft 18 is extended rearward into traveling gear chamber 72b in front casing part 96 through duct plate 48. A small bevel pinion 21 is fixed on a rear end of output shaft 18 in front casing part 96, and meshes with a large bevel gear 23 on a lateral counter shaft 22 supported in front casing part 96. A gear 24 is formed on an outer peripheral surface of counter shaft 22 outward from gear 23. In this way, gears 21, 22 and 23 constitute deceleration gear train 50 disposed in traveling gear chamber 72b.

As shown in FIG. 3, differential unit 51 is disposed in traveling gear chamber 72b so as to differentially connect proximate ends of right and left axles 4aR and 4aL to each other. As shown in FIGS. 3, 41 and 42, side cover 89 journals right axle 4aR through a bearing, and front casing part 96 journals left axle 4aL through a bearing. A pair of right and left rear axle casings 6R and 6L are fixed onto side cover 89 and the left side surface of front casing part 96, respectively, so as to support respective axles 4aR and 4aL. Distal ends of axles 4aR and 4aL project outward from respective rear axle casings 6R and 6L so as to be formed into flanges 4b onto which respective rear wheels 4R and 4L are fixed.

As shown in FIG. 3, differential unit 51 includes a differential cage 59, on which a bull gear 25 serving as an input gear of differential unit 51 is fixed so as to mesh with gear 24 formed on counter shaft 22. The proximate ends of axles 4aR and 4aL are inserted into differential cage 59 so as to be fixedly provided thereon with respective differential side gears 60R and 60L. A differential pinion shaft 61 is supported in differential cage 59 in perpendicular to axles 4aR and 4aL, and opposite differential pinions 62 are pivoted on differential pinion shaft 61. Each differential pinion 62 meshes with both differential side gears 60R and 60L. In this way, differential unit 51 is configured so as to receive power from output shaft 18 through deceleration gear train 50, and to distribute the power between right and left rear wheels 4R and 4L.

As shown in FIG. 3, differential unit 51 is provided with a differential lock mechanism 63. In this regard, differential cage 59 is formed with a boss 59a axially extended on one (left) axle 4aL. A differential lock slider 65 with an annular groove 65a is axially slidably fitted on boss 59a. A fork 66 is fitted into groove 65a of differential lock slider 65, and is operatively connected to a differential locking manipulator (not shown). A plurality of lock pins 64a are axially extended from a proximal side surface of differential lock slider 62, and slidably penetrate differential cage 59, so that lock pins 64a can be inserted into respective recesses 60a formed on one (left) differential side gear 60L.

Differential lock slider 65 is normally disposed at a differential position so as to remove lock pins 64a from recesses 60a, thereby allowing axles 4aR and 4aL to differentially rotate. When the differential lock operation device is operated for differential locking, differential lock slider 65 is slid to a differential lock position so as to engage lock pins 64a into recesses 60a, thereby differentially unrotatably locking axles 4aR and 4aL to each other.

As shown in FIGS. 1, 2 and 10, motor casing 26 is fixed to the lower front surface of duct plate 48 and extended forward so as to incorporate hydraulic motor 19. A drive-mode change clutch casing 27 is fixed onto a front surface of motor casing 26. A front end of output shaft 18 is inserted into drive-mode change clutch casing 27, and fitted into a rear end portion of a coaxial front-wheel driving output shaft 28. Front-wheel driving output shaft 28 is exposed at its front end so as to be drivingly connected to a differential unit 53 in front transaxle 55 through propeller shaft 52 and the universal joints.

As shown in FIG. 11, in front transaxle 55, right and left differential output shafts 5aR and 5aL are differentially connected at their proximal ends to each other through differential unit 53. Right and left steerable transmission units 54, supporting respective axles 5bR and 5aL, are steerably fitted onto right and left ends of front transaxle 55, so as to be drivingly and steerably connected to respective differential output shafts 5aR and 5aL. Front wheels 5R and 5L are fixed on distal ends of respective axles 5bR and 5aL, so as to serve as steerable drive wheels.

A mechanical drive-mode change clutch 29 is interposed between output shaft 18 and front-wheel driving output shaft 28 in drive-mode change clutch casing 27. In this regard, a spline hub 29a is axially and peripherally immovably spline-fitted on the outer peripheral surface of output shaft 18 just behind front-wheel driving output shaft 28. A cylindrical clutch slider 56 is axially slidably spline-fitted on an outer peripheral surface of front-wheel driving output shaft 28, so that it can be spline-fitted onto an outer peripheral spline of output shaft 18. Further, clutch slider 56 is formed on its inner peripheral surface with a pair of front and rear grooves 56a, which are juxtaposed in the axial direction for defining a two-wheel drive mode position (clutch-off position) and a four-wheel drive mode position (clutch-on position), respectively. Clutch slider 56 is operatively connected through a fork or the like to a drive-mode change manipulator (not shown). Front-wheel driving output shaft 28 is penetrated by a diametric hole 28a, into which a compressed spring 58 and a pair of detent balls 57 disposed on opposite ends of spring 58 are fitted.

By rearward sliding clutch slider 56, detent balls 57 are fitted into rear groove 56a of clutch slider 56 defining the four-wheel drive mode position, and clutch slider 56 fitted on front-wheel driving output shaft 28 is also spline-fitted on spline hub 29a so as to rotatably integrally engage front-wheel driving output shaft 28 to output shaft 18, thereby transmitting the rotary force of output shaft 18 of HST 20 to front wheels 5L and 5R. By forward sliding clutch slider 56, detent balls 57 are fitted into front groove 56a of clutch slider 56 defining the two-wheel drive mode position, and clutch slider 56 is separated from spline hub 29a and fitted on only front-wheel driving output shaft 28, so as to isolate front-wheel driving output shaft 28 from the rotary force of output shaft 18, thereby preventing the output force of HST 20 from being transmitted to front wheels 5L and 5R.

As shown in FIG. 2, a vertical partition wall 96b is formed in an upper portion of front casing part 96 so as to define a rear end of pump chamber 72a, and a vertical partition wall 96h is formed in a lower portion of front casing part 96 under partition wall 96b so as to define a rear end of traveling gear chamber 72b. Rear casing part 97 is fastened to a rear end surface of front casing part 96 so as to cover a rear end opening of front casing part 96. A front PTO gear chamber 72c is formed between front and rear casing parts 96 and 97 behind partition walls 96b and 96h, i.e., behind chambers 72a and 72b.

As shown in FIGS. 2, 4, 8 and 11, input shaft 16 is extended rearward from hydraulic pump 17 and journalled by partition wall 96b through a bearing. In front PTO gear chamber 72c, a PTO clutch shaft 32 is disposed coaxially to input shaft 16 and journalled by rear casing part 97 through a bearing. The rear end of input shaft 16 is relatively rotatably fitted into a front end portion of PTO clutch shaft 32. A main PTO clutch 37 is disposed in an upper portion of front PTO gear chamber 72c just behind partition wall 96b so as to be interposed between input shaft 16 and PTO clutch shaft 32.

In front PTO gear chamber 72c, a rotary member 33 is fixed on input shaft 16 in front of PTO clutch shaft 32, and a rotary drum 36 is fixed on PTO clutch shaft 32 and extended forward around rotary member 33. Friction disks, axially slidably fitted onto an outer peripheral surface of rotary member 33, and friction disks, axially slidably fitted onto an inner peripheral surface of the forward extended portion of rotary drum 36, are alternately aligned. A piston 37b is disposed between the rearmost friction disk and a rear boss portion of rotary drum 36 fixed on PTO clutch shaft 32, so that it can be pushed forward by hydraulic pressure to press the friction disks against one another. A spring 37a is wound around a center boss of piston 37b on PTO clutch shaft 32 so as to bias piston 37b rearward against the hydraulic pressure for forward moving piston 37b. In this way, rotary member 33, rotary drum 36, the friction disks between rotary member 33 and rotary drum 36, spring 37a and piston 37b constitute main PTO clutch 37 interposed between input shaft 16 and PTO clutch shaft 32.

A fluid duct 77 is formed in PTO clutch shaft 32. Fluid duct 77 is opened at one (front) end thereof to a clutch pressure fluid chamber 81 (see FIG. 4) behind piston 37b. Rear casing part 97 is formed with a fluid chamber 38 behind the rear end of PTO clutch shaft 32. Fluid duct 77 is opened at the other (rear) end thereof to fluid chamber 38.

As shown in FIG. 4, a brake 79 is disposed sidewise from main PTO clutch 37 so as to prevent disengaged main PTO clutch 37 from inertially rotating. A laterally penetrating hole 89b in side cover 89 is joined to a recess 96g formed on an outer surface of right side wall 96c of front casing part 96, and a brake accumulator cover 99 is fastened to side cover 89 by bolts 100 so as to cover the opening of hole 89b, thereby constituting a brake accumulator chamber 83 serving as an accumulator for brake 79.

A connection hole is formed in side wall 96c so as to connect front PTO gear chamber 72c around main PTO clutch 37 to recess 96g of brake accumulator chamber 83. A sleeve 88 is fitted in this connection hole. A piston 85 is slidably fitted in recess 96g. A center axial shaft 84 is extended from piston 85 in opposite directions, i.e., inward and outward in the lateral direction of transaxle 3, 50 as to be axially slidable integrally with piston 85. The inward extended portion of shaft 84 is axially slidably fitted through sleeve 88, and extended into front PTO gear chamber 72c so as to be fixedly provided on its proximal end with a friction member 86 facing the outer peripheral surface of rotary drum 36. Springs 87 having different spring forces are concentrically wound around the outward extended portion of shaft 84 in a space 83b of brake accumulator chamber 83 outward from piston 85 so as to bias piston 85 and shaft 84 toward main PTO clutch 37.

Brake accumulator chamber 83 has a space 83a between piston 85 and right side wall 96c of front casing part 96 in recess 96g. A fluid duct 96f is formed in right side wall 96c and opened at its front end to space 83a. Fluid duct 96f is extended rearward so as to be connected to fluid chamber 38 through a fluid duct 97a formed in rear casing part 97. Mutually joined fluid ducts 96f and 97a constitute a fluid duct 78.

As shown in FIG. 2, fluid chamber 38 is fluidly connected to PTO switching valve 39 for controlling main PTO clutch 37. PTO switching valve 39 is a three-port and two-position electromagnetic valve fitted on an external surface of rear casing part 97. Referring to FIG. 11, a pump port of PTO switching valve 39 is connected to a drain port of reducing valve 42 in charge pump casing 76, as mentioned above, so as to receive fluid drained from reducing valve 42. A relief valve 80 is fitted into rear casing part 97 so as to regulate the pressure of fluid from reducing valve 42 to PTO switching valve 39.

In vehicle 1, a switch for switching main PTO clutch 37 is disposed adjacent to driver's seat 7, and is operatively connected to PTO switching valve 39 for selecting either engagement or disengagement of main PTO clutch 37. To disengage main PTO clutch 37, PTO switching valve 39 is set at a position as shown in FIG. 11, so as to drain fluid to a fluid sump 101 (any fluid sump in transaxle 3, for instance) from the drain port of reducing valve 42, and from fluid chamber 38. The fluid drained from fluid chamber 38 means the fluid drained from clutch pressure fluid chamber 81 through fluid duct 77 and from space 83a of brake accumulator chamber 83 through fluid duct 78. In main PTO clutch 37, due to the draining of fluid from clutch pressure fluid chamber 81, piston 37b is pushed away from the friction disks by the force of spring 37a, so as to isolate PTO clutch shaft 32 from the rotary force of input shaft 16, i.e., disengage main PTO clutch 37. Simultaneously, in brake 79, due to the draining of fluid from space 83a of brake accumulator chamber 83, piston 85 is pushed toward main PTO clutch 37 by the force of springs 87, so as to press friction member 86 against rotary drum 36, thereby braking PTO clutch shaft 32 with rotary drum 36. Accordingly, mid PTO shaft 9 and rear PTO shaft 13 to be driven by PTO clutch shaft 32 are quickly stopped and prevented from inertially rotating.

To engage main PTO clutch 37, PTO switching valve 39 is set at the other position shown in FIG. 11, so as to supply fluid from the drain port of reducing valve 42 to fluid chamber 38, thereby supplying the fluid to clutch pressure fluid chamber 81 through fluid duct 77, and to space 83a of brake accumulator chamber 83 through fluid duct 78. In main PTO clutch 37, due to the supply of fluid to clutch pressure fluid chamber 81, piston 37b is pushed toward the friction disks against the force of spring 37a and press the friction disks against one another, so as to transmit the rotary force of input shaft 16 to PTO clutch shaft 32, i.e., to engage main PTO clutch 37. Simultaneously, in brake 79, due to the supply of fluid to space 83a of brake accumulator chamber 83, piston 85 is pushed away from main PTO clutch 37 against the force of springs 87, so as to separate friction member 86 from rotary drum 36, thereby releasing PTO clutch shaft 32 from the braking force of brake 79.

As shown in FIGS. 2 and 42, in front PTO gear chamber 72c, a counter shaft 102 is disposed horizontally under main PTO clutch 37, and is journalled at front and rear portions thereof by partition wall 96h and rear casing part 97 through respective bearings. An idle gear 13 is fixed on counter shaft 102 and meshes with a gear 34 formed on rotary drum 36 of main PTO clutch 37. Mid PTO shaft 9 is journalled by partition wall 96h, and extended rearward from partition wall 96h. A sleeve 110 is spline-fitted on an outer peripheral surface of the rearward extended portion of mid PTO shaft 9. A gear 104 is relatively rotatably fitted on sleeve 110 through a bearing, and meshes with idle gear 103.

Gear 104 serves as an input gear of a later-discussed sub PTO clutch 112.

As shown in FIG. 2, a rear PTO casing 105 is fixed onto rear casing part 97 so as to project rearward from rear casing part 97. Alternatively, referring to FIGS. 40 and 41, a rearward projecting portion 97e is integrally formed on rear casing part 97 so as to serve as rear PTO casing 105. Rear cover 98 is fixed to a rear end surface of rear PTO casing 105 so as to cover a rear end opening of rear PTO casing 105, so that a rear PTO gear chamber 72d for incorporating a rear PTO deceleration gear train 106 is formed in rear PTO casing 105 between rear casing part 97 and rear cover 98 behind front PTO gear chamber 72c.

Figure 40:
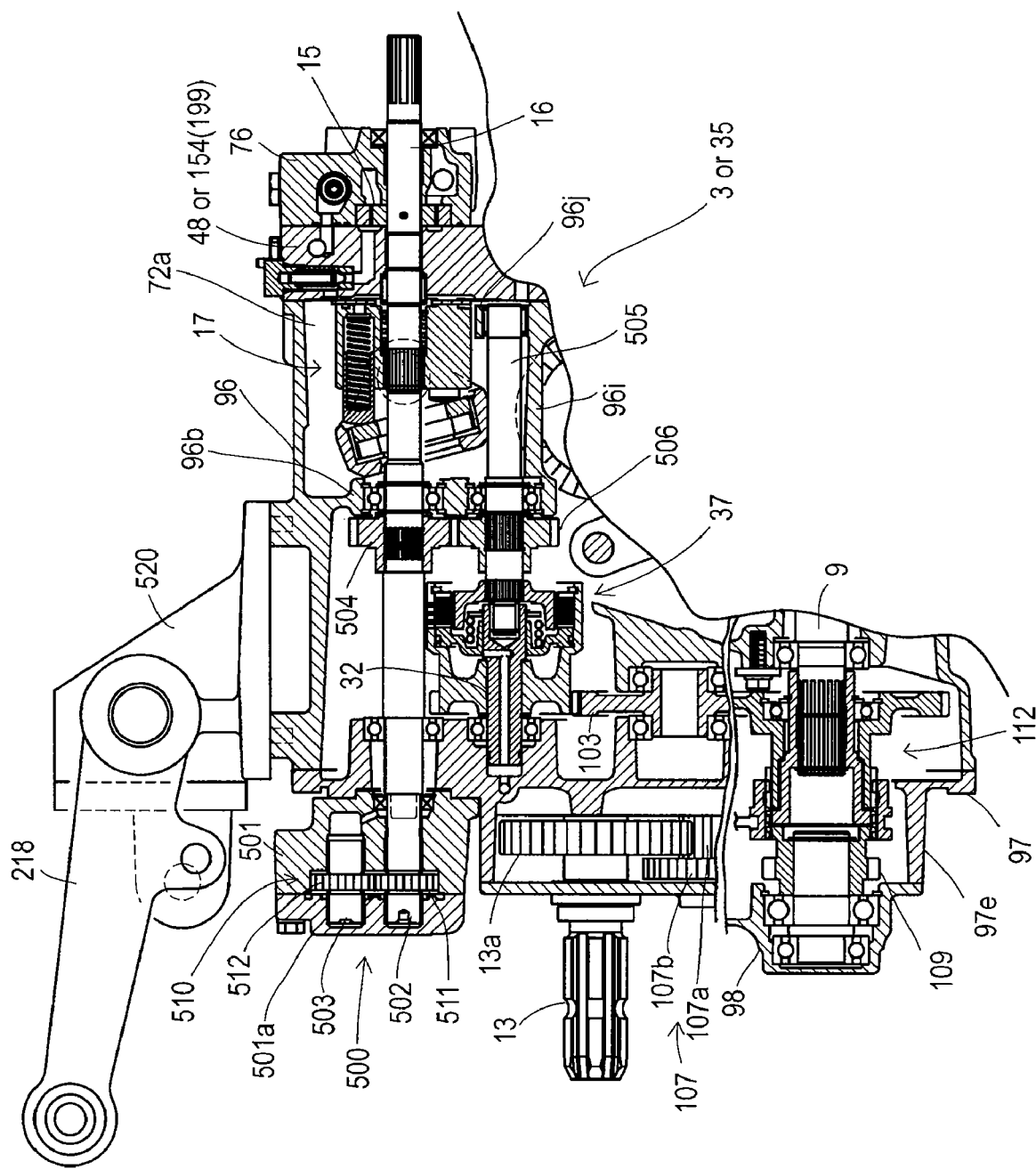
FIG. 40 is a sectional side view of main hydrostatic transaxle 3 or 35 provided on its rear end with an alternative auxiliary pump unit 500.

Rear PTO shaft 13 is disposed above mid PTO shaft 9, journalled at front and rear portions thereof by rear PTO casing 105 and rear cover 98 through respective bearings, and extended rearward from rear cover 98. Rear PTO deceleration gear train 106 is interposed between later-discussed sub PTO clutch 112 and rear PTO shaft 13. As best shown in FIGS. 40 and 41, rear PTO deceleration gear train 106 includes a gear 13a, a double gear 107 and a gear 109. Gear 13a is fixed on rear PTO shaft 13 in rear PTO casing 105. Gear 109 is spline-fitted on a support shaft 108. Support shaft 108 is coaxially extended rearward from mid PTO shaft 9, and is journalled by rear cover 98 through bearings. Double gear 107 is provided on a counter shaft 107c supported in rear PTO gear chamber 72d between rear casing part 97 and rear cover 98. Double gear 107 includes a pair of rotatably integral large and small gears 107a and 107b. Large gear 107a meshes with gear 109, and small gear meshes with gear 13a.

Gear 109 has a center boss portion, which is extended forward toward mid PTO shaft 9 and has a spline-toothed front end 109a. Sleeve 110 and a center boss portion of gear 104 are extended rearward toward support shaft 108, so that sleeve 110 has a spline-toothed rear end 110a close to spline-toothed front end 109a of gear 109, and gear 104 has a spline-toothed rear end 104a just in front of spline-toothed rear end 110a, i.e., opposite to spline-toothed front end 109a with respect to spline-toothed rear end 110a. A cylindrical clutch slider 111 is axially slidably spline-fitted on spline-toothed rear end 110a of sleeve 110. On the inner peripheral surface of clutch slider 111, a foremost spline-tooted portion 111a, a rearward spline-toothed portion 111b and a rearmost spline-toothed portion 111c are formed, and foremost spline-toothed portion 111a is spaced from rearward spline-toothed portion 111b. A shifter fork 113 is engaged onto clutch slider 111. In this way, gears 104 and 109, sleeve 110, clutch slider 111 and shifter fork 113 constitute sub PTO clutch 112.

By optionally operating shifter fork 113, clutch slider 111 is slidably shifted among three positions, i.e., front, middle and rear positions. Foremost spline-toothed portion 111a constantly meshes with spline-toothed rear end 104a of gear 104 regardless of slide of clutch slider 111. When clutch slider 111 is disposed at the front position, rearward spline-toothed portion 111b meshes with spline-toothed rear end 104a, and rearmost spline-toothed portion 111c meshes with spline-toothed rear end 110a, so as to drivingly engage sleeve 110 to gear 104 and to drivingly disengage gear 109 from gear 104, thereby driving only mid PTO shaft 9. When clutch slider 111 is disposed at the middle position, rearward spline-toothed portion 111b meshes with spline-toothed rear end 10a, and rearmost spline-toothed portion 111c meshes with spline-toothed rear end 109a, so as to drivingly engage both sleeve 110 and gear 109 to gear 104, thereby driving both mid PTO shaft 9 and rear PTO shaft 13. When clutch slider 111 is disposed at the rear position, rearward spline-toothed portion 111b meshes with spline-toothed rear end 109a, and rearmost spline-toothed portion 111c is separated rearward from spline-toothed rear end 109a, so as to drivingly engage gear 109 to gear 104 and to drivingly disengage sleeve 110 from gear 104, thereby driving only rear PTO shaft 13.

HST 20 will be detailed. As shown in FIGS. 3 and 4, in pump chamber 72a formed in front casing part 96, hydraulic pump 17 includes: a valve plate 298 fixed on pump mounting surface 48b of duct plate 48; a cylinder block 114 slidably rotatably fitted on valve plate 298; and pistons 115 reciprocally fitted into cylinder block 114 through respective springs. Cylinder block 114 is relatively unrotatably engaged onto input shaft 16 disposed on its rotary axis. Pistons 115 abut at their heads against a thrust bearing 116a of movable pump swash plate 116 through which input shaft 16 is freely rotatably extended rearward.

Pump swash plate 116 has a pair of lateral opposite trunnion shafts 116b. Left trunnion shaft 116b is rotatably supported by a left side wall of front casing part 96, and right trunnion shaft 116b is rotatably supported by side cover 89. Right trunnion shaft 116b is extended outward from side cover 89 so as to be fixedly provided on its distal end with a main-speed control arm 121. Main-speed control arm 121 is operatively connected to main-speed control pedal 305 through a link member such as a connection rod. A support pin 89c projects outward from the outer side surface of side cover 89. Main-speed control arm 121 is extended downward from trunnion shaft 116b, and a shock absorber 112 is interposed between a lower end of main-speed control arm 121 and support pin 89c, so as to moderate the neutral returning of pump swash plate 116 when main-speed control pedal 305 having been depressed is released.

A neutral returning spring 118 is wound around right trunnion shaft 116b in pump chamber 72a. Both end portions of spring 118 are twisted to cross each other, and are extended in one direction. A movable pin 119 is fixed on a side surface of pump swash plate 116, and a fixed eccentric pin 120 is extended from an inner surface of side cover 89, so that pins 119 and 120 are pinched between the both end portions of spring 118 when pump swash plate 116 is disposed at the neutral position. As pump swash plate 116 is tilted from the neutral position, movable pin 119 pushes one end portion of spring 118 away from the other end portion retained by fixed eccentric pin 120 so as to cause the neutral returning force of spring 118 for automatically returning pump swash plate 116 to the neutral position when pump swash plate 116 is released from an operation force. Eccentric pin 120 can be loosened from side cover 89 and rotated to adjust its position defining the neutral position of pump swash plate 116 relative to the neutral position of main-speed control pedal 305.

Figure 9:
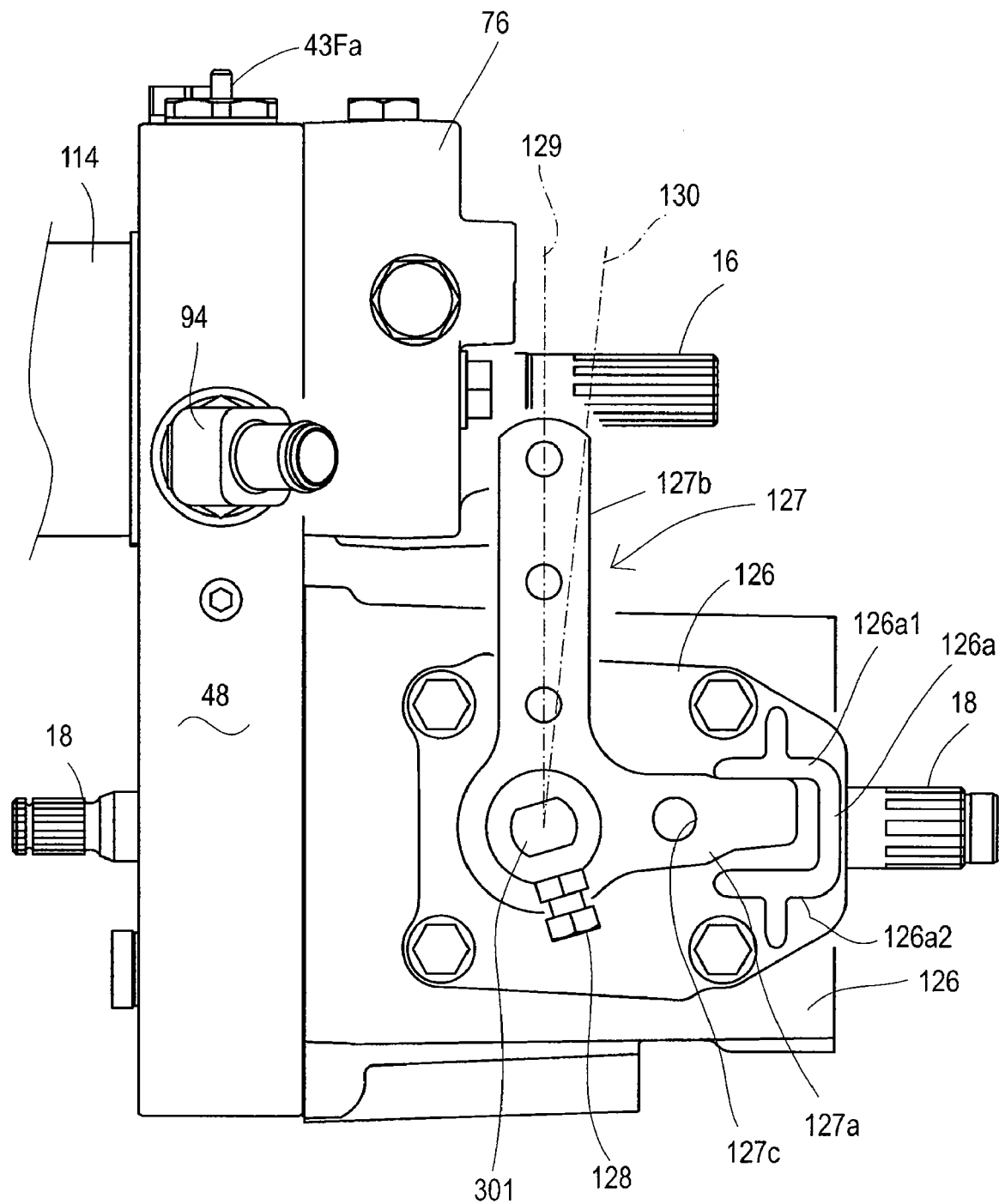
FIG. 9 is a right side view of a front portion of main hydrostatic transaxle 3.

As shown in FIGS. 5, 6 and 9, in motor casing 26, hydraulic motor 19 includes: a valve plate 299 fixed on motor mounting surface 48c of duct plate 48; a cylinder block 123 slidably rotatably fitted on valve plate 299; and pistons 124 reciprocally fitted into cylinder block 123 through respective springs. Cylinder block 123 is relatively unrotatably engaged onto output shaft 18 disposed on its rotary axis. Pistons 124 abut at their heads against a thrust bearing 300 of movable motor swash plate 117 through which output shaft 18 is freely rotatably extended forward.

A side cover 126 is fixed onto a right side surface of motor casing 26 so as to cover the right opening of motor casing 26. A lateral horizontal control shaft 301 is rotatably supported by side cover 126. A control arm 301a is formed on an inner end of control shaft 301 in motor casing 26, and connected to cradle-type motor swash plate 117 through a connection block 125. An L-shaped sub-speed control arm 127, including a forward extended restriction portion 127a and an upward extended operation portion 127b, is fixed on a distal end of control shaft 301 projecting outward from side cover 126.

A U-shaped restriction wall 126a (when viewed in side) is formed on side cover 126 so as to have an upper wall portion 126a1 and a lower wall portion 126a2. Restriction portion 127a of sub-speed control arm 127 is inserted into a spaced surrounded by U-shaped restriction wall 126a between upper and lower walls 126a1 and 126a2. Operation portion 127b of sub-speed control arm 127 is operatively connected to sub-speed control lever 174 through a later-discussed connection rod 173, so as to be rotatable between a low-speed position 129 and a high-speed position 130 according to rotation of sub-speed control lever 174. More specifically, when restriction portion 127a abuts against upper wall portion 126a1 of restriction wall 126, operation portion 127b is disposed at low-speed position 129 for setting motor swash plate 117 at a position for determining a large displacement of hydraulic motor 19. When restriction portion 127a abuts against lower wall portion 126a2 of restriction wall 126, operation portion 127b is disposed at high-speed position 130 for setting motor swash plate 117 at a position for determining a small displacement of hydraulic motor 19. The linkage structure between sub-speed control lever 174 and sub-speed control arm 127 will be detailed in later description of transaxle 35 referring to FIG. 21.

A hole 127c is bored in restriction portion 127a of sub-speed control arm 127, and a tapped hole 126b is formed in side cover 126 so as to correspond to hole 127c. A bolt 153 is screwed into tapped hole 126b through hole 127c so as to fix sub-speed control arm 127 before vehicle 1 having been completely assembled is shipped.

Referring to FIGS. 13 to 22, main (rear) hydrostatic transaxle 35 is configured so as to transmit power to sub (front) transaxle 138 for driving front wheels 5R and 5L through a hydraulic transmission device including pipes 136 and 137 as shown in FIG. 12. The configuration of hydrostatic transaxle 35 shown in FIGS. 13 to 22 and a hydraulic circuit system shown in FIG. 22 for vehicle 1 of FIG. 12 will be described. However, description of components and parts, which are equivalent to those designated by the same reference numerals in FIGS. 1 to 11, will be omitted. Further, FIGS. 13 to 21 illustrates neither a main casing of transaxle 35, including front casing part 96, rear casing part 97 and rear cover 98 joined to one another, nor the interior structure of the main casing of transaxle 35, on the assumption that the main casing of transaxle 35 is configured similar to the main casing of transaxle 3 so as to incorporate hydraulic pump 17 of an HST 30, differential unit 51, deceleration gear train 50 between an output shaft 155 of HST 30 and differential unit 51, and the drive train between input shaft 16 and mid and rear PTO shafts 9 and 13.

Incidentally, with respect to later-discussed alternative main (rear) hydrostatic transaxles shown in FIGS. 23 to 42, description or illustration of components and parts, which are equivalent to those designated by the same reference numerals in FIGS. 1 to 22, will also be omitted.

A duct plate 154, as shown in FIGS. 13, 15, 17 to 19, is fixed onto the front end of front casing part 96 (not shown). In front casing part 96, hydraulic pump 17 is fitted on a vertical upper rear pump mounting surface 154b of duct plate 154, and hydraulic motor 19 is fitted on a vertical lower front motor mounting surface 154c of duct plate 154. Duct plate 154 is formed therein with a part of a closed fluid circuit 130 through which hydraulic motor 19 is fluidly connected to hydraulic pump 17, thereby constituting HST 30 in transaxle 35. Hydraulic pump 17 disposed in the main casing of transaxle 35 requires no additional exclusive casing. Alternatively, hydraulic pump 17 may be fitted on the front surface of duct plate 154 so as to be disposed in a pump casing extended forward from duct plate 154, and the pump casing may be formed integrally with motor casing 26 incorporating hydraulic motor 19.

Figure 22:
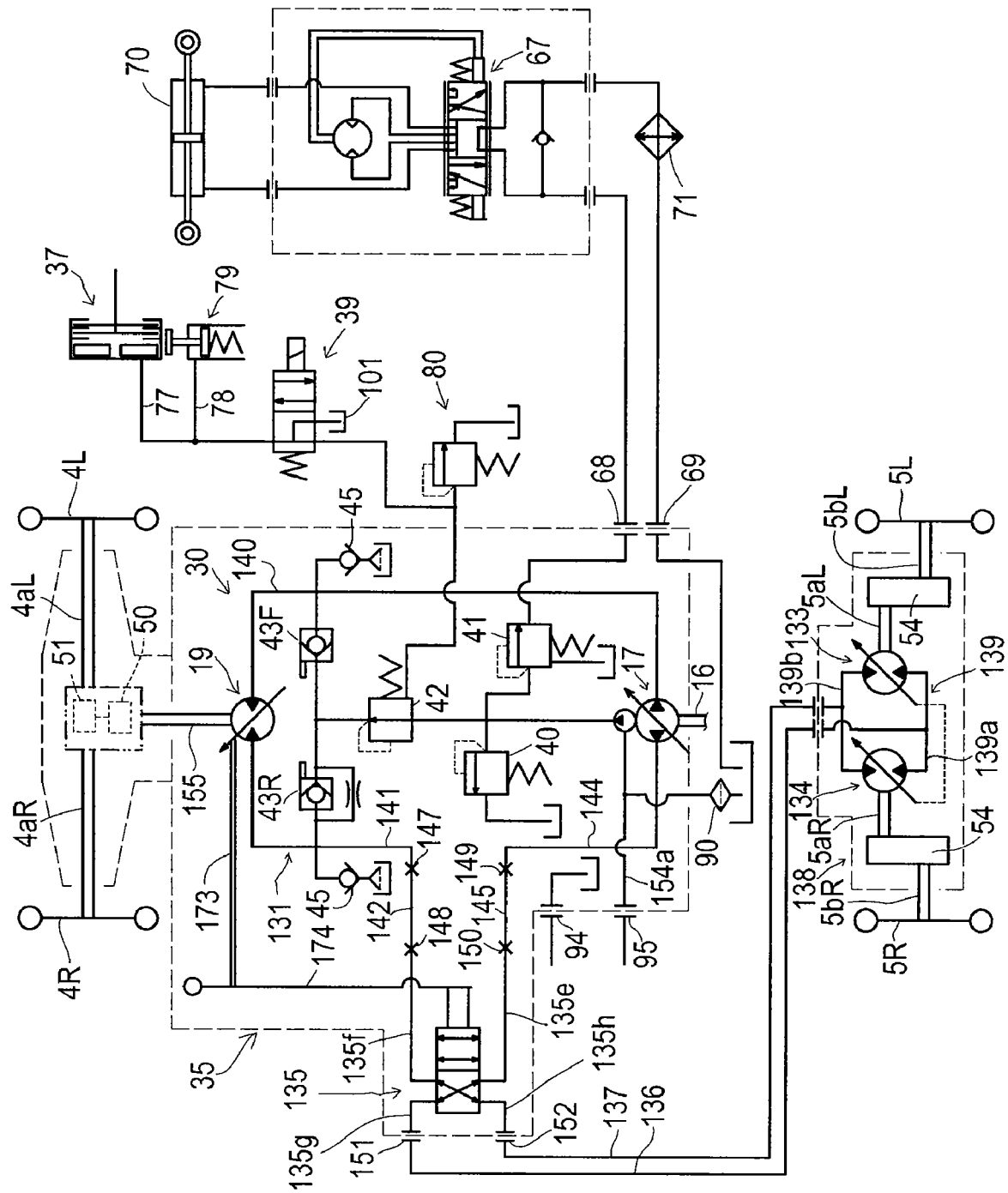
FIG. 22 is a hydraulic circuit diagram of the vehicle of FIG. 12 with main hydrostatic transaxle 35.

Closed fluid circuit 130 includes a pair of fluid passages: one to be higher-pressurized for forward traveling; and the other to be higher-pressurized for backward traveling. A fluid duct 140 is bored in duct plate 154 and interposed between hydraulic pump 17 and motor 19 fitted on duct plate 154, so as to solely serve as the fluid passage to be higher-pressurized for forward traveling. The fluid passage to be higher-pressurized for backward traveling includes a drive-mode change valve 135 disposed in rear transaxle 35. Hydraulic pressure fluid pipes 136 and 137 are extended from drive-mode change valve 135 to front transaxle casing 138 so as to supply fluid to a pair of left and right hydraulic motors 133 and 134 disposed in front transaxle 138 for driving respective front wheels 5L and 5R, as shown in FIG. 22.

In front transaxle 138, a fluid passage 139, on which hydraulic motors 133 and 134 are provided in parallel, is interposed between pipes 136 and 137. A fluid passage 139 includes a bifurcated passage 139a, which is extended from pipe 136 and bifurcated to hydraulic motors 133 and 134, and a bifurcated passage 139b, which is extended from pipe 137 and bifurcated to hydraulic motors 133 and 134.

Drive-mode change valve 135 is shiftable between a two-wheel drive mode position and a four-wheel drive mode position. When drive-mode change valve 135 is disposed at the two-wheel drive mode position, the fluid passage to be higher-pressurized for backward traveling fluidly connects hydraulic motor 19 to hydraulic pump 17 without hydraulic motors 133 and 134, thereby completing close fluid circuit 130 within only rear hydrostatic transaxle 35. When drive-mode change valve 135 is disposed at the four-wheel drive mode position, the fluid passage to be higher-pressurized for backward traveling is extended to the pair of parallel hydraulic motors 133 and 134 between hydraulic motor 19 and hydraulic pump 17, whereby closed fluid circuit 130 is configured so that hydraulic motor 19 and the pair of hydraulic motors 133 and 134 are fluidly connected in series to hydraulic pump 17, and hydraulic pump 19 distributes fluid between parallel hydraulic motors 133 and 134 in front transaxle 138.

Alternatively, in closed fluid circuit 130, it is not limited which of the pair of passages extended from hydraulic pump 17 is higher-pressurized for forward traveling. In this regard, the above and later mentioned relation between the passages extended from hydraulic pump 17 may be reversed.

A configuration for supplying fluid from hydraulic pump 17 to hydraulic motor 19 and to the pair of hydraulic motors 133 and 134 will be described with reference to FIGS. 13 to 18 and 22. Duct plate 154 is bored with a pair of kidney ports 154b1 and 154b2 opened at pump mounting surface 154b. Duct plate 154 is also bored with a pair of kidney ports 154c1 and 154c2 opened at motor mounting surface 154c. Fluid duct 140 (serving as the fluid passage to be higher-pressurized for forward traveling) bored in duct plate 154 is interposed between kidney ports 154b1 and 154c1.

Outwardly opened ports 149 and 147 are fitted onto duct plate 154. A fluid duct 144 is bored in duct plate 154, and interposed between kidney port 154b2 and port 149. A fluid duct 141 is bored in duct plate 154, and interposed between kidney port 154c2 and port 147.

Instead of drive-mode change clutch casing 27 incorporating drive-mode change clutch 29, drive-mode change valve 135 is provided onto the front surface of motor casing 26 incorporating hydraulic motor 19. In this regard, a valve casing 135a is fixed onto the front surface of motor casing 26 by bolts 164, and a rotary valve shaft 158 is rotatably fitted in a laterally extended valve chamber 135b bored in valve casing 135a. Rotary valve shaft 158 projects rightwardly outward from valve casing 135a so as to be fixedly provided thereon with a drive-mode change operation arm 157. Outwardly opened ports 150 and 148 are fitted onto valve casing 135a, and fluidly connected to valve chamber 135b in valve casing 135a. A fluid pipe 145 is interposed between port 149 on duct plate 154 and port 150 on valve casing 135a. A fluid pipe 142 is interposed between port 147 on duct plate 154 and port 148 on valve casing 135a. Further, outwardly opened ports 151 and 152 are fitted onto valve casing 135a so as to be connected to respective fluid pipes 136 and 137 extended to front transaxle 138.

In this way, to constitute the fluid passage to be higher-pressurized for backward traveling, kidney port 154b2, fluid duct 144, port 149, fluid pipe 145 and port 150 are interposed between hydraulic pump 17 and drive-mode change valve 135, and on the other hand, kidney port 154c2, fluid duct 141, port 147, fluid pipe 142 and port 148 are interposed between hydraulic motor 19 and drive-mode change valve 135.

A diametrically larger body of rotary valve shaft 158 slidably rotatably fitted in valve chamber 135*b* serves as a rotary valve main body 158*d*. A lateral middle portion of rotary valve main body 158*d* is notched so as to serve as a valve port portion 158*a* having a pair of parallel flat surfaces 158*c* disposed symmetrically with respect to a center axis 162 of rotary valve shaft 158. Spaces enclosed by respective flat surfaces 158*c* and the inner peripheral surface of valve chamber 135*b* serve as a pair of opposite valve ports 135*d*. A pair of left and right annular grooves 158*e* are formed on rotary valve main body 158*d* symmetrically with respect to valve port portion 158*a*. An axial drain duct 158*f* is bored in rotary valve main body 158*d* on center axis 162, and radial holes are extended from drain duct 158*f* to respective annular grooves 158*e*. A drain port 135*c* is bored in valve casing 135*a*, opened to drain duct 158*f* in valve chamber 135*b*, and opened to a fluid sump 165 in valve casing 135*a*.

In valve casing 135*a*, from the portion of valve chamber 135*b* corresponding to valve port portion 158*a*, a fluid duct 135*e* is extended rearward to port 150, a fluid duct 135*f* is extended upward to port 148, a fluid duct 135*g* is extended downward to port 151, and a fluid duct 135*h* is extended forward to port 152.

Figure 14:
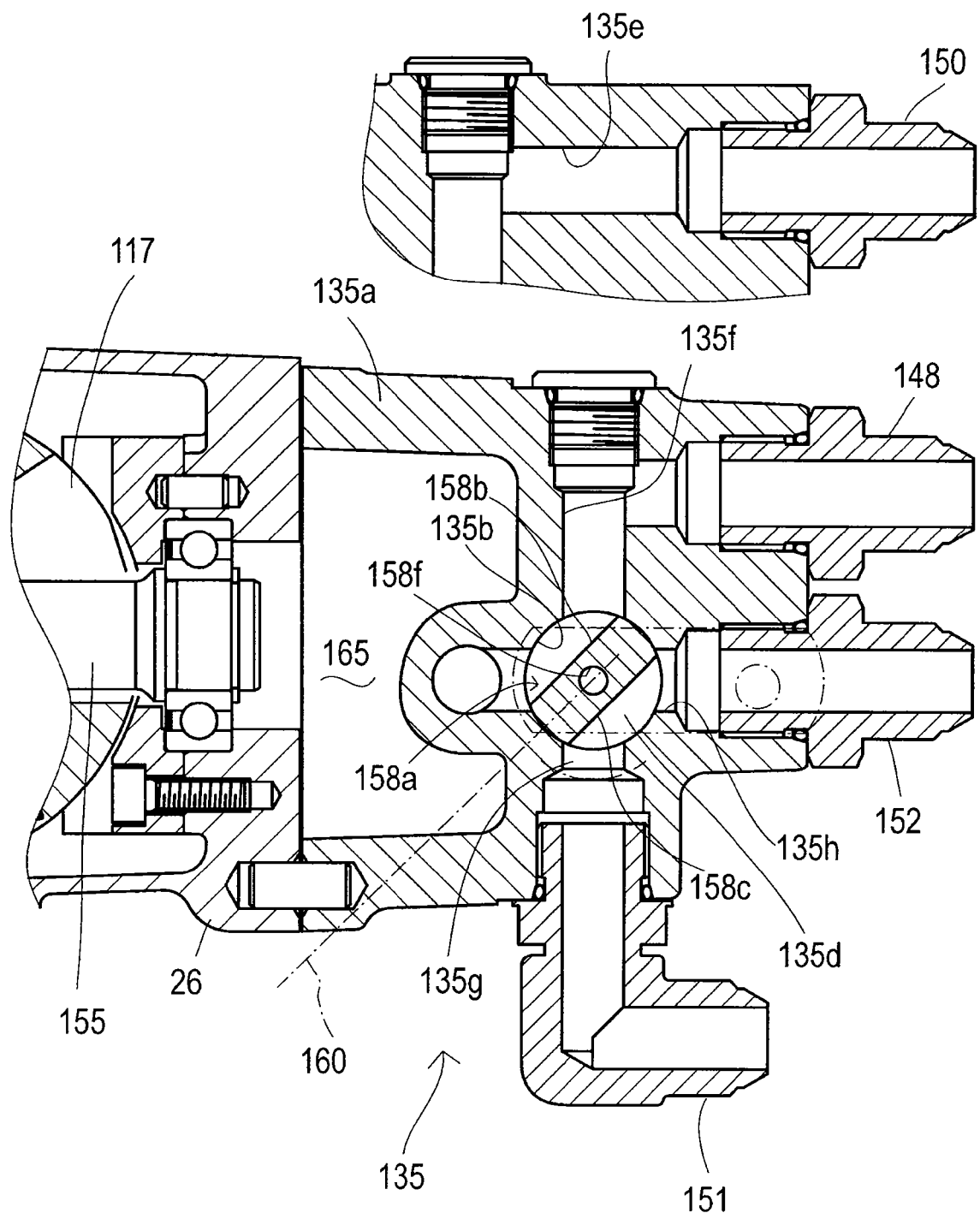
FIG. 14 is a fragmentary sectional side view of main hydrostatic transaxle 35, showing drive-mode change valve 135 therein.
Figure 15:
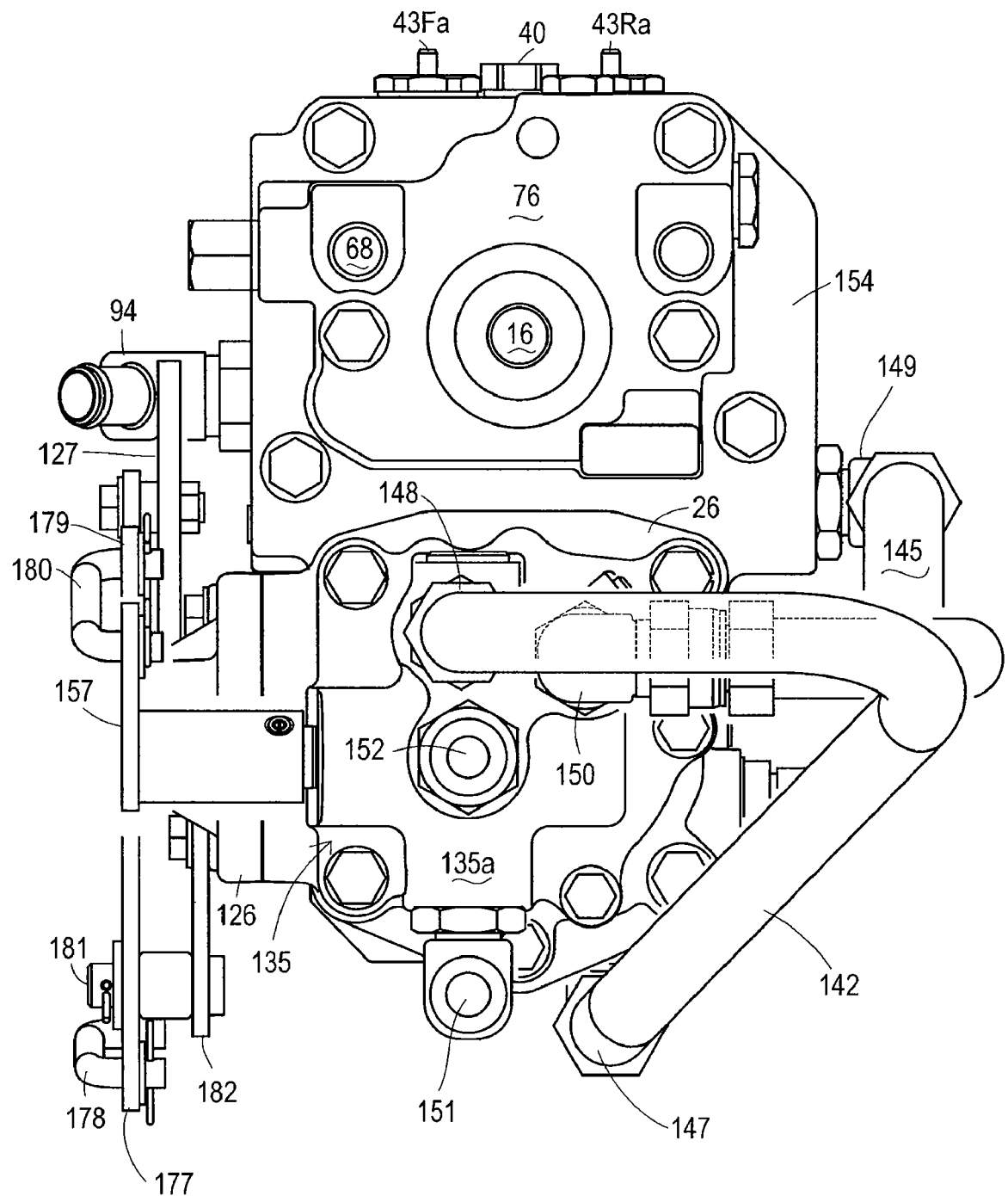
FIG. 15 is a front view of main hydrostatic transaxle 35.
Figure 16:
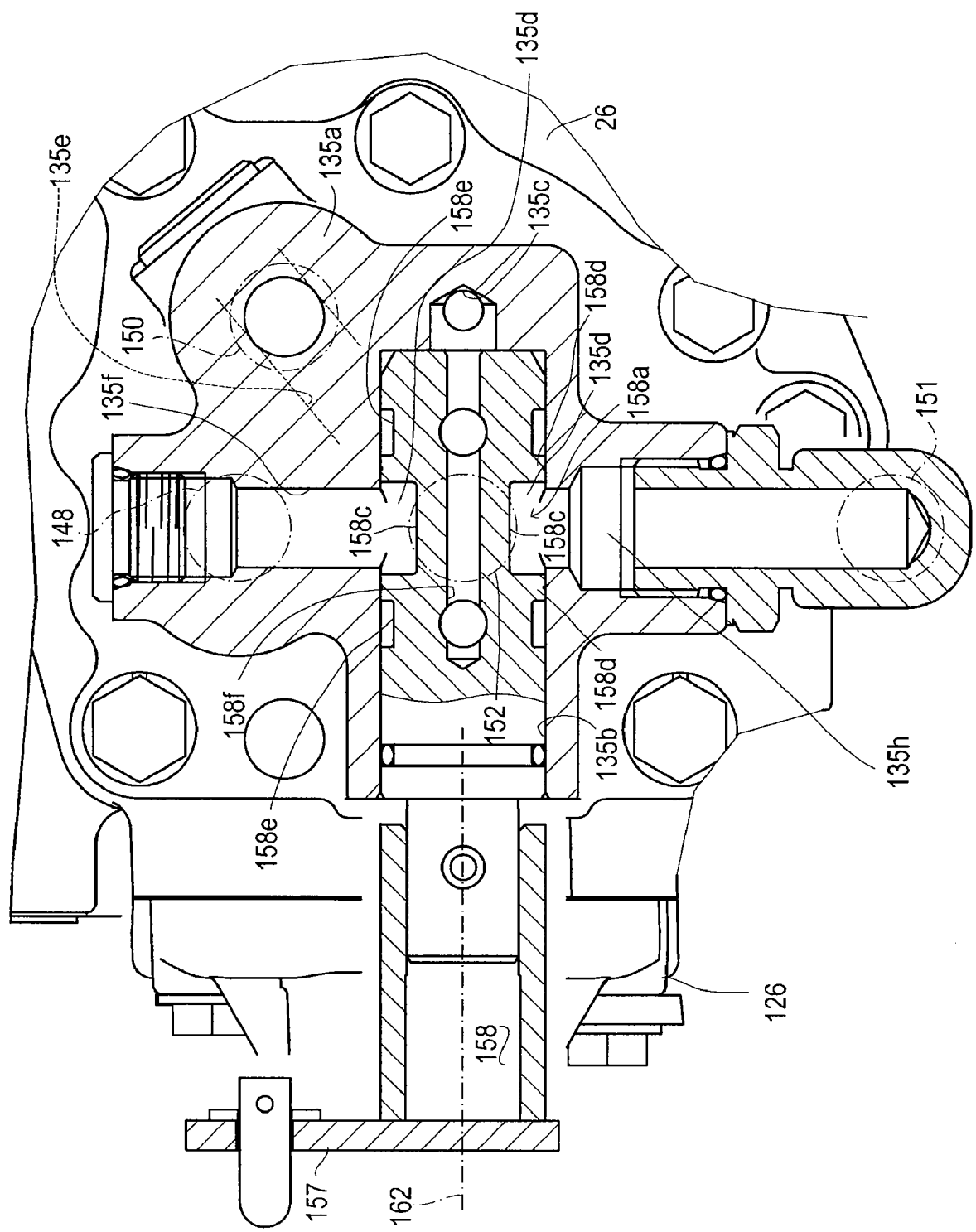
FIG. 16 is a cross sectional view taken along F-F line of FIG. 13.
Figure 17:
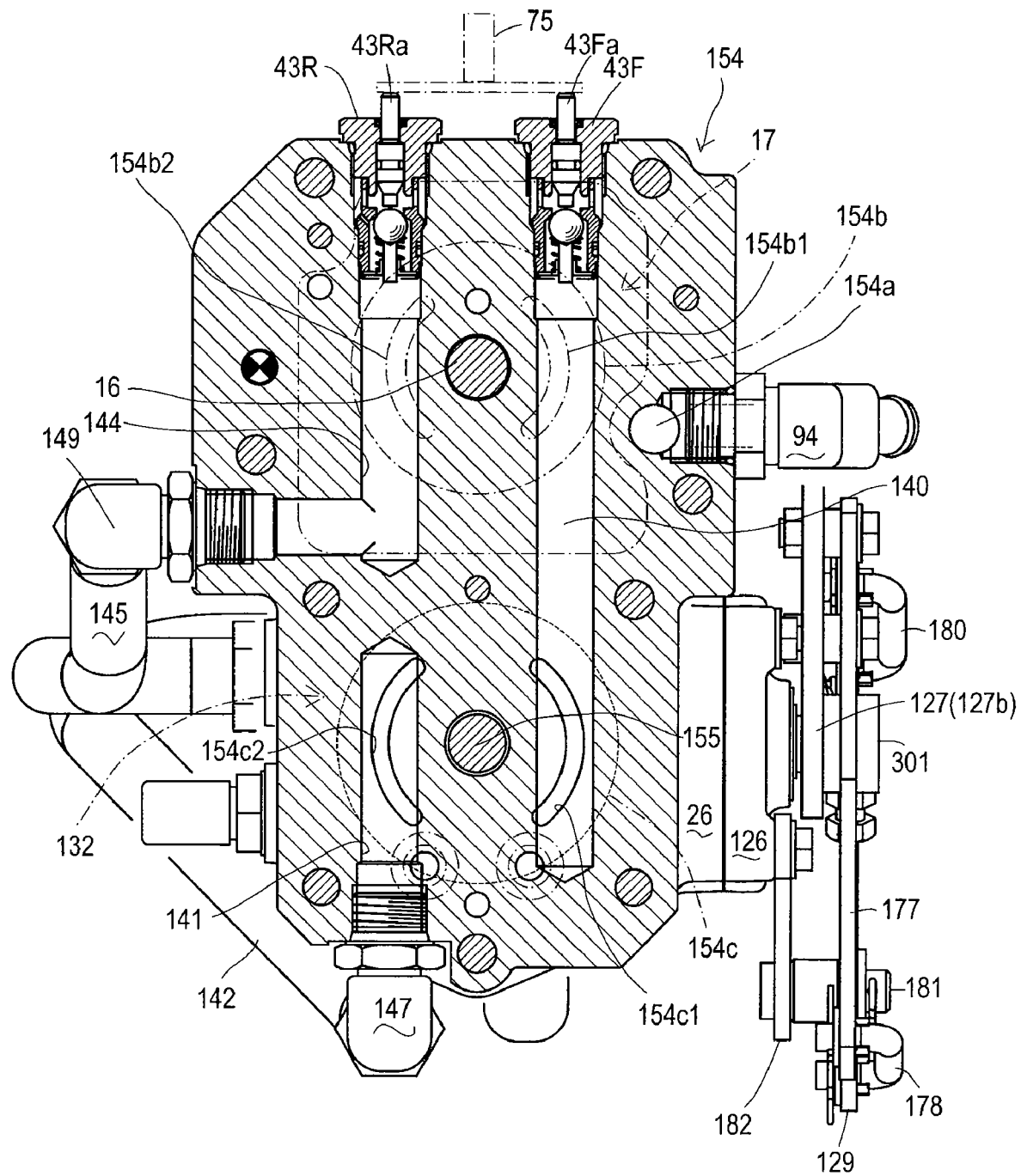
FIG. 17 is a sectional rear view of a duct plate 154 of main hydrostatic transaxle 35.

As a result of such a configuration of rotary drive-mode change valve 135, when drive-mode change operation arm 157 and rotary valve shaft 158 are rotated so as to locate valve port portion 158*a* at a position 160 shown in FIG. 14, one valve port 135*d* is opened to fluid ducts 135*f* and 135*e*, so as to fluidly connect port 148 to port 150 through fluid duct 135*f*, valve port 135*d* and fluid duct 135*e*. Simultaneously, the other valve port 135*d* is opened to fluid ducts 135*g* and 135*h*, so as to fluidly connect port 151 to port 152 through fluid duct 135*g*, valve port 135*d* and fluid duct 135*h*. That is, drive-mode change valve 135 is disposed at the two-wheel drive mode position so as to fluidly connect fluid duct 144 to fluid duct 141 in duct plate 154 through drive-mode change valve 135 without supplying fluid to hydraulic motors 133 and 134 in front transaxle 138. In other words, kidney port 154*b*2, fluid duct 144, port 149, fluid pipe 145, port 150, fluid duct 135*e*, valve port 135*d*, fluid duct 135*f*, port 148, fluid pipe 142, port 147, fluid duct 141 and kidney port 154*c*2 are fluidly connected in series to one another within only rear transaxle 35, so as to constitute the fluid passage to be higher-pressurized for backward traveling in closed fluid circuit 130 between hydraulic pump 17 and motor 19. Simultaneously, due to the connection of fluid ducts 135*g* and 135*h* through the other valve port 135*d*, a close circuit including the pair of hydraulic motors 133 and 134 is made so as to be isolated from closed circuit 130 of HST 30, and to allow free rotation of hydraulic motors 133 and 134 following rotation of front wheels 5L and 5R.

Figure 13:
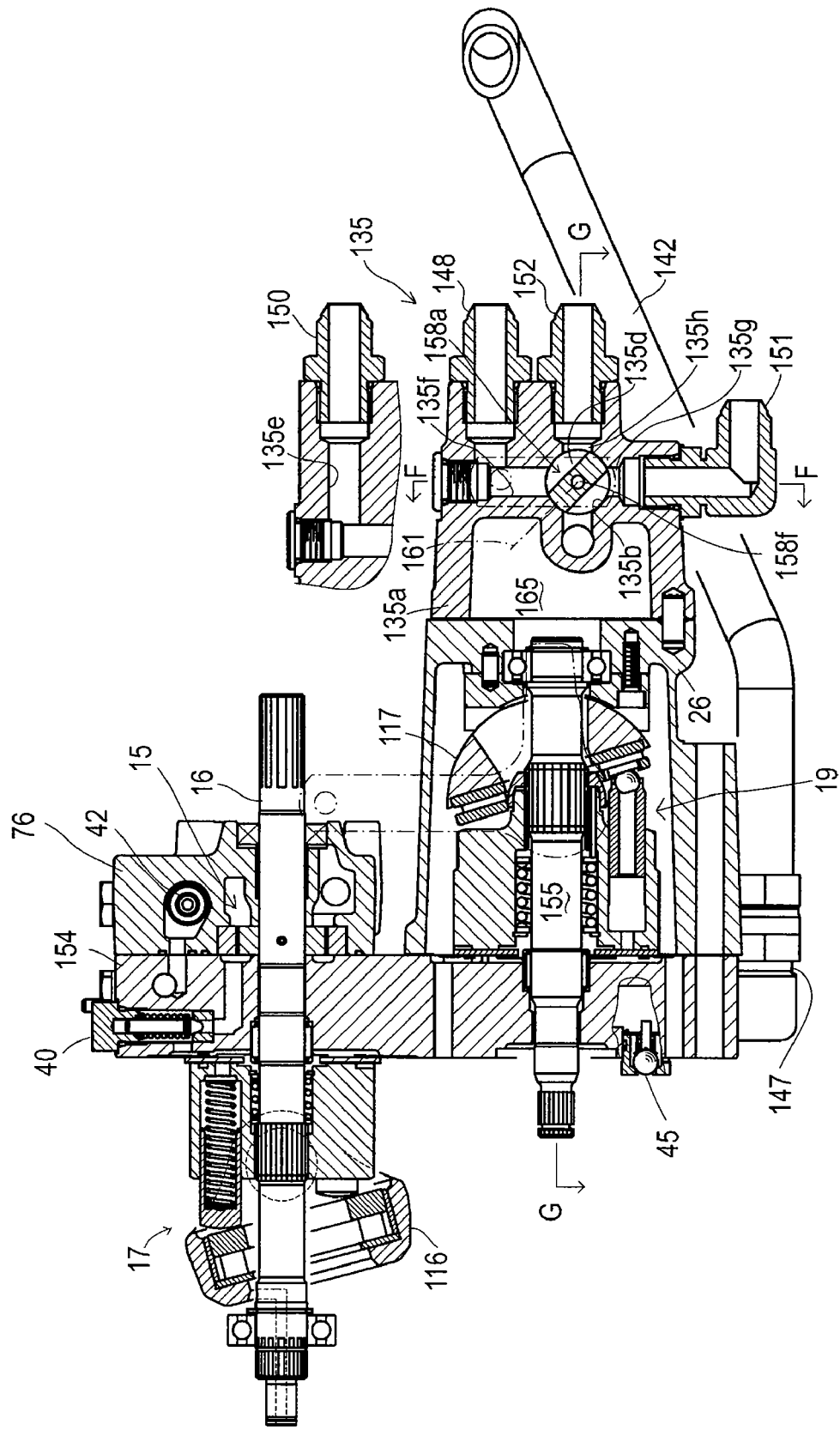
FIG. 13 is a sectional side view of main hydrostatic transaxle 35.

On the other hand, when drive-mode change operation arm 157 and rotary valve shaft 158 are rotated so as to locate valve port portion 158*a* at a position 161 shown in FIGS. 13 and 22, one valve port 135*d* is opened to fluid ducts 135*f* and 135*h*, so as to fluidly connect port 148 to port 152 through fluid duct 135*f*, valve port 135*d* and fluid duct 135*h*. Simultaneously, the other valve port 135*d* is opened to fluid ducts 135*e* and 135*g*, so as to fluidly connect port 150 to port 151 through fluid duct 135*e*, valve port 135*d* and fluid duct 135*g*. That is, drive-mode change valve 135 is disposed at the four-wheel drive mode position so as to fluidly connect fluid duct 144 in duct plate 154 to fluid pipe 136 through drive-mode change valve 135 and to fluidly connect fluid duct 141 in duct plate 154 to fluid pipe 137 through drive-mode change valve 135, thereby supplying fluid to hydraulic motors 133 and 134 in front transaxle 138. In other words, kidney port 154*b*2, fluid duct 144, port 149, fluid pipe 145, port 150, fluid duct 135*e*, valve port 135*d*, fluid duct 135*g*, port 151, fluid pipe 136 and bifurcated passage 139*a* are sequentially connected to one another so as to constitute the fluid passage to be higher-pressurized for backward traveling, extended from hydraulic pump 17 in rear transaxle 35 to the pair of hydraulic pumps 133 and 134 in front transaxle 138. Simultaneously, bifurcated passage 139*b*, fluid pipe 137, port 152, fluid duct 135*h*, valve port 135*d*, fluid duct 135*f*, port 148, fluid pipe 142, port 147, fluid duct 141 and kidney port 154*c*2 are sequentially connected to one another so as to constitute the fluid passage from the pair of hydraulic motors 133 and 134 in front transaxle 138 to hydraulic motor 19 in rear transaxle 35.

In transaxle 35, hydraulic motor 19 is disposed in motor casing 26, sub-speed control arm 127 is supported onto side cover 126 attached to motor casing 26 through control shaft 301, sub-speed control arm 127 is operatively connected to sub-speed control lever 174 through connection rod 173, and control shaft 301 is connected to motor swash plate 117, similar to those in transaxle 3.

A linkage system 189 for associating the drive-mode change operation with the sub-speed control operation will be described with reference to FIGS. 13, 14, 18 to 20 and 22. A link arm 177 is fixed at its upper portion onto operation portion 127*b* of sub-speed control arm 127, and is extended downward so as to be pivotally connected at its bottom portion to a tip of drive-mode change operation arm 157 through a link rod 178, a link arm 179 and a link rod 180. In this way, linkage system 189, including link arm 177, link rod 178, link arm 179 and link rod 180, is interposed between sub-speed control arm 127 and drive-mode change operation arm 157.

A support plate 182 is fixed on side cover 126, and a pivot shaft 181 projects laterally horizontally from support plate 182. Link arm 179 is pivoted on pivot shaft 181, so that link arm 179 has a short link portion 179*a* extended downward from pivot shaft 181 to be pivoted at its bottom end to link rod 180, and has a long link portion 179*b* extended upward from pivot shaft 181 just opposite to short link portion 179*a* to be pivoted at its top end to link rod 178.

Figure 19:
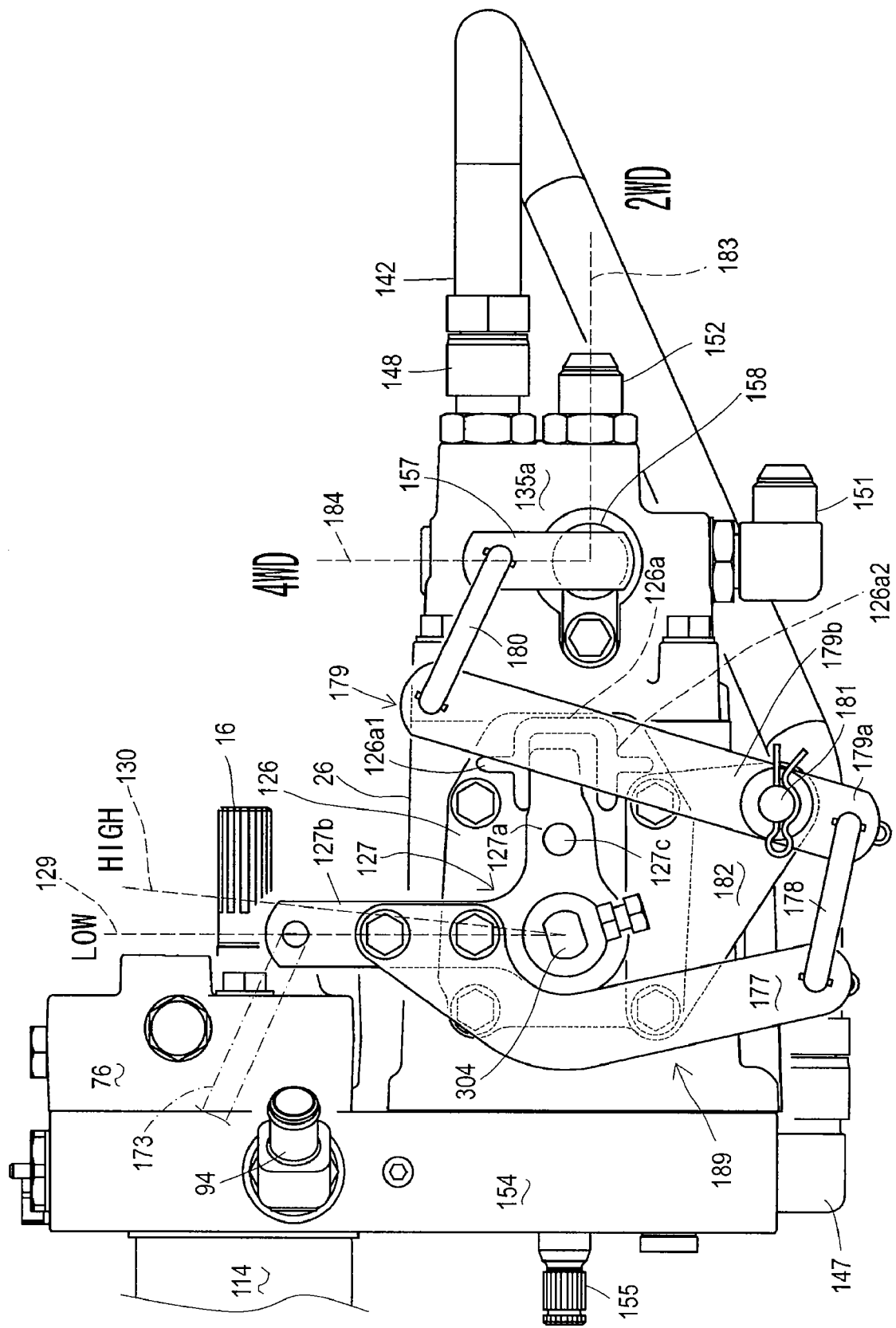
FIG. 19 is a right side view of a front portion of main hydrostatic transaxle 35, showing a linkage system 189 setting a drive-mode change operation arm 157 at a four-wheel drive mode position.

Referring to FIG. 19, linkage system 189 is configured so that drive-mode change operation arm 157 is disposed at a four-wheel drive mode position 184 for setting drive-mode change valve 135 (valve port portion 158*a*) at four-wheel drive mode position 161 as shown in FIG. 13 when sub-speed control arm 127 is disposed at low-speed position 129. Therefore, during low-speed traveling, vehicle 1 is automatically driven by four wheels advantageously for traction or traveling on a rough road.

Figure 20:
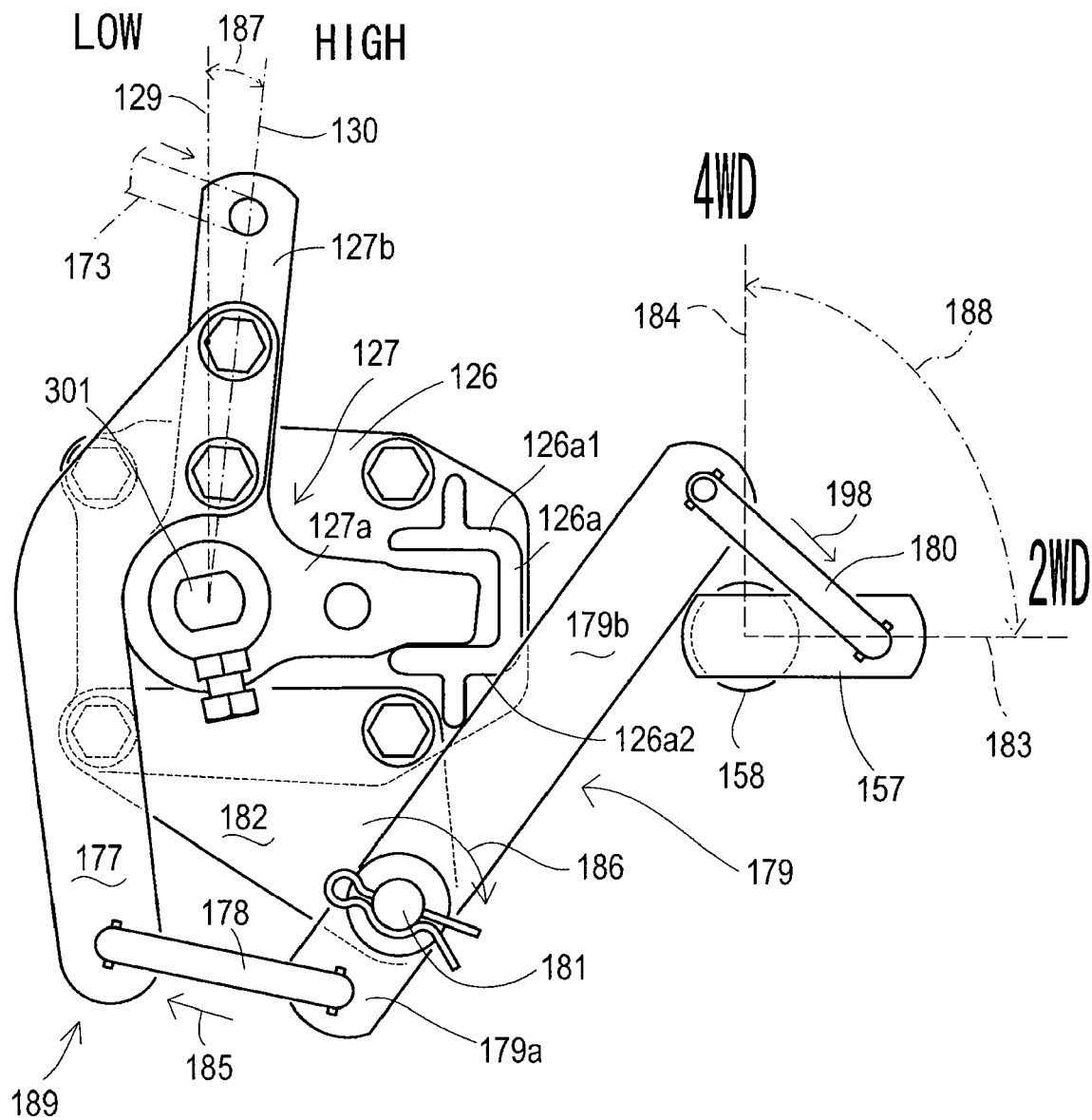
FIG. 20 is a right side view of the front portion of main hydrostatic transaxle 35, showing linkage system 189 setting drive-mode change operation arm 157 at a two-wheel drive mode position.

Referring to FIG. 20, when sub-speed control lever 174 is operated for high-speed traveling, operation portion 127*b* of sub-speed control arm 127 having been disposed at low-speed position 129 is rotated to high-speed position 130. Accordingly, link arm 177 is rotated centered on control shaft 301 and pulls link rod 178 in a direction designated by an arrow 185. Accordingly, link arm 179 is rotated centered on pivot shaft 181 in a direction designated by an arrow 186 so that long link portion 179*b* pushes link rod 180 in a direction designated by an arrow 198, thereby rotating drive-mode change operation arm 157 having been disposed at four-wheel drive mode position 184 to two-wheel drive mode position 183. Therefore, during high-speed traveling, vehicle 1 is automatically driven by two wheels advantageously for efficient fuel consumption.

As shown in FIG. 20, a rotation angle 187 of operation portion 127*b* of sup-speed control arm 127 between low-speed position 129 and high-speed position 130 is smaller than a rotation angle 188 of drive-mode change operation arm 157 between four-wheel drive mode position 184 and two-wheel drive mode position 183. However, due to the difference of length between short and long link portions 179a and 179b in link arm 179, the small movement of link rod 178 pivoted on the tip of short link portion 179a is converted into the large movement of link rod 180 pivoted on the tip of long link portion 179b so as to correspond to the large rotation angle 188 of drive-mode change operation arm 157 between four-wheel drive mode position 184 and two-wheel drive mode position 183. In this way, linkage system 189 serves as a cushion mechanism compensating for the difference of movement degree between sub-speed control arm 172 and drive-mode change operation arm 157.

As a result of linkage system 189 between sub-speed control arm 127 and drive-mode change operation arm 157, the drive-mode change operation is automatically performed according to the sub-speed change operation between the high-speed stage and the low-speed stage. When vehicle 1 requires a large traction power for work or traveling on a rough road, a driver sets sub-speed control lever 174 to the low-speed position so as to determine the large displacement of hydraulic motor 19, and simultaneously, the drive mode is automatically set to the four-wheel drive mode. When vehicle 1 normally travels on a road, the driver sets sub-speed control lever 174 to the high-speed position so as to determine the small displacement of hydraulic motor 19, and simultaneously, the drive mode is automatically set to the two-wheel drive mode, thereby ensuring efficient fuel consumption.

Figure 18:
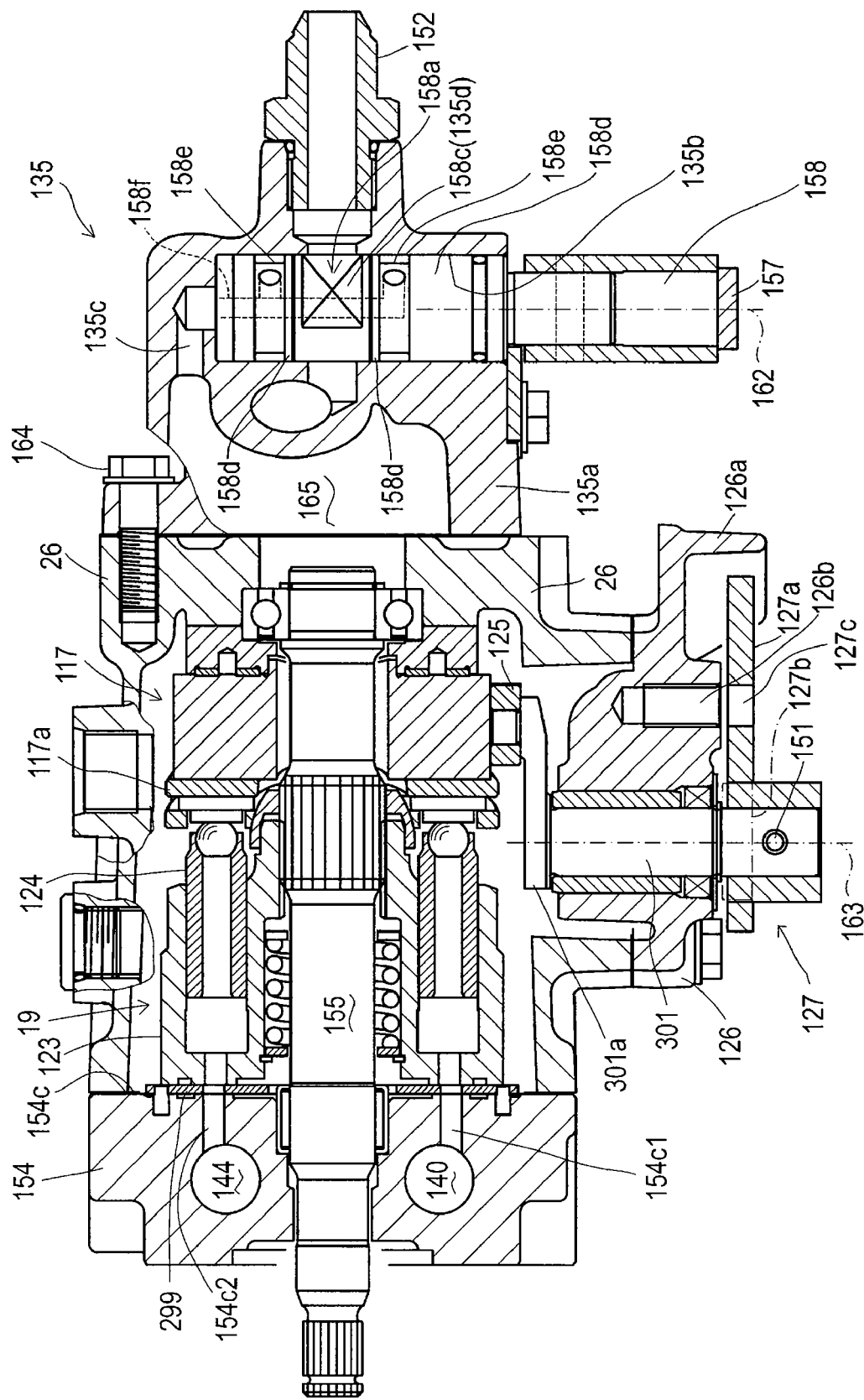
FIG. 18 is a cross sectional view taken along G-G line of FIG. 13.

Referring to FIG. 18, control shaft 301 serving as the pivot shaft of sub-speed control arm 127 has a center axis (rotary axis) 163 in parallel to center axis (rotary axis) 162 of rotary valve shaft 158 of drive-mode change valve 135. Linkage system 189 is compactly interposed between sub-speed control arm 127 and drive-mode change operation arm 157 having the small distance between center axes 162 and 163, thereby fore-and-aft minimizing rear hydrostatic transaxle 35.

Figure 21:
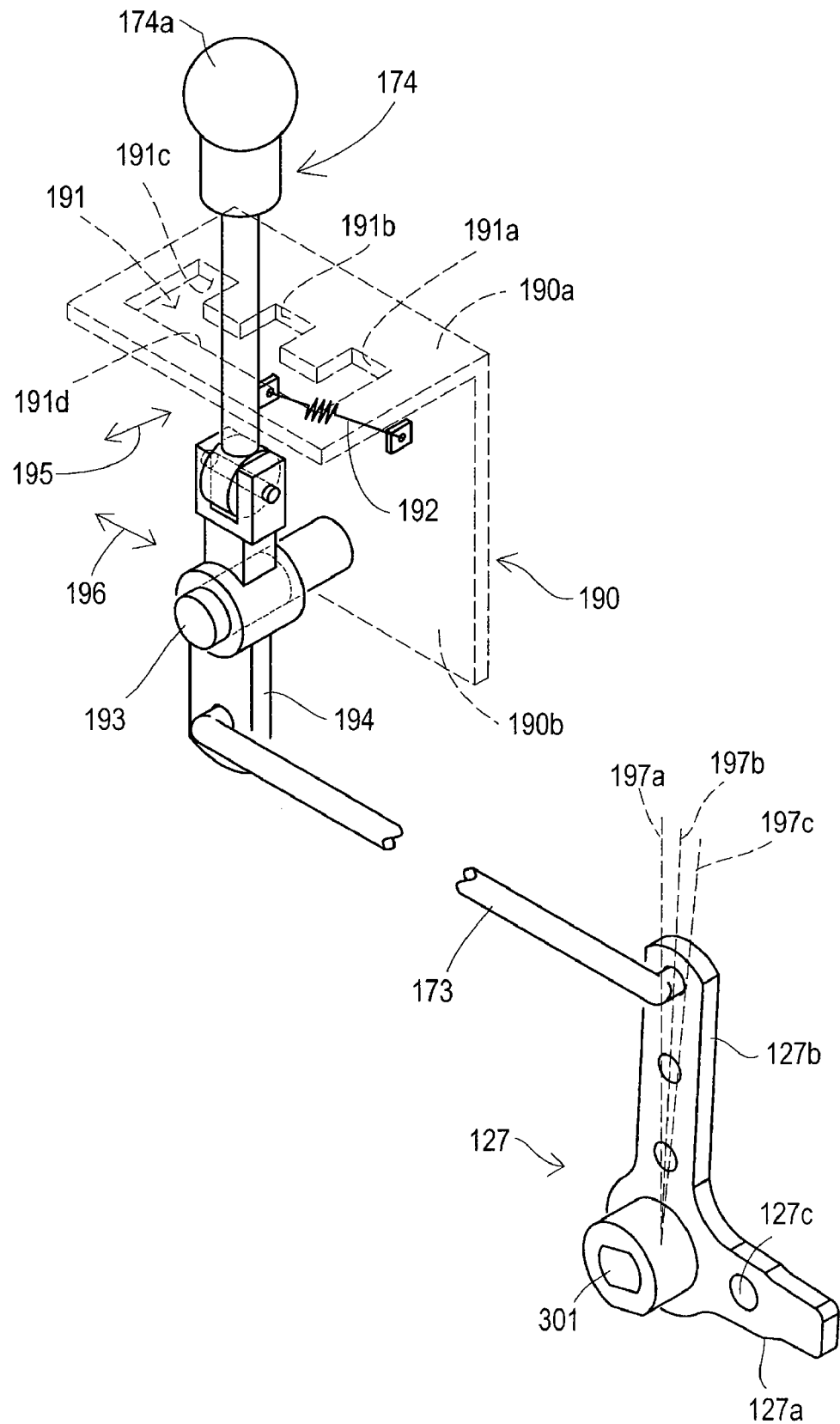
FIG. 21 is a perspective view of a linkage between a sub-speed control lever 174 and a sub-speed control arm 172.

Referring to FIG. 21, a sub-speed control linkage system between sub-speed control arm 127 and sub-speed control lever 174 will be described.

Although sub-speed control arm 127 of each of transaxles 3 and 35 is shiftable between two positions 129 and 130 as shown in FIGS. 8, 19 and 20, the sub-speed control linkage system shown in FIG. 21 is configured so as to shift sub-speed control lever 174 and sub-speed control arm 127 among three positions. The sub-speed control linkage system can be easily redesigned to be shiftable between two positions so as to be adapted to transaxle 3 or 35.

A bracket 190 is disposed beside driver's seat 7 in vehicle 1. Bracket 190 is vertically reversed L-shaped when viewed in front so as to have a horizontal top plate portion 190a and a vertical plate portion 190b extended downward top plate portion 190a. A pivot shaft 193 projects laterally from vertical plate portion 190b of bracket 190. A link arm 194 is pivoted on pivot shaft 193 rotatably in a direction designated by an arrow 196. Sub-speed control lever 174 is pivoted at its bottom end onto a top end of link arm 194 rotatably in a direction designated by an arrow 195 perpendicular to the direction designated by arrow 196. Connection rod 173 is pivotally interposed between a bottom end of link arm 194 and the tip of operation portion 127b of sub-speed control arm 127.

A lever guide slot 191 is bored in top plate portion 190a of bracket 190, and sub-speed control lever 174 is passed through lever guide slot 191, and extended upward from top plate portion 190a so as to be fixedly provided on its top end with a grip 174a. A torsion spring 192 is engaged at one end thereof onto a vertical intermediate portion of sub-speed control lever 174 below top plate portion 190a of bracket 190, and is engaged at the other end thereof onto vertical plate portion 190b of bracket 190, so as to bias sub-speed control lever 174 toward vertical plate portion 190b in the direction designated by arrow 195. Lever guide slot 191 is E-shaped when viewed in plan so as to include a shift slot 191d extended in the fore-and-aft direction designated by arrow 196, and three parallel location slots, i.e., a low-speed position slot 191a, a middle-speed position slot 191b and a high-seed position slot 191c, extended from shift slot 191d in the lateral direction designated by arrow 195.

To operate for sub-speed change, a driver gripping grip 174a rotates sub-speed control lever 174 in the direction designated by arrow 195, so as to insert sub-speed control lever 174 from one of location slots 191a, 191b and 191c into shift slot 191d. Then, sub-speed control lever 174 is rotated along shift slot 191d in the direction designated by arrow 196, and rotated into target location slot 191a, 191b or 191c in the direction designated by arrow 195. Due to the force of spring 192, sub-speed control lever 174 finally abuts against an end of target location slot 191a, 191b or 191c, so as to be surely retained in the target location slot. Since the rotation sub-speed control lever 174 in the direction designated by arrow 196 is centered on pivot shaft 193, operation portion 127b of sub-speed control arm 127 connected to sub-speed control lever 174 through connection rod 173 is also rotated in the direction designated by arrow 196, so as to be shifted among a low-speed position 197a, a middle-speed position 197b and a high-speed position 197c corresponding to respective low-speed position slot 191a, middle-speed position slot 191b and high-speed position slot 191c.

In this way, the sub-speed control linkage system shown in FIG. 21 provides three sub-speed stages. To adapt the sub-speed control linkage system to sub-speed control arm 127 shiftable between two positions as shown in FIGS. 19 and 20, for instance, lever guide groove 191 is reshaped to have only two location slots. Even if sub-speed control arm 127 is shifted among three or more speed stages, an alternative link ratio of linkage system 189 can be set, and valve port portion 158a of rotary valve shaft 158 of drive-mode change valve 135 can be formed in an alternative shape, so that the drive-mode change between the four-wheel drive mode and the two-wheel drive mode corresponds to a shift between any two speed stages selected from the three or more speed stages.

Figure 23:
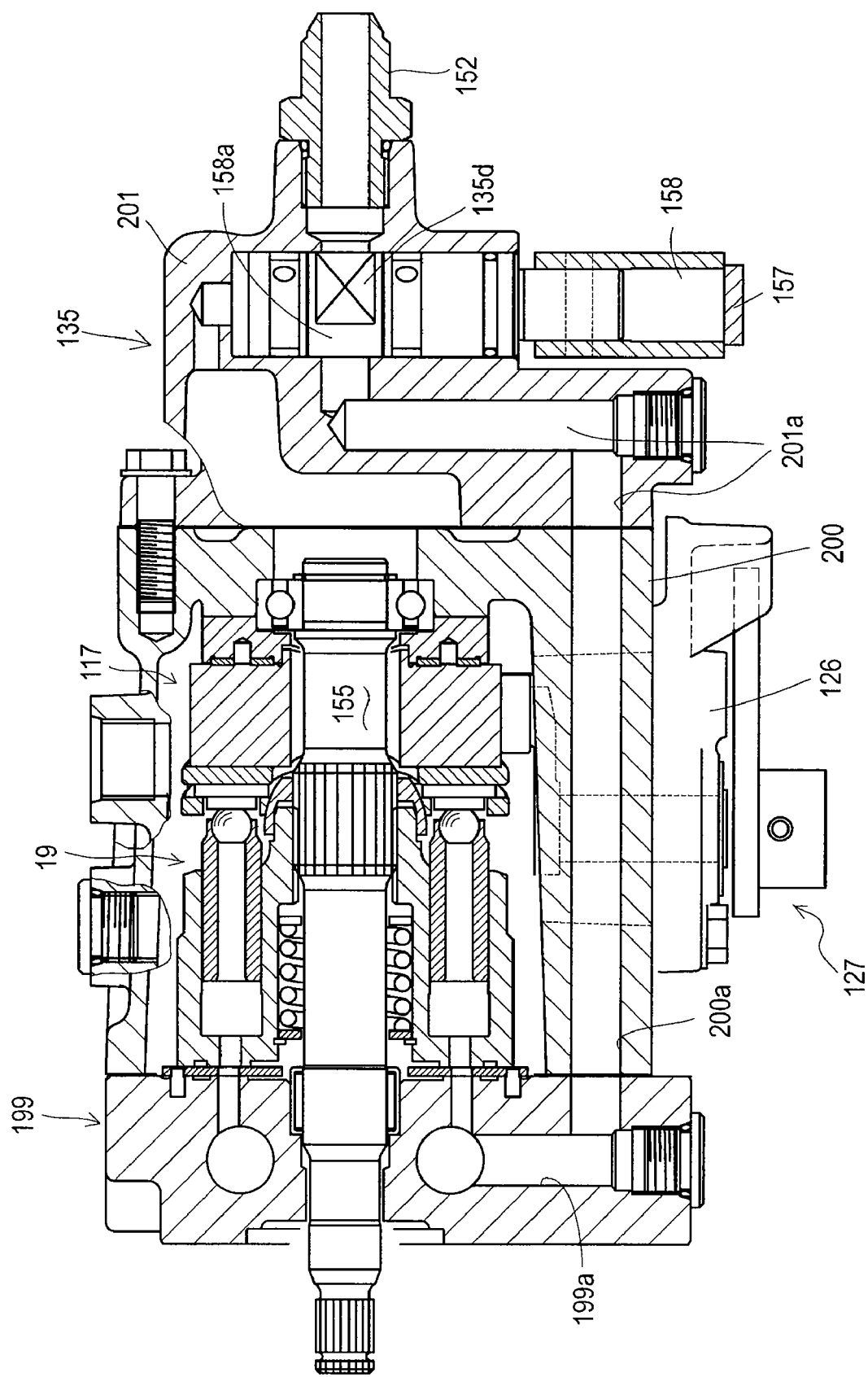
FIG. 23 is a sectional plan view of a front portion of main hydrostatic transaxle 35, showing drive-mode change valve 135 with an alternative fluid passage structure for supplying fluid to drive-mode change valve 135.

Referring to FIG. 23, an alternative duct plate 199, an alternative motor casing 200 incorporating hydraulic motor 19, and an alternative valve casing 201 of drive-mode change valve 135, adapted in transaxle 35, will be described. Similar to duct plate 154, an alternative duct plate 199 is fixed on the front surface of front casing part 96 (not shown), so that hydraulic pump 17 (not shown) is fitted onto a vertical upper rear surface of duct plate 199, and hydraulic motor 19 with output shaft 155 is fitted onto a vertical lower front surface of duct plate 199.

Motor casing 200 is fixed onto the front surface of duct plate 199 so as to incorporate hydraulic motor 19, and valve casing 201 of drive-mode change valve 135 is fixed onto a front surface of motor casing 200. Rotary valve shaft 158 having valve port portion 158a with the pair of valve ports 135d is rotatably inserted into valve casing 201, similarly to that in drive-mode change valve casing 135a.

Duct plate 199 is bored therein with fluid ducts corresponding to respective fluid ducts 144 and 141. A forwardly opened fluid duct 199a is bored in duct plate 199 so as to correspond to a part of fluid duct 144. The other structure of duct plate 199 than fluid duct 199a is similar to that of duct plate 154. In valve casing 201, fluid ducts corresponding to fluid ducts 135*e*, 135*f*, 135*g* and 135*h* are bored, and a rearwardly opened fluid duct 201*a* is extended from the fluid duct corresponding to fluid duct 135*e*. In a side wall of motor casing 200, a fore-and-aft penetrating fluid duct 200*a* corresponding to fluid pipe 145 is bored so as to be opened at its front end to fluid duct 201*a*, and opened at its rear end to fluid duct 199*a*. Similarly, a fluid duct corresponding to fluid pipe 142 (not shown) is also bored in motor casing 200 so as to be opened to the fluid duct in duct plate 199 corresponding to fluid duct 141, and opened to the fluid duct in valve casing 201 corresponding to fluid duct 135*f*.

In this way, with respect to the embodiment shown in FIG. 23, the fluid supply system for supplying fluid from the closed fluid circuit formed in duct plate 199 of HST 30 to drive-mode change valve 135 includes no exposed fluid pipe such as fluid pipes 145 and 142, thereby facilitating for assembling of transaxle 35.

Figure 24:
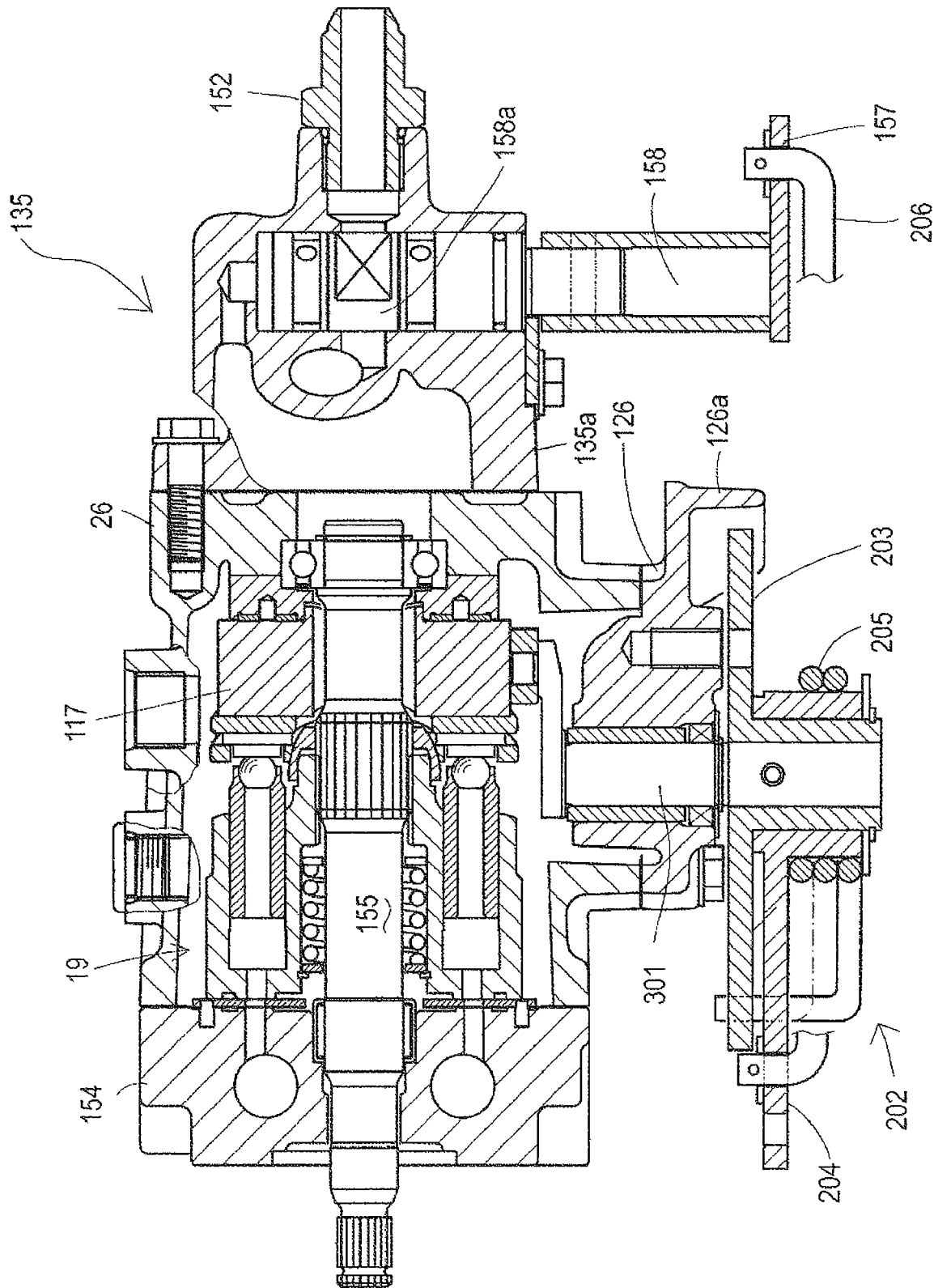
FIG. 24 is a sectional plan view of a front portion of main hydrostatic transaxle 35, showing an alternative linkage system 212 interposed between sub-speed control arm 172 and drive-mode change operation arm 157.
Figure 25:
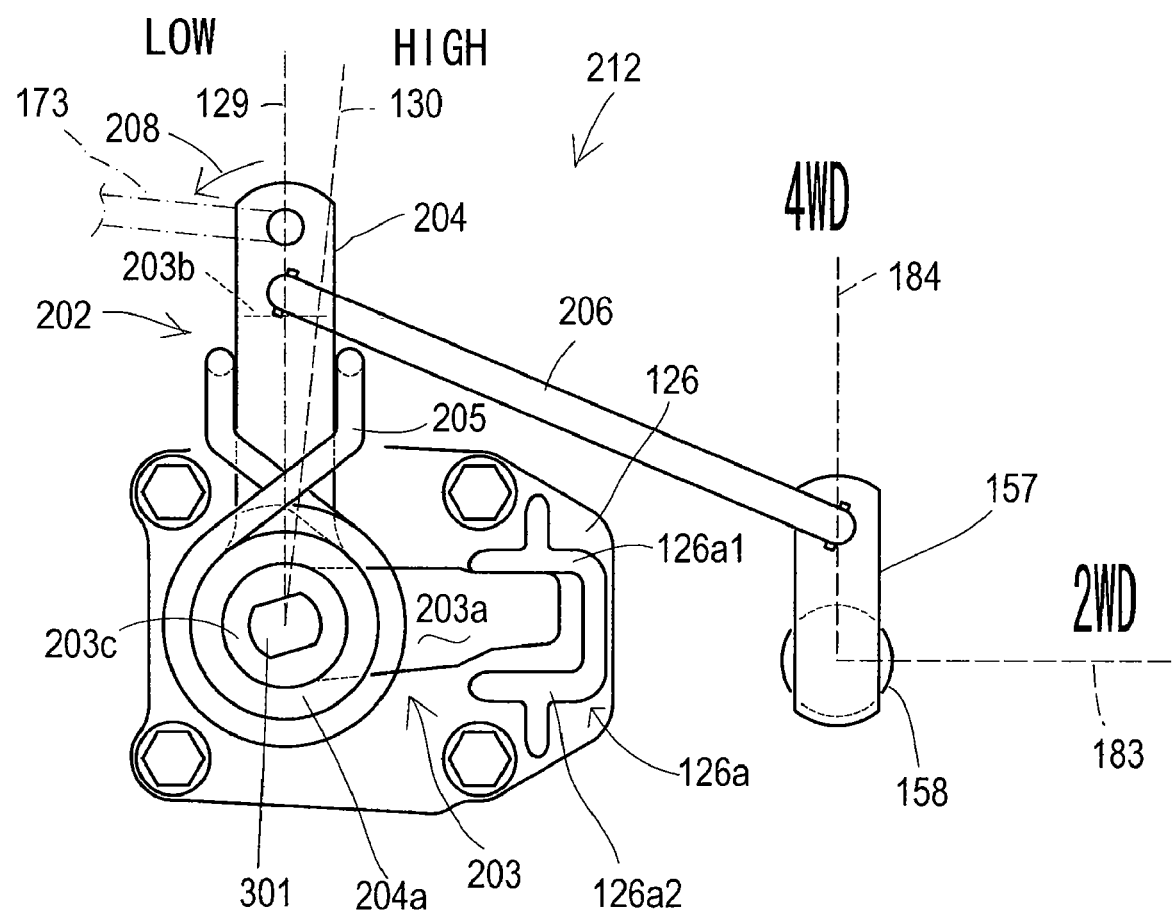
FIG. 25 is a right side view of a front portion of main hydrostatic transaxle 35, showing linkage system 212 setting drive-mode change operation arm 157 at the four-wheel drive mode position.
Figure 26:
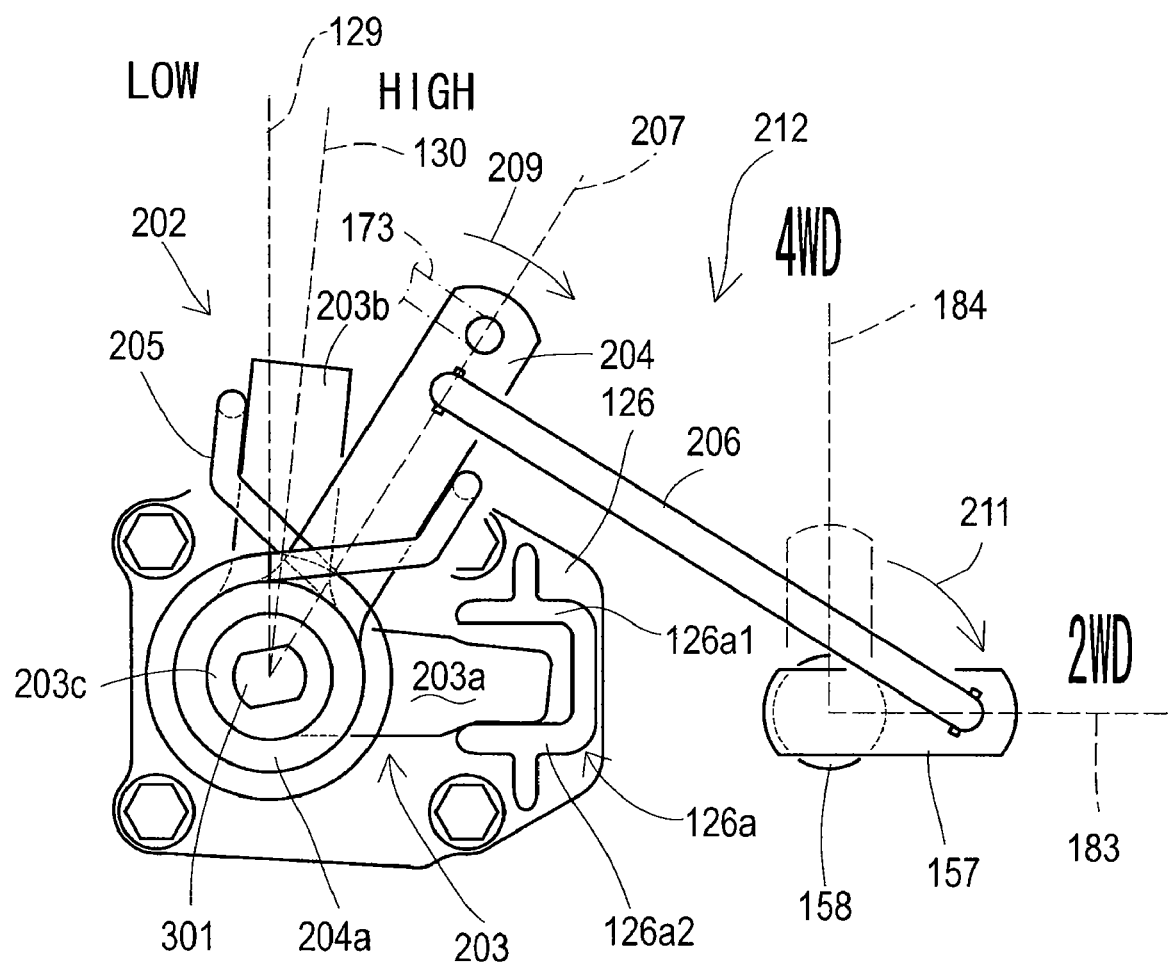
FIG. 26 is a right side view of a front portion of main hydrostatic transaxle 35, showing linkage system 212 setting drive-mode change operation arm 157 at the two-wheel drive mode position.

Referring to FIGS. 24 to 26, an alternative linkage system 212 for linking the drive-mode change operation to the sub-speed change operation will be described. In this regard, a sub-speed control arm assembly 202 is provided on the distal end of control shaft 301 projecting outward from side cover 126. Sub-speed control arm assembly 202 includes an L-shaped restriction arm 203 fixed on control shaft 301, an operation arm 204 provided on control shaft 301 rotatably relative to restriction arm 203, and a spring 205 interposed between arms 203 and 204. Connection rod 173 extended from sub-speed control lever 174 is pivoted at its end onto a tip portion of operation arm 204. A link rod 206 is extended from drive-mode change operation arm 157, and is pivoted at its end onto an intermediate portion of operation arm 204. In this way, linkage system 212 comprises: sub-speed control arm assembly 202 including arms 203 and 204; drive-mode change operation arm 157; and link rod 206 interposed between arms 204 and 157.

L-shaped restriction arm 203 includes: a boss 203*c* fixed on control shaft 301; a restriction portion 203*a* extended forward from boss 203*c*; and a connection portion 203*b* extended upward from boss 203*c* perpendicular to restriction portion 203*a*. As mentioned above, U-shaped restriction wall 126*a* is formed on side cover 126 so as to have upper and lower wall portions 126*a*1 and 126*a*2, and restriction portion 203*a* is fitted into restriction wall 126*a* between upper and lower wall portions 126*a*1 and 126*a*2. Operation arm 204 is formed at its bottom portion with a boss 204*a* relatively rotatably fitted on boss 203*c* of restriction arm 203. While operation arm 204 connected to sub-speed control lever 174 and drive-mode change operation arm 157 is rotatable between low-speed position 129 corresponding to the low-speed position of sub-speed control lever 174 and a lever's high-speed position 207 corresponding to the high-speed position of sub-speed control lever 174, upper and lower wall portions 126*a*1 and 126*a*2 of restriction wall 126*a* restrict the rotatable range of connection portion 203*b* of restriction arm 203 fixed on control shaft 301 between low-speed position 129 corresponding to the low-speed (large displacement) position of motor swash plate 117 and motor's high-speed position 130, which is nearer to low-speed position 129 than lever's high-speed position 207 and corresponds to the high-speed (small displacement) position of motor swash plate 117.

Spring 205 is wound around boss 204*c* of operation arm 204. Both end portions of spring 205 are twisted to cross each other, and extended so as to pinch connection portion 203*b* of restriction arm 203 and operation arm 204.

As a result of this configuration, when sub-speed control lever 174 having been disposed at the low-speed position is operated to the high-speed position, operation arm 204 connected to sub-speed control lever 174 through connection rod 173 is rotated from low-speed position 129 to lever's high-speed position 207 in a direction designated by an arrow 209, so as to rotate drive-mode change operation arm 157 connected to operation arm 204 through link rod 206 from four-wheel drive mode position 184 to two-wheel drive mode position 183 in a direction designated by an arrow 211.

As a result of spring 205, connection portion 203*b* of restriction arm 203 is rotated together with operation arm 204 from low-speed position 129 in the direction designated by arrow 209. When connection portion 203*b* of restriction arm 203 rotated from low-speed position 129 reaches motor's high-speed position 130 corresponding to the high-speed position of motor swash plate 117, restriction portion 203*a* of restriction arm 203 abuts at its bottom edge against an upper surface of lower wall portion 126*a*2 of restriction wall 126*a*, thereby stopping the rotation of restriction arm 203. However, sub-speed control lever 174 is still rotated to its high-speed position so that operation arm 204 still rotates according to the rotation of sub-speed control lever 174 against spring 205 (in this state, operation arm 204 pushes one end portion of spring 205 away from the other end portion of spring 205 retained by connection portion 203*b* of restriction arm 203). When operation arm 204 reaches lever's high-speed position 207 corresponding to the high speed position of sub-speed control lever 174, drive-mode change operation arm 157 reaches two-wheel drive mode position 183.

On the contrary, when sub-speed control lever 174 having been disposed at the high-speed position is operated to the low-speed position, operation arm 204 is rotated from the lever's high-speed position 207 to low-speed position 129 through motor's high-speed position 130 in a direction designated by an arrow 208. During rotation of operation arm 204 from the lever's high-speed position 207 to motor's high-speed position 130, restriction arm 203 is retained at motor's high-speed position 130 by lower wall portion 126*a*2 of restriction wall 126*a*. During rotation of operation arm 204 from motor's high-speed position 130 to low-speed position 129, restriction arm 203 is rotated integrally with operation arm 204. When restriction portion 203*a* of restriction arm 203 abuts at its upper edge against a lower surface of upper wall portion 126*a*1 of restriction wall 126*a*, connection portion 203*b* of restriction arm 203 and operation arm 204 reach low-speed position 129. As a result of the rotation of operation arm 204 from lever's high-speed position 207 to low-speed position 129, drive-mode change operation arm 157 connected to operation arm 204 through link rod 206 is rotated from two-wheel drive mode position 183 to four-wheel drive mode position 184.

In comparison with linkage system 189, linkage system 212 includes no component, such as link arm 179 having short and long link portions 179*a* and 179*b*, which must be formed to correspond to the difference of link ratio between sub-speed control arm 127 and pivot shaft 181 from the link ratio between pivot shaft 181 and drive-mode change operation arm 157. Therefore, linkage system 212 can be easily configured with fewer components.

Additionally, drive-mode change operation arm 157 can be optionally rotated for changing the drive-mode of vehicle 1, and the sub-speed stage can be automatically changed by the drive-mode changing operation. In this regard, when drive-mode change operation arm 157 is disposed at four-wheel drive mode position 184, operation arm 204 connected to drive-mode change operation arm 157 through link rod 206 is retained at low-speed position 129 so as to be disposed in parallel to drive-mode change operation arm 157 disposed at four-wheel drive mode position 184. In this state, spring 205 biases operation arm 204 and connection portion 203b of restriction arm 203 in the direction designated by arrow 208, so that restriction portion 203a of restriction arm 203 is pressed against upper wall portion 126a1 of restriction wall 126a so as to retain connection portion 203b at low-speed position 129.

When drive-mode change operation arm 157 is manually rotated from four-wheel drive mode position 184 to two-wheel drive mode position 183 in the direction designated by arrow 211, operation arm 204 connected to drive-mode change operation arm 157 through link rod 206 is rotated from low-speed position 129 to lever's high-speed position 207 in the direction designated by arrow 209. During the rotation of operation arm 204 from low-speed position 175 to motor's high-speed position 130, restriction arm 203 is rotated integrally with operation arm 204 by spring 205 so as to shift motor swash plate 117 from the low-speed (large displacement) position to the high-speed (small displacement) position. While operation arm 204 rotates from motor's high-speed position 130 to lever's high-speed position 207 against spring 205, connection portion 203b of restriction arm 203 is retained at motor's high-speed position 130 by pressing restriction portion 203a of restriction arm 203 against lower wall portion 126a2 of restriction wall 126a.

When drive-mode change operation arm 157 is rotated from two-wheel drive mode position 183 to four-wheel drive mode position 184, motor swash plate 117 is retained at the high-speed (small displacement) position during the rotation of operation arm 204 from lever's high-speed position 207 to motor's high-speed position 130, and motor swash plate 117 is shifted from the high-speed (small displacement) position to the low-speed (large displacement) position by the rotation of restriction arm 203 together with operation arm 204 from motor's high-speed position 130 to low-speed position 129.

In this way, linkage system 212 links the drive-mode change operation to the sub-speed change operation, and links the sub-speed change operation to the drive-mode change operation. In linkage system 212, spring 205 functions as a cushion mechanism which allows the rotation of operation arm 204 for rotating drive-mode change operation arm 157 to two-wheel drive mode position 183 while restriction arm 203 is retained for retaining motor swash plate 117 at its high-speed (small displacement) position.

Referring to FIGS. 27 to 42, four embodiments of auxiliary pumps for supplying fluid to hydraulically driven devices, adaptable to either transaxle 3 or 35, will be described. Referring to one embodiment shown in FIGS. 27 and 28, an auxiliary pump casing 213a incorporating a circumscribed gear pump serving as an auxiliary pump 213 is fitted onto a front surface of an alternative charge pump casing 76 incorporating charge pump 15, and fastened together with charge pump casing 176 to duct plate 154 (this is representative. It may be duct plate 48 or 199) by bolts 231. A pump drive shaft 227 drivingly connected to engine 14 is coaxially and rotatably integrally connected to input shaft 16 through a sleeve 232 journalled between casings 176 and 213a through a bearing. In this way, charge pump 15 and auxiliary pump 213 are aligned coaxially to input shaft 16.

Auxiliary pump 213 includes mutually meshing gears 228 and 230 disposed in auxiliary pump casing 213a. Gear 228 is formed on pump drive shaft 227, and gear 230 is formed on a pump driven shaft 229 disposed in parallel to pump drive shaft 227. By transmitting the engine power to pump drive shaft 227 and input shaft 16, charge pump 15 is driven so as to suck fluid from traveling gear chamber 72b in transaxle 3 or 35 through filter 90, and simultaneously, auxiliary pump 213 is driven so as to suck fluid extracted through port 94 from fluid flowing toward charge pump 15. Gears 228 and 230 of auxiliary pump 213 rotate to deliver the fluid into an outwardly opened delivery port 235 provided on auxiliary pump casing 213a.

In this embodiment, vehicle 1 is equipped with a front loader, and with a damping cylinder and a lifting cylinder serving as hydraulic actuators for the front loader. A delivery fluid pipe 219 is extended from delivery port 235 and fluidly connected to changeover valves 214 and 215 in a valve unit for the front loader. Changeover valve 214 is fluidly connected to the damping cylinder through ports 223 and 224 so as to control a damping action of a bucket of the front loader. Changeover valve 215 is fluidly connected to the lifting cylinder through ports 225 and 226 so as to raise and lower the front loader. A returning fluid passage 221 is disposed in the valve unit for the front loader, and a returning fluid pipe 222 is extended from the valve unit, and is interposed between fluid passage 221 and port 95 provided on duct plate 154, so as to return fluid to traveling gear chamber 72b through port 95.

Figure 27:
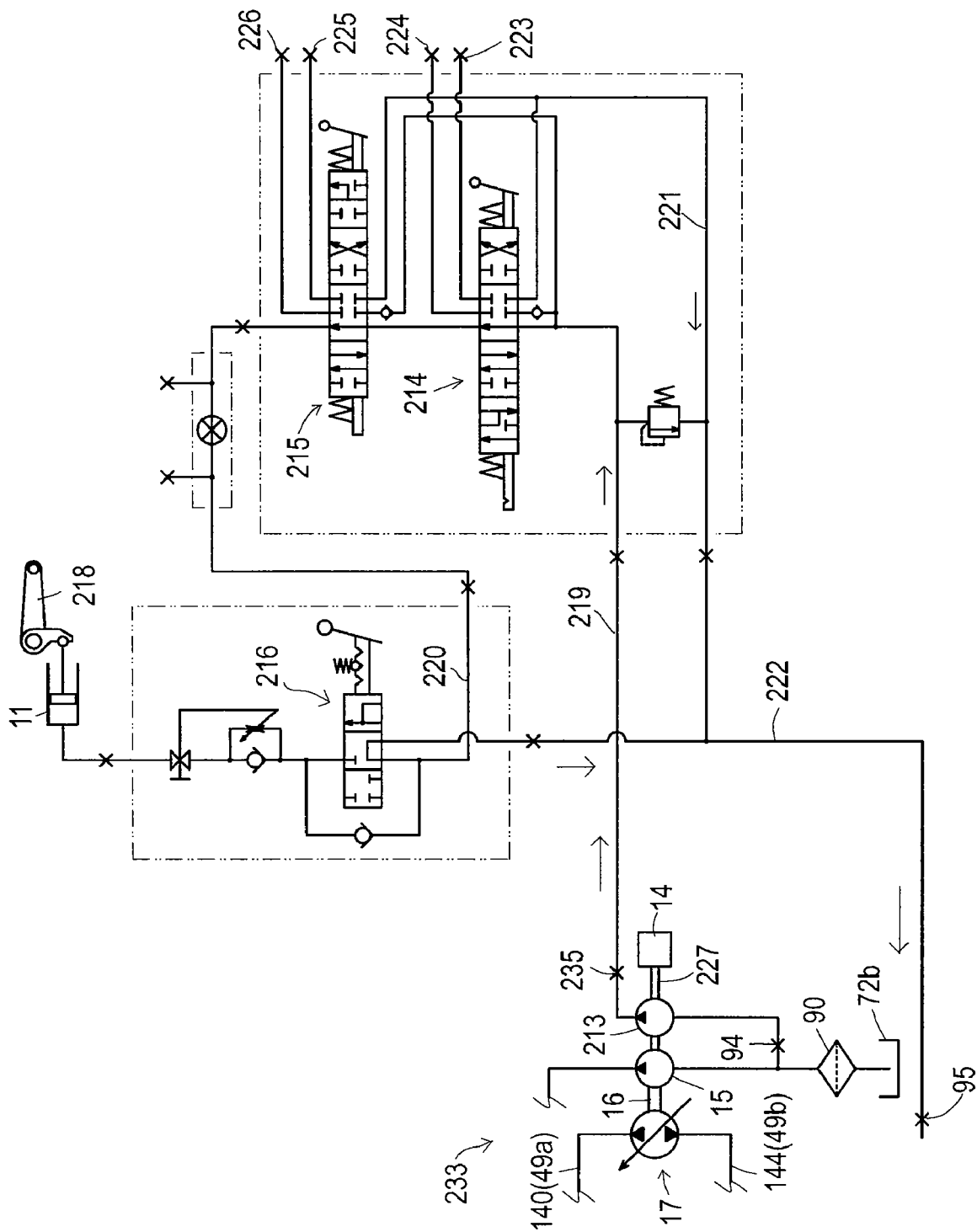
FIG. 27 is a hydraulic circuit diagram for supplying hydraulically driven devices with fluid from an auxiliary pump unit 213.
Figure 28:
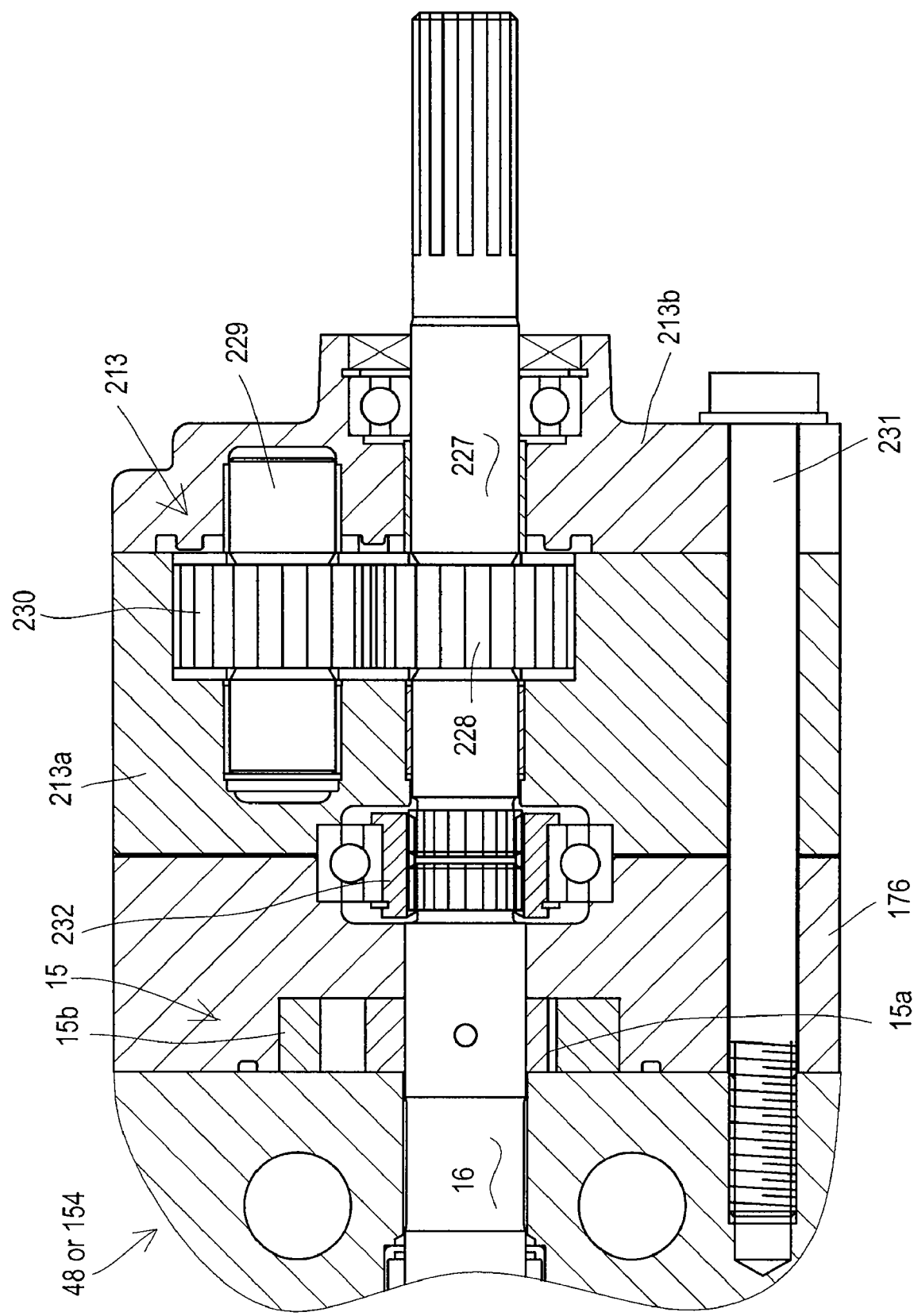
FIG. 28 is a sectional plan view of a charge pump 15 and auxiliary pump unit 213.

As shown in FIG. 27, when changeover valves 214 and 215 are disposed at their neutral positions so as to stop the damping cylinder and lifting cylinder for the front loader, the fluid from delivery port 235 and fluid pipe 219 is passed through changeover valves 214 and 215, and is supplied through a fluid passage 220 to a changeover valve 216 for hydraulic lift cylinder 11 for rotating lift arms 218 to be connected to a rear-mount working machine disposed behind vehicle 1. The fluid drained from changeover valve 216 is joined to fluid passage 222 so as to be returned to traveling gear chamber 72b through port 95.

In this way, auxiliary pump 213 sufficiently supplies fluid for driving the front loader and lift arms 218 while charge pump 15 supplies fluid to HST 20 or 30, main PTO clutch 37 and power steering cylinder 70.

Figure 29:
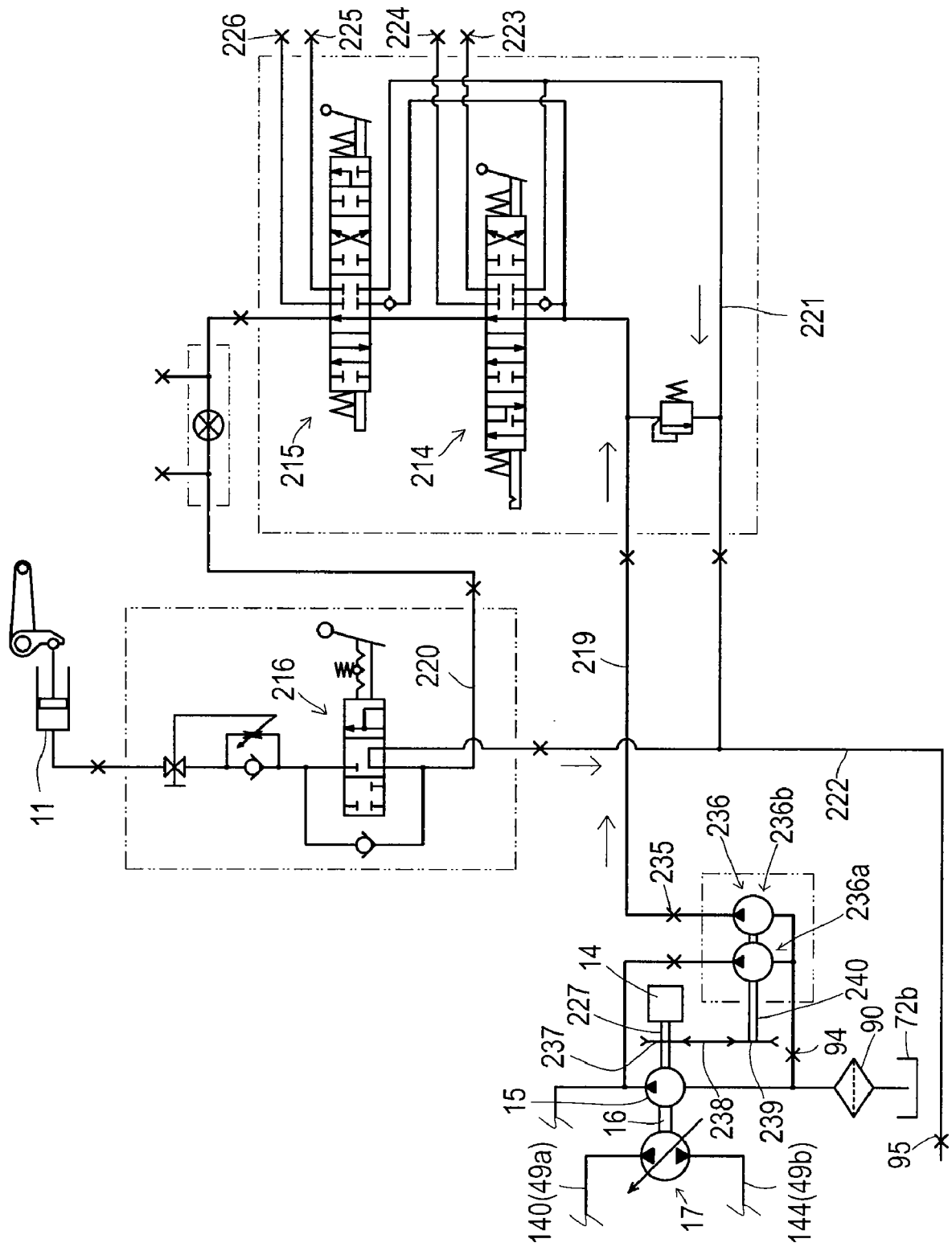
FIG. 29 is a hydraulic circuit diagram for supplying hydraulically driven devices with fluid from an alternative double auxiliary pump unit 236.
Figure 30:
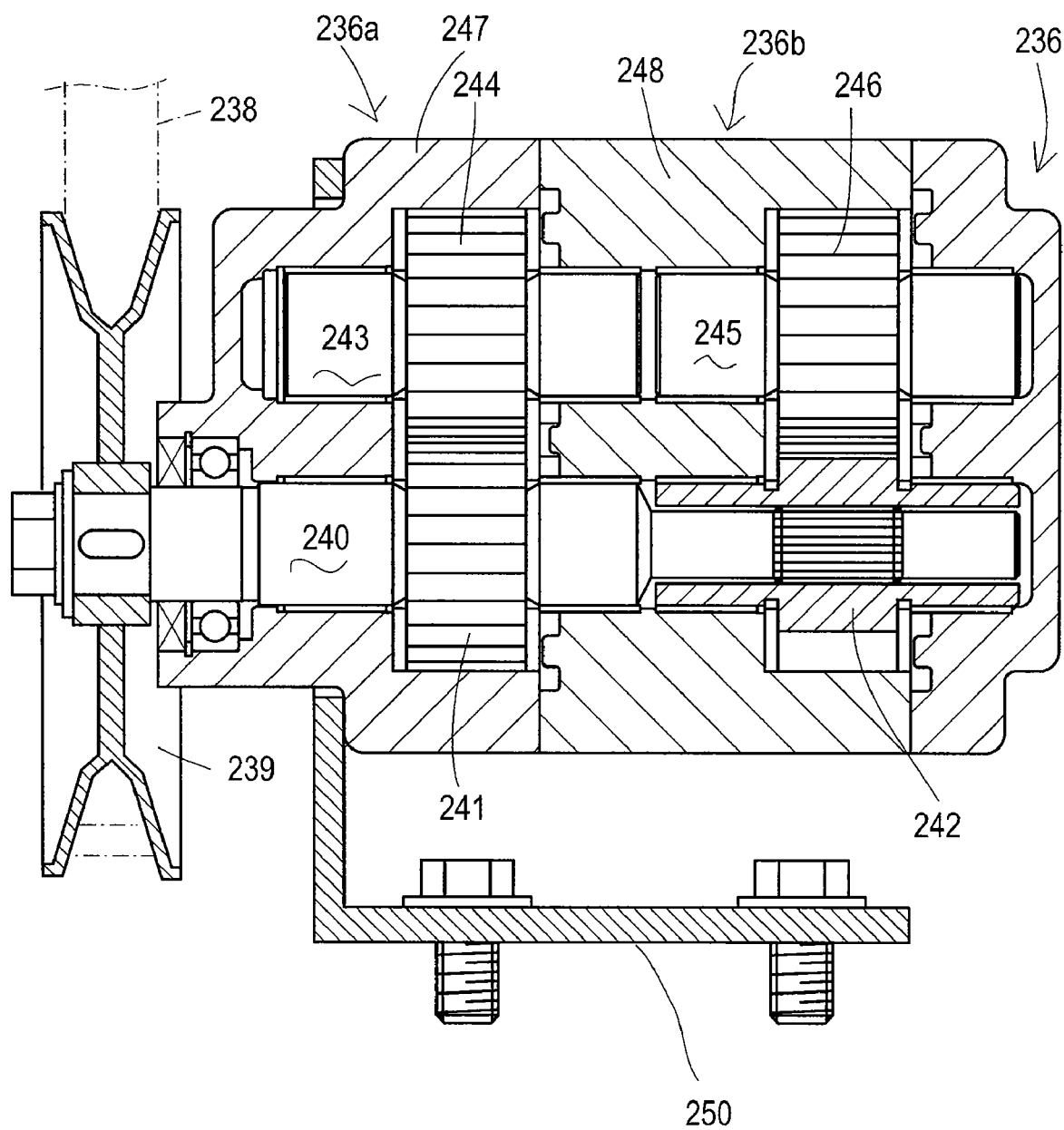
FIG. 30 is a sectional plan view of auxiliary pump unit 236.

FIGS. 29 and 30 illustrate an alternative auxiliary dual pump unit 236. In pump unit 236, a second auxiliary pump casing 248 incorporating a second auxiliary pump 236b is fixed onto a front surface of a first auxiliary pump casing 247 incorporating a first auxiliary pump 236a. Pump unit 236 includes a stay 250 fixed on first auxiliary pump casing 247 so as to be fastened to an outer surface of engine 14 or transaxle casing 3 or 35.

Mutually joined pump casings 247 and 248 incorporate a pump drive shaft 240, on which a drive gear 241 is formed or fixed in first auxiliary pump casing 247, and on which a drive gear 242 is formed or fixed in second auxiliary pump casing 248. In first auxiliary pump casing 247, a pump driven shaft 243 is supported in parallel to pump drive shaft 240, and is formed or fixed thereon with a driven gear 244 meshing with drive gear 241 so as to constitute first auxiliary pump 236a. In second auxiliary pump casing 248, a pump driven shaft 245 is supported in parallel to pump drive shaft 240, and is formed or fixed thereon with a driven gear 246 meshing with drive gear 242 so as to constitute second auxiliary pump 236b.

A pulley 239 is fixed on a rear end of pump drive shaft 240, a pulley 237 is fixed on pump drive shaft 227 interposed between engine 14 and input shaft 16, and a belt 238 is interposed between pulleys 237 and 239 so as to transmit the engine power to pump drive shaft 240, thereby driving first and second auxiliary pumps 236a and 236b.

By transmitting the engine power to pump drive shaft 227 and input shaft 16, charge pump 15 is driven so as to suck fluid from traveling gear chamber 72b in transaxle 3 or 35 through filter 90, and simultaneously, first and second auxiliary pumps 236a and 236b are driven so as to suck fluid extracted through port 94 from fluid flowing toward charge pump 15.

Fluid delivered from first auxiliary pump 236a is joined to the fluid delivered from charge pump 15, so as to be sufficiently supplied to main PTO clutch 37 and power steering cylinder 70. Similar to the fluid delivered from auxiliary pump 213, fluid delivered from second auxiliary pump 236b is supplied to the valve unit for the front loader including changeover valves 214 and 215, then it is supplied to hydraulic lift cylinder 11 for rotating lift arms 218, and it is returned to traveling gear chamber 72b through port 95. As a result of auxiliary pump unit 236, charge pump 15 can sufficiently supply fluid to the closed fluid circuit of HST 20 or 30.

Referring to FIGS. 31 to 39, an alternative auxiliary pump unit 400 for supplying fluid to hydraulic lift cylinder 11 for rotating lift arms 218 is provided on a front end of transaxle 3 or 35 so as to be offset from input shaft 16. With respect to the present embodiment, auxiliary pump unit 400 provided on transaxle 3 including mechanical drive-mode change clutch 29 is illustrated, however, auxiliary pump unit 400 can be provided on the front end of transaxle 35 incorporating drive-mode change valve 135.

Figure 34:
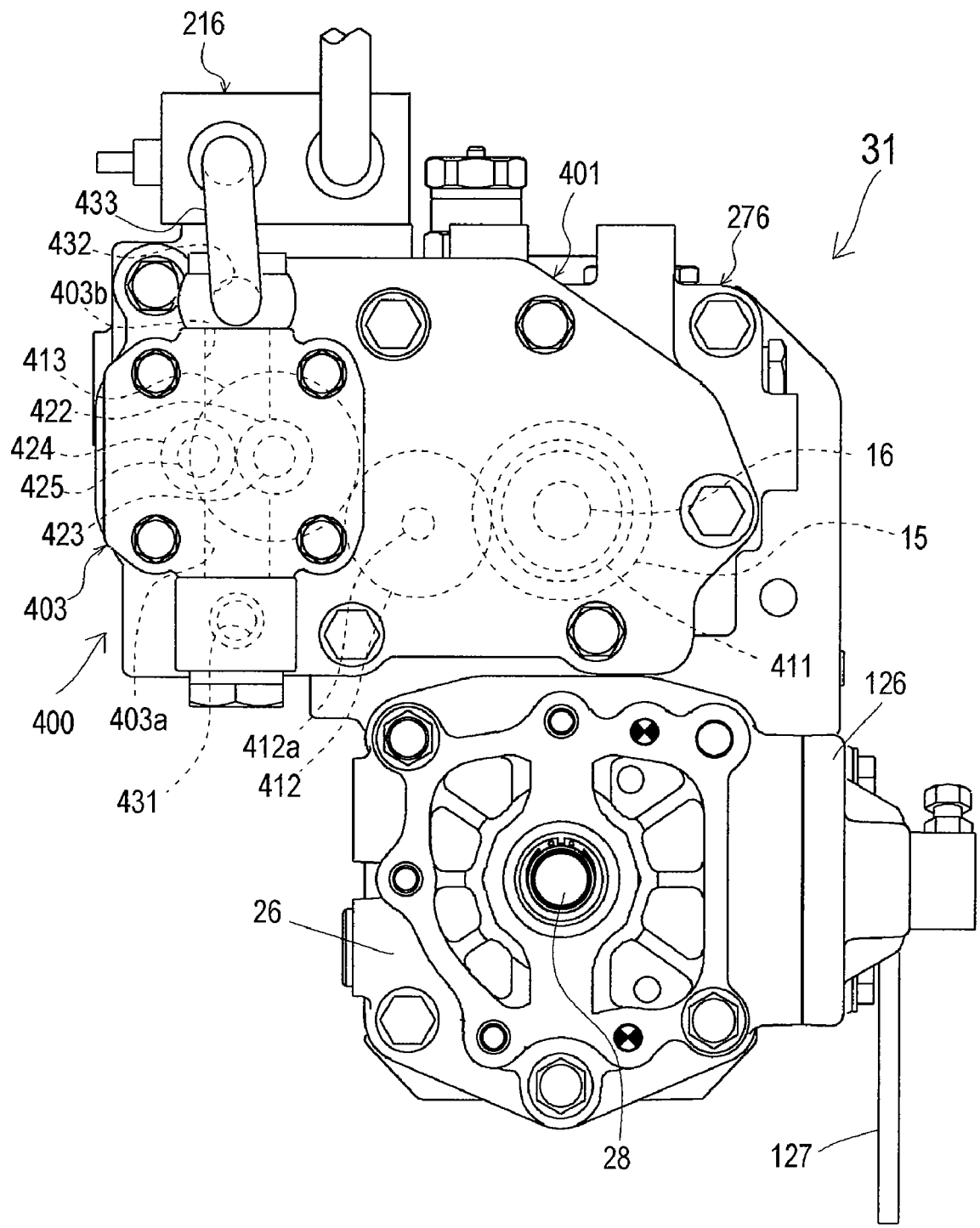
FIG. 34 is a front view of a front unit 31 of main hydrostatic transaxle 3, including auxiliary pump unit 400.
Figure 36:
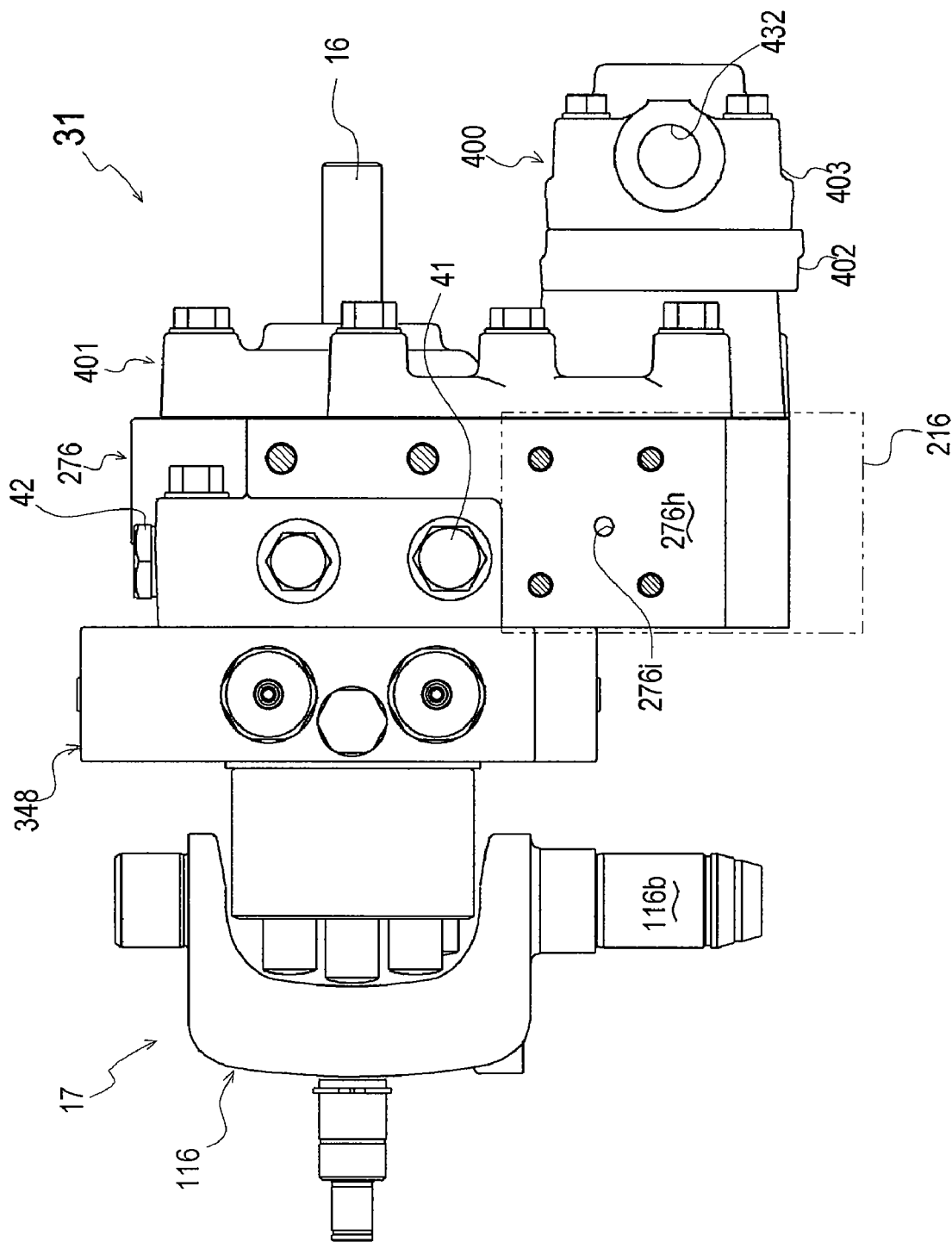
FIG. 36 is a plan view of front unit 31 including auxiliary pump unit 400.

In this embodiment, an alternative charge pump casing 276 of charge pump 15 is fixed on a front surface of an alternative duct plate 348, auxiliary pump unit 400 is mounted on a front surface of charge pump casing 276, hydraulic pump 17 is fitted onto a rear surface of duct plate 348, hydraulic motor 19 is fitted onto the front surface of duct plate 348, and motor casing 26 is fixed onto duct plate 348 so as to incorporate hydraulic motor 19, thereby constituting a front unit 31 as shown in FIGS. 34 to 36. To constitute front unit 31 for transaxle 3, clutch casing 27 incorporating drive-mode change clutch 29 is fixed on the front surface of motor casing 27, as illustrated. Alternatively, to constitute front unit 31 for transaxle 35, drive-mode change valve 135 is fixed on the front surface of motor casing 27. Duct plate 348 of front unit 31 is fixed onto the front surface of front casing part 96, thereby completing transaxle 3 or 35.

Figure 32:
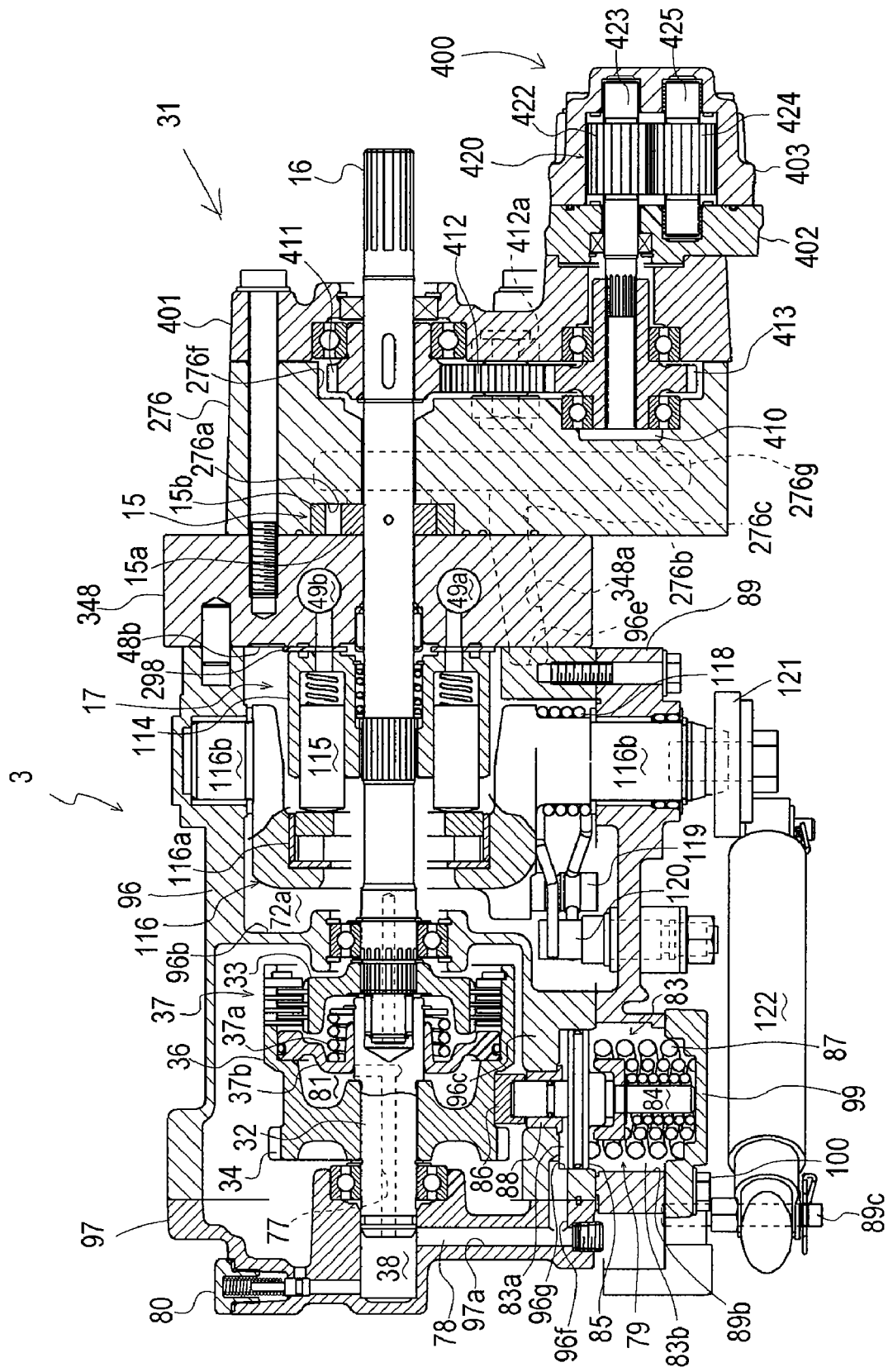
FIG. 32 is a sectional plan view of a front portion of main hydrostatic transaxle 3, showing auxiliary pump unit 400 and the gear train for auxiliary pump unit 400 therein.
Figure 33:
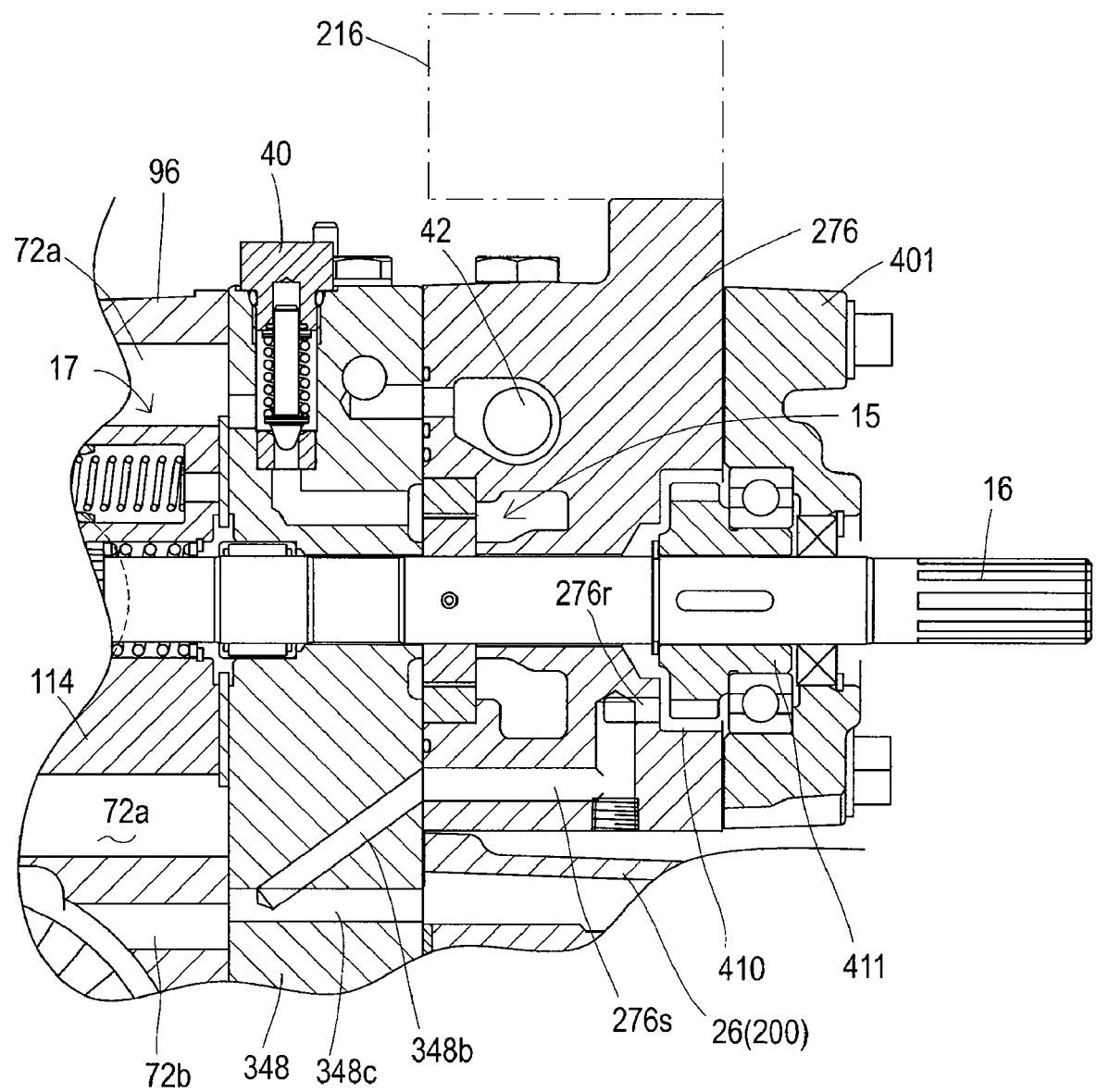
FIG. 33 is a fragmentary sectional side view of main hydrostatic transaxle 3 provided with alternative auxiliary pump unit 400, showing its portion incorporating charge pump 15.

As shown in FIG. 32, duct plate 348 is bored therein with a fore-and-aft penetrating fluid duct 348a. Fluid duct 348a is opened at its rear end to port 96e formed in front casing part 96, so as to receive fluid from traveling gear chamber 72b in front casing part 96 through fluid duct 92, and opened at its front end to a rear end opening of a fore-and-aft fluid duct 276b formed in charge pump casing 276.

Figure 38:
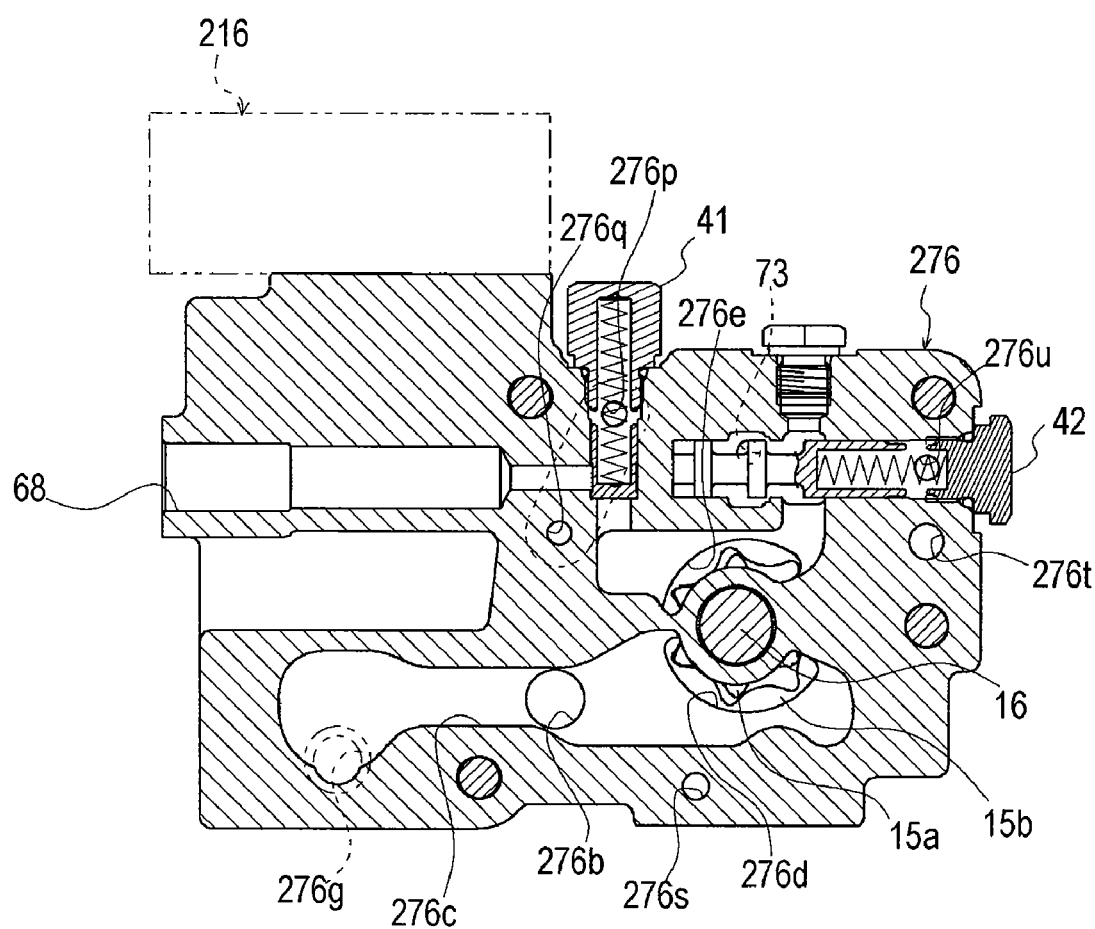
FIG. 38 is a sectional front view of auxiliary pump unit 400.

As shown in FIGS. 32 and 38, in charge pump casing 276, a fluid duct 276b is connected to a lateral intermediate portion of a laterally extended suction fluid gallery 276c. Suction fluid gallery 276c is connected at its left end to a suction port 276d. Suction port 276d is opened to a pump chamber 276a incorporating inner and outer rotors 15a and 15b of charge pump 15. In this way, fluid is supplied from traveling gear chamber 72b to pump chamber 276a.

A delivery port 276e is also opened to pump chamber 276a. Duct plate 348 is provided therein with relief valve 40 and the pair of charge check valves 43F and 43R (with orifice 44), and as shown in FIG. 38, charge pump casing 276 is provided therein with port 68, resistance valve 41 and reducing valve 42, similar to those in duct plate 48 and charge pump casing 76 as mentioned above. The fluid delivered from charge pump 15 into delivery port 276e is supplied to HST 20 or 30 through relief valve 40, reducing valve 42 and charge check valve 43F or 43R, and a part of the fluid is supplied to power steering cylinder 70 through resistance valve 41 and changeover valve 67. A fluid duct 276u is bored in charge pump casing 276 so as to serve as a delivery fluid duct from charge pump 15 to reducing valve 42, and fluid duct 73 is bored in charge pump casing 276 so as to supply fluid from reducing valve 42 to charge check valves 43F and 43R. The fluid drained from power steering cylinder 70 is introduced into port 69 formed on a left side surface of charge pump casing 276 as shown in FIG. 35, and returned to pump chamber 72a through a fore-and-aft fluid duct 276t formed in charge pump casing 276. Further, the fluid released from reducing valve 42 is supplied to PTO clutch control valve 39. In detail, the fluid delivered from charge pump 15 is supplied on the route as mentioned above.

Auxiliary pump unit 400 includes: a gear cover 401 fixed on a front surface of charge pump casing 276; a connection block 402 fixed on a front surface of gear cover 401; an auxiliary pump casing 403 fixed on a front surface of connection block 402; and auxiliary pump 420 disposed in auxiliary pump casing 403. Mutually joined connection block 402 and auxiliary pump casing 403 are offset laterally (rightward) from input shaft 16 projecting forward from gear cover 401.

A forward opened recess 276f is formed in charge pump casing 276, and covered at its front opening with the rear surface of gear cover 401 so as to serve as a gear chamber 410, which incorporates gears 411, 412 and 413 serving as a gear train for transmitting the rotary force of input shaft 16 to auxiliary pump 420 disposed in auxiliary pump casing 403. Gear 411 is fixed on input shaft 16 through a pair of opposite radial retaining pins 411a as shown in FIG. 35. A counter gear shaft 412a is disposed in parallel to input shaft 16, and supported at its front end by gear cover 401, and at its rear end by charge pump casing 276. Gear 412 is provided on counter gear shaft 412a in gear chamber 410 and meshes with gear 411. Gear 413 is journalled by charge pump casing 276 and gear cover 401 through respective bearings, and meshes with gear 412.

In auxiliary pump casing 403, auxiliary pump 420 includes mutually circumscribed-meshing drive and driven gears 422 and 424. Drive gear 422 is formed or fixed on a pump drive shaft 423, and driven gear 424 is formed or fixed on a pump driven shaft 425. Shafts 423 and 425 are disposed in parallel to each other and in parallel to input shaft 16 and counter gear shaft 412a, and are rotatably supported at their front ends by auxiliary pump casing 403, and at their rear portions by connection block 402. Pump drive shaft 423 is extended rearward from connection block 402, and rotatably integrally spline-fitted into a forwardly extended boss of gear 413 in gear cover 401. In this way, gears 422 and 424 of auxiliary pump 420 are driven by the rotary force of input shaft 16 through gears 411, 412 and 413.

Figure 39:
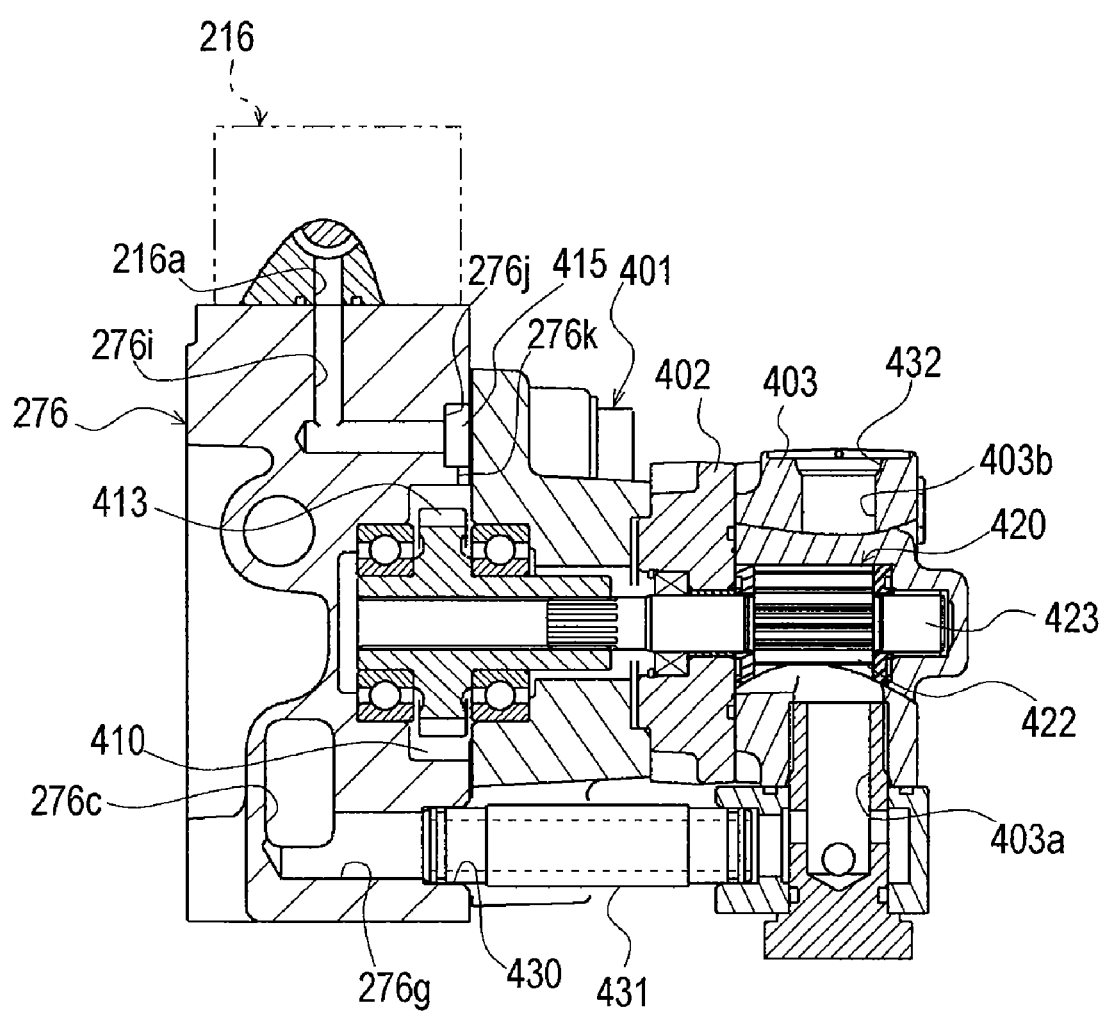
FIG. 39 is a sectional side view of auxiliary pump unit 400.

Auxiliary pump 420 receives a part of fluid supplied to charge pump 15, and supplies fluid to changeover valve 216 for controlling hydraulic lift cylinder 11 for rotating lift arms 218. In this regard, charge pump casing 276 is formed therein with laterally extended suction fluid gallery 276c connected at its left end to suction port 276d of charge pump 15, as shown in FIG. 38, and is formed in its rightward expanded portion with a fore-and-aft penetrating fluid duct 276g connected at its front end to a right end of suction fluid duct 276c, as shown in FIG. 39. Namely, suction fluid gallery 276c distributes fluid therein between charge pump 15 and auxiliary pump 420.

As shown in FIG. 39, the front opening of fluid duct 276g is formed as a port 430, into which a fore-and-aft horizontal fluid pipe 431 is fitted at its rear end. Auxiliary pump casing 403 is provided therein with a vertical fluid duct 403a. Fluid pipe 431 is fitted at its front end into charge pump casing 403, and is connected to a bottom portion of fluid duct 403a. Fluid duct 403a is connected at its top end to a suction port of auxiliary pump 420 just below gears 422 and 424.

In auxiliary pump casing 403, a vertical delivery fluid duct 403b is bored and extended upward from a delivery port of auxiliary pump 420 just above gears 422 and 424. As shown in FIG. 34, a port 432 is provided onto a top of charge pump casing 403, and is connected to the top of delivery fluid duct 403b. A fluid pipe 433 is extended from port 432, and is connected to changeover valve 216 for hydraulic lift cylinder 11 for rotating lift arms 218.

Changeover valve 216 is fixedly mounted on a horizontal top surface 276h of charge pump casing 276, as shown in FIG. 36. As shown in FIGS. 35 and 39, a forwardly opened recess 276j is formed in charge pump casing 276 along the upper edge of gear chamber 410, and covered with the rear surface of gear cover 401 so as to serve as a drain fluid gallery 415. A vertical fluid duct 276i is extended upward from a right end of drain fluid gallery 415, so that fluid from a tank port 216a of changeover valve 216 falls through fluid duct 236i into drain fluid gallery 166. Drain fluid gallery 415 is connected to gear chamber 410 through a connection duct 276k facing gear 413 on pump drive shaft 423. Gear chamber 410 is configured so that gear 413 is disposed slightly higher than gears 412 and 411. Therefore, the fluid collected in drain fluid gallery 415 is gradually dropped through connection duct 276k onto gear 413 in gear chamber 410, so as to lubricate all gears 413, 412 and 411 in gear chamber 410. Incidentally, drain fluid gallery 415 may be connected at its left end portion to port 69 so as to collect fluid from power steering cylinder 70.

Figure 37:
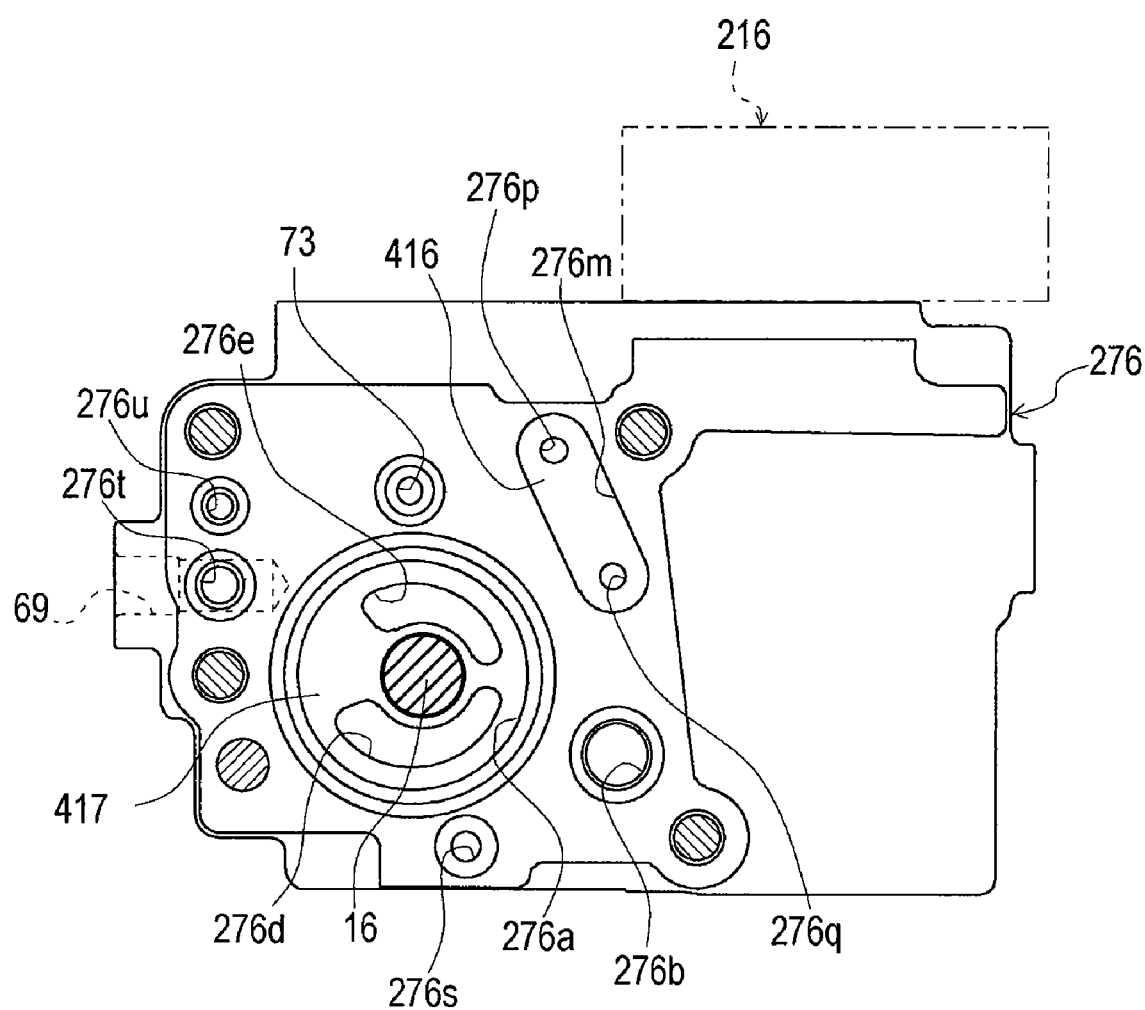
FIG. 37 is a rear view of auxiliary pump unit 400.

As shown in FIGS. 35 and 37, a rearwardly opened recess 276m is formed in charge pump casing 276, and covered with the front surface of duct plate 348 so as to serve as a fluid gallery 416. A fluid duct 276p is extended from resistance valve 41 (not shown) disposed in charge pump casing 276, and is opened to an upper end portion of fluid gallery 416. A fluid duct 276q is extended from a laterally middle upper portion of gear chamber 410, and is opened to a lower end portion of fluid gallery 416. In this way, fluid leaked from a spring chamber of resistance valve 41 is drained into gear chamber 410 through fluid duct 276p, fluid gallery 416 and fluid duct 276q, so as to be prevented from being applied onto resistance valve 41 as a hydraulic backpressure.

Figure 31:
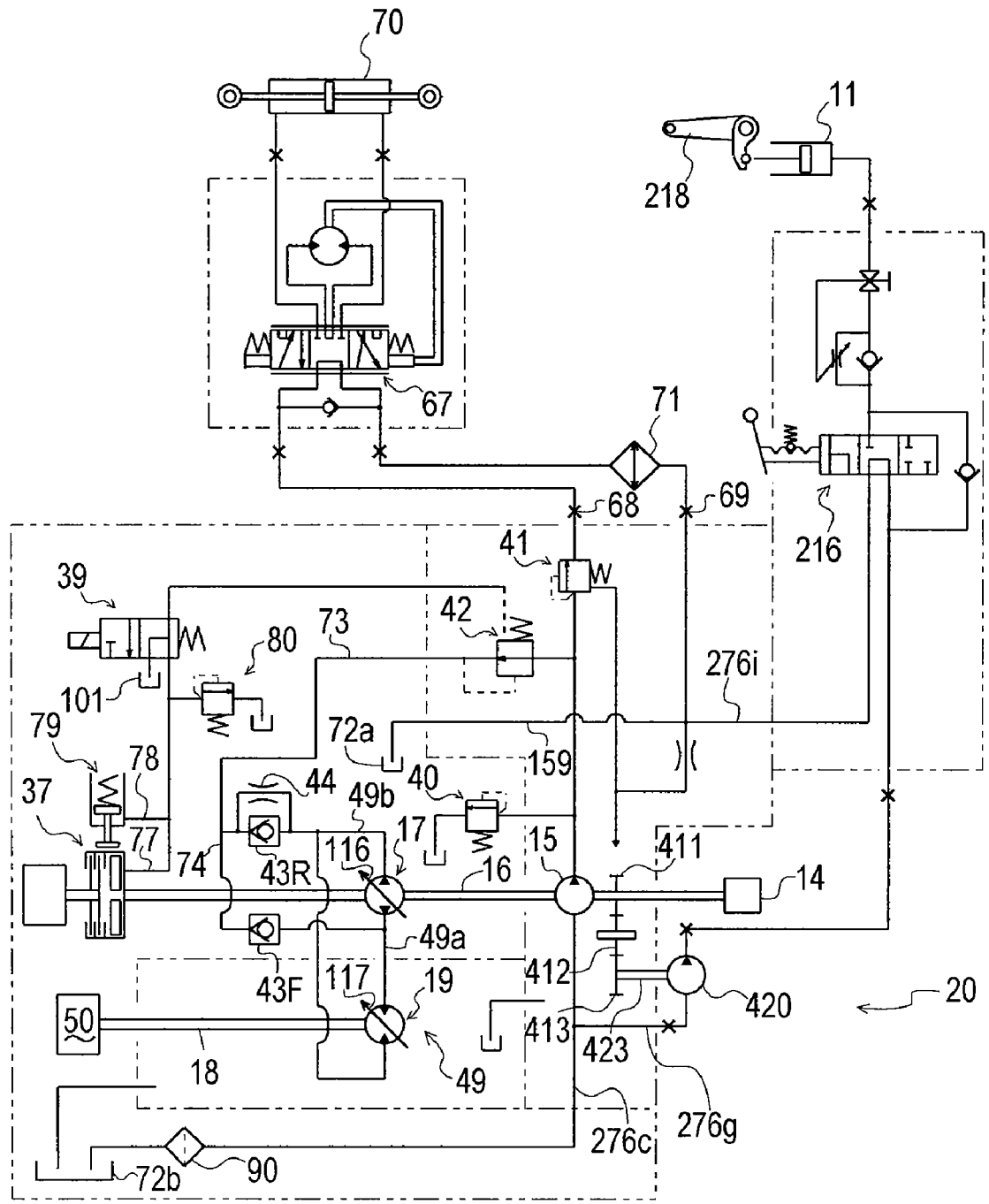
FIG. 31 is a hydraulic circuit diagram of hydrostatic transaxle 3 for supplying hydraulic driven devices with fluid from charge pump 15 and an auxiliary pump 401 in an alternative auxiliary pump unit 400.

As shown in FIGS. 31 and 35, a laterally extended fluid hole 276r is opened at a bottom portion of gear chamber 410 between gears 411 and 412. In charge pump casing 276, a fluid duct 276s is extended from hole 276r and opened rearward. A rearwardly and downwardly slanted fluid duct 348b and a horizontal fluid duct 348c are bored in duct plate 348. Fluid duct 348b is connected at its upper front end to fluid duct 276s in charge pump casing 276, and at its lower rear end to fluid duct 348c. Fluid duct 348c fore-and-aft penetrates duct plate 348, so as to be opened at its front end to a fluid sump in motor casing 26 (or 200), and at its rear end to the fluid sump in traveling gear chamber 72b in front casing part 96. In this way, fluid is smoothly drained from gear chamber 410 into motor casing 26 (or 200) and traveling gear chamber 72b, whereby gears 411, 412 and 413 are prevented from agitating resistant fluid collected at the bottom portion of gear chamber 410, thereby reducing power loss. In this regard, the opening area of fluid duct 276k to gear chamber 410 is determined so as to optimally restrict fluid dropped from drain fluid gallery 415 into gear chamber 410.

Referring to FIGS. 40 to 42, an auxiliary pump unit 500 is mounted on a rear end of hydrostatic transaxle 35 having drive-mode change valve 132. Auxiliary unit 500 may be mounted on a rear end of hydrostatic transaxle 3 having drive-mode change clutch 29. The main casing of transaxle 3 or 35 and some parts and components therein shown in FIG. 40 are strictly different in shape, direction and location from those shown in FIGS. 2 and 13 because main PTO clutch 37 is not disposed coaxially to input shaft 16. However, in this embodiment, the components and parts are designated by the same reference numerals in the above embodiments if they have the same functions as those of the above embodiments.

In auxiliary pump unit 500, an auxiliary pump casing 501 is fixed on an upper rear end surface of rear casing part 97 so as to project rearward. Auxiliary pump casing 501 incorporates mutually circumscribed-meshing drive and driven gears 511 and 512 serving as an auxiliary pump 510. In auxiliary pump casing 501, a pump drive shaft 502 and a pump drive shaft 503 are disposed in parallel to each other and rotatably supported. Drive gear 511 is fixed on pump drive shaft 502, and driven gear 512 is fixed on pump driven shaft 503. Auxiliary pump casing 501 is covered at its rear end with a cover 501a. In front casing part 96, input shaft 16 is rotatably integrally connected to coaxial pump drive shaft 502 through a gear 504 just behind vertical partition wall 96b between pump chamber 72a and traveling gear chamber 72b (in traveling gear chamber 72b).

In this way, auxiliary pump 510 is driven by rotation of input shaft 16 so as to supply fluid to lift cylinder 11 for rotating the pair of left and right lift arms 218 pivoted on the top of front casing part 96 through a bracket 520. The pair of left and right lift arms 218 are rotatably integrally connected to each other through a lateral connection shaft 218a spanned in bracket 520. A piston rod of lift cylinder 11 is connected to connection shaft 218 so as to vertically rotate lift arms 218 with connection shaft 218a by its telescopic movement.

A fore-and-aft extended PTO clutch drive shaft 505 is disposed in parallel to input shaft 16 and pump drive shaft 502. A gear 506 is fixed on PTO clutch drive shaft 505 just behind partition wall 96b, and meshes with gear 504. PTO clutch drive shaft 505 is journalled by partition wall 96b through a bearing. A pump chamber bottom wall 96i is extended forward from the bottom end of partition wall 96b, and a support wall 96j projects upward from pump chamber bottom wall 96i just behind duct plate 154. PTO clutch drive shaft 505 is extended forward along pump chamber bottom wall 96i in pump chamber 72a, and is journalled at its front end by support wall 96j through a needle bearing.

PTO clutch drive shaft 505 is extended rearward from gear 506 and relatively rotatably fitted at its rear end into coaxial PTO clutch driven shaft 32. Main PTO clutch 37 is interposed between PTO clutch drive shaft 505 and PTO clutch driven shaft 32. Description of main PTO clutch 37 shown in FIG. 40 is omitted because it is the same as that shown in FIG. 2 if PTO clutch drive shaft 505 is regarded as input shaft 16. Also, the drive train from main PTO clutch 37 to mid and rear PTO shafts 9 and 13 through sub PTO clutch 112 is similar to that mentioned above.

Figure 43:
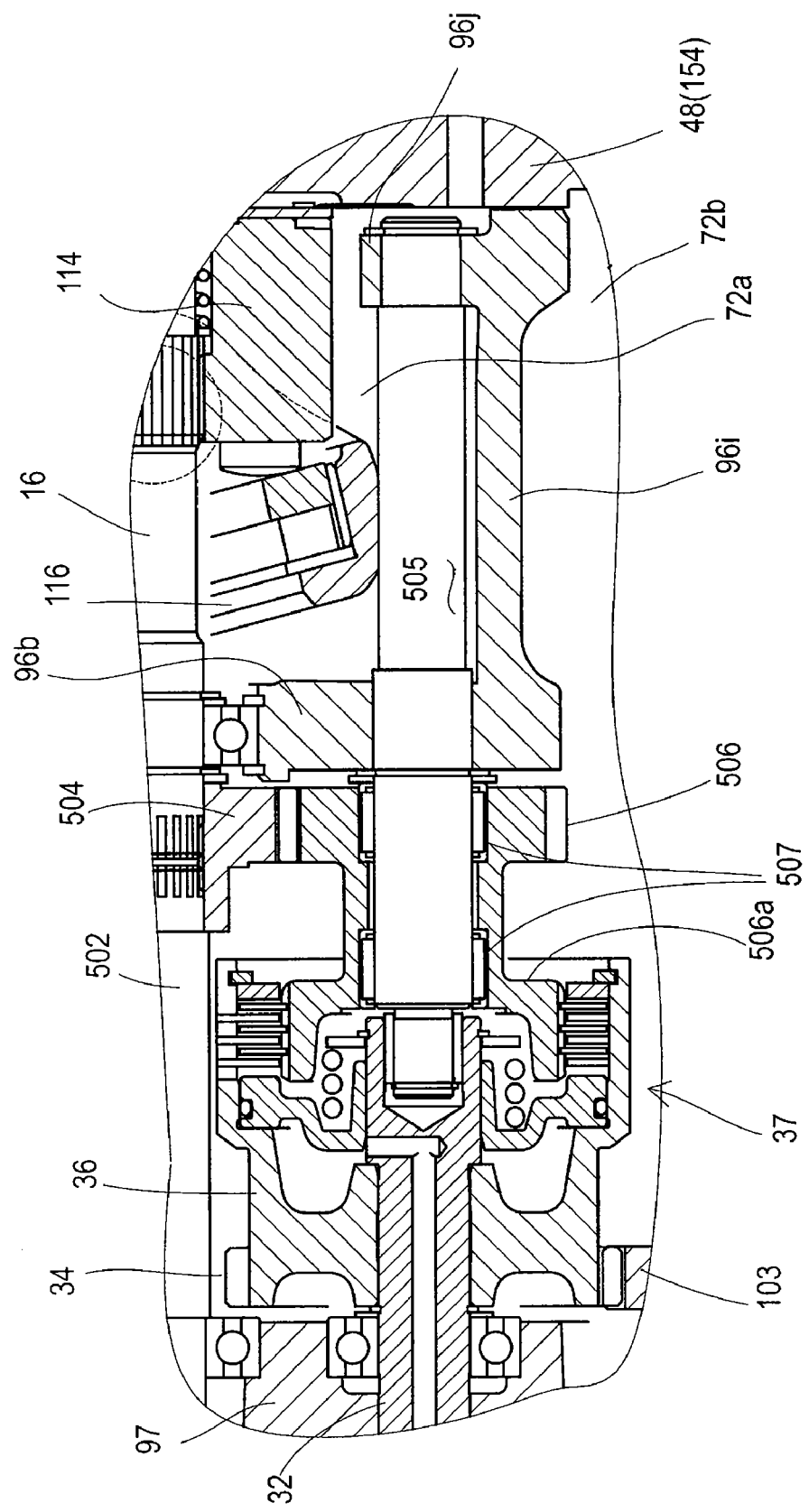
FIG. 43 is a fragmentary sectional side view of transaxle 3 or 35 showing an alternative structure for supporting a PTO clutch drive shaft 505.

Alternatively, PTO clutch drive shaft 505 may be supported as shown in FIG. 43. In this regard, a center boss portion 506a of gear 506 is extended rearward along PTO clutch drive shaft 505 and inserted into rotary drum 36 of main PRO clutch 37. The clutch friction disks are interposed between rotary drum 36 and center boss portion 506a of gear 506. Front and rear needle bearings 507 are interposed between PTO clutch drive shaft 505 and gear 506 extended along PTO clutch drive shaft 505, so as to stably journal PTO clutch drive shaft 505 just in front of main PTO clutch 37. Further, the front end of PTO clutch drive shaft 505 is simply fitted slidably rotatably into a shaft hole in support wall 96j.

It is further understood by those skilled in the art that the foregoing description is a preferred embodiment of the disclosed apparatus and that various changes and modifications may be made in the invention without departing from the scope thereof claimed as follows.

What is claimed is:

1. A hydrostatic transaxle for a vehicle having a first axle and a second axle, the hydrostatic transaxle comprising:
   a hydraulic pump:
   a variable displacement first hydraulic motor drivingly connected to the first axle;
   a closed circuit fluidly connecting the hydraulic pump to the first hydraulic motor;
   a fluid-supply switching device shifted between a supply position for supplying fluid from the closed fluid circuit to a second hydraulic motor, which is disposed on the outside of the hydraulic transaxle and is drivingly connected to the second axle, and a supply-stop position for stopping the supply of fluid from the closed fluid circuit to the second hydraulic motor; and
   a means for associating the switching of the fluid-supply switching device between the supply position and the supply-stop position with an operation for changing the displacement of the first hydraulic motor.

2. The hydrostatic transaxle according to claim 1, wherein the first hydraulic motor is provided with a rotary shaft for changing the displacement of the first hydraulic motor, and wherein the fluid-supply switching device is a rotary valve having a rotary axis disposed in parallel to the rotary shaft of the first hydraulic motor.

3. The hydrostatic transaxle according to claim 1, further comprising:
   a displacement control device for changing the displacement of the first hydraulic motor, the displacement control device having a movable range between at least two positions; and
   a cushion mechanism provided in the means for associating so as to make the two positions of the displacement control device in the movable range correspond to the supply and supply-stop positions of the fluid-supply switching device, respectively, even when the movable range of the displacement control device is different from the shiftable range of the fluid-supply switching device between the supply position and the supply-stop position.

4. The hydrostatic transaxle according to claim 3, the means for associating including:
   a link element interposed between the displacement control device and the fluid-supply switching device so as to serve as the cushion mechanism, wherein a link ratio between the displacement control device and the link element is different from a link ratio between the fluid-supply switching device and the link element so as to correspond to the difference of the movable range of the displacement control device and the shiftable range of the fluid-supply switching device.

5. The hydrostatic transaxle according to claim 3, the means for associating including:
   an elastic element serving as the cushion mechanism interposed between the displacement control device and the fluid-supply switching device so as to allow movement of one of the displacement control device and the fluid-supply switching device while retaining the other of the displacement control device and the fluid-supply switching device.

6. The hydrostatic transaxle according to claim 1, wherein at least either a small displacement or a large displacement of the first hydraulic motor is selected, wherein the linkage system sets the fluid-supply switching device to the supply position when the large displacement of the first hydraulic motor is selected, and wherein the means for associating sets the fluid-supply switching device to the supply-stop position when the small displacement of the first hydraulic motor is selected.

7. The hydrostatic transaxle according to claim 6, wherein the first hydraulic motor is provided with a rotary shaft for changing the displacement of the first hydraulic motor, and wherein the fluid-supply switching device is a rotary valve having a rotary axis disposed in parallel to the rotary shaft of the first hydraulic motor.

8. The hydrostatic transaxle according to claim 6, further comprising:
   a displacement control device for changing the displacement of the first hydraulic motor, the displacement control device having a movable range between a large displacement position for establishing the large displacement of the first hydraulic motor and a small displacement position for establishing the small displacement of the first hydraulic motor; and
   a cushion mechanism provided in the means for associating so as to make the large displacement position of the displacement control device correspond to the supply position of the fluid-supply switching device, and to make the small displacement position of the displacement control device correspond to the supply-stop position of the fluid-supply switching device, even when the movable range of the displacement control device between the large displacement position and the small displacement position is different from the shiftable range of the fluid-supply switching device between the supply position and the supply-stop position.

9. The hydrostatic transaxle according to claim 8, the means for associating including:
   a link element interposed between the displacement control device and the fluid-supply switching device so as to serve as the cushion mechanism, wherein a link ratio between the displacement control device and the link element is different from a link ratio between the fluid-supply switching device and the link element so as to correspond to the difference of the movable range of the displacement control device and the shiftable range of the fluid-supply switching device.

10. The hydrostatic transaxle according to claim 8, the means for associating including:
    an elastic element serving as the cushion mechanism interposed between the displacement control device and the fluid-supply switching device so as to allow movement of one of the displacement control device and the fluid-supply switching device while retaining the other of the displacement control device and the fluid-supply switching device.

11. The hydrostatic transaxle according to claim 1, wherein the fluid- supply switching device comprises a valve.

12. The hydrostatic transaxle according to claim 11, wherein the valve is a drive-mode change valve shiftable between a two-wheel drive mode position and a four-wheel drive mode position.

* * * * *